US011755372B2

(12) United States Patent
Smith et al.

(10) Patent No.: US 11,755,372 B2
(45) Date of Patent: Sep. 12, 2023

(54) ENVIRONMENT MONITORING AND MANAGEMENT

(71) Applicant: MicroStrategy Incorporated, Vienna, VA (US)

(72) Inventors: Andrew Smith, Oakton, VA (US); Clayton Myers, Oak Hill, VA (US); Hao Shen, Fairfax, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 70 days.

(21) Appl. No.: 16/915,400

(22) Filed: Jun. 29, 2020

(65) Prior Publication Data

US 2021/0064431 A1 Mar. 4, 2021

Related U.S. Application Data

(63) Continuation-in-part of application No. 16/556,596, filed on Aug. 30, 2019.

(51) Int. Cl.
*G06F 9/50* (2006.01)
*G06F 9/54* (2006.01)

(52) U.S. Cl.
CPC .......... *G06F 9/5011* (2013.01); *G06F 9/5072* (2013.01); *G06F 9/5077* (2013.01); *G06F 9/542* (2013.01)

(58) Field of Classification Search
CPC ....... G06F 9/5011; G06F 9/542; G06F 9/5072
See application file for complete search history.

(56) References Cited

U.S. PATENT DOCUMENTS

| 5,630,142 A | 5/1997 | Cramp et al. |
| 6,577,962 B1* | 6/2003 | Afshari ............... G06Q 10/06 700/291 |

(Continued)

FOREIGN PATENT DOCUMENTS

CN 102096461 6/2013

OTHER PUBLICATIONS

Airwatch: "AirWatch Enterprise Mobility Management Demo," YouTube, Jul. 22, 2014, retrieved from the Internet <https://www.youtube.com/watch?v=ucVln4-tgk>, retrieved on May 3, 2017, 1 page.

(Continued)

*Primary Examiner* — Jaweed A Abbaszadeh
*Assistant Examiner* — Gayathri Sampath
(74) *Attorney, Agent, or Firm* — Fish & Richardson P.C.

(57) ABSTRACT

Methods, systems, and apparatus, including computer-readable media, for environment monitoring and management. In some implementations, information indicating a planned usage level for usage of cloud computing services is accessed by a group of multiple computing environments over a period of time. Usage of cloud computing services is monitored for the group of multiple computing environments. A usage measure indicating an amount of usage of cloud computing services by the group of multiple computing environments is generated over the period of time. A cloud computing usage notification is generated based on the planned usage level and the usage measure. The cloud computing usage notification is provided for presentation by an electronic device.

19 Claims, 14 Drawing Sheets

(56) References Cited

U.S. PATENT DOCUMENTS

| | | |
|---|---|---|
| 7,489,923 B2 | 2/2009 | Varanda |
| 7,870,550 B1 | 1/2011 | Qureshi et al. |
| 7,935,613 B2 | 5/2011 | Gulari |
| 8,065,676 B1 | 11/2011 | Sahai et al. |
| 8,141,090 B1 | 3/2012 | Graupuer et al. |
| 8,230,070 B2 | 7/2012 | Buyya et al. |
| 8,347,263 B1 | 1/2013 | Offer |
| 8,392,364 B2 | 3/2013 | Horn et al. |
| 8,527,793 B2 | 9/2013 | Chan et al. |
| 8,589,955 B2 | 11/2013 | Roundtree et al. |
| 8,645,745 B2 | 2/2014 | Barsness et al. |
| 8,799,115 B2 | 8/2014 | Schmitt |
| 8,839,238 B2 | 9/2014 | Huang et al. |
| 8,997,038 B2 | 3/2015 | Bozek et al. |
| 9,043,458 B2 | 5/2015 | Balaji et al. |
| 9,124,579 B2 | 9/2015 | Lee |
| 9,134,964 B2 | 9/2015 | Hirsch |
| 9,170,800 B2 | 10/2015 | Lang |
| 9,361,011 B1 | 6/2016 | Burns |
| 9,426,433 B1 | 8/2016 | Mazzarella |
| 9,461,972 B1 | 10/2016 | Mehta |
| 9,495,214 B2 | 11/2016 | Tatsubori et al. |
| 9,715,370 B2 | 7/2017 | Friedman |
| 9,733,985 B2 | 8/2017 | Lyoob et al. |
| 9,753,618 B1 | 9/2017 | Jain |
| 9,858,063 B2 | 1/2018 | Jain et al. |
| 9,886,267 B2 | 2/2018 | Maheshwari et al. |
| 10,210,567 B2 | 2/2019 | Mick et al. |
| 10,411,975 B2 | 9/2019 | Martinez et al. |
| 10,938,674 B1* | 3/2021 | Natanzon ............ H04L 41/5096 |
| 2002/0022973 A1 | 2/2002 | Sun |
| 2003/0236745 A1 | 12/2003 | Hartsell et al. |
| 2005/0086587 A1 | 4/2005 | Balz |
| 2006/0282516 A1 | 12/2006 | Taylor |
| 2007/0130097 A1 | 6/2007 | Andreev et al. |
| 2008/0052343 A1 | 2/2008 | Wood |
| 2008/0126110 A1 | 5/2008 | Haeberle et al. |
| 2008/0127040 A1 | 5/2008 | Barcellona |
| 2009/0043689 A1 | 2/2009 | Yang |
| 2009/0106571 A1 | 4/2009 | Low et al. |
| 2009/0119678 A1 | 5/2009 | Shih |
| 2009/0156190 A1 | 6/2009 | Fisher |
| 2010/0211941 A1 | 8/2010 | Roseborough |
| 2010/0229014 A1 | 9/2010 | Blackburn et al. |
| 2011/0200979 A1 | 8/2011 | Benson et al. |
| 2012/0131594 A1 | 5/2012 | Morgan |
| 2012/0185913 A1 | 7/2012 | Martinez et al. |
| 2012/0239739 A1 | 9/2012 | Manglik et al. |
| 2012/0311154 A1 | 12/2012 | Morgan |
| 2013/0110565 A1 | 5/2013 | Means |
| 2013/0283188 A1 | 10/2013 | Sanghvi |
| 2014/0026113 A1 | 1/2014 | Farooqi |
| 2014/0033171 A1 | 1/2014 | Lorenz |
| 2014/0088995 A1 | 3/2014 | Damani |
| 2014/0100883 A1 | 4/2014 | Hamilton |
| 2014/0101628 A1 | 4/2014 | Almog |
| 2014/0109072 A1 | 4/2014 | Zhongmin et al. |
| 2014/0109115 A1 | 4/2014 | Low |
| 2014/0109177 A1 | 4/2014 | Baron et al. |
| 2014/0137112 A1 | 5/2014 | Rigolet |
| 2014/0156823 A1 | 6/2014 | Liu |
| 2014/0240122 A1 | 8/2014 | Roberts |
| 2014/0258446 A1* | 9/2014 | Bursell ............... H04L 41/0816 709/217 |
| 2014/0273913 A1 | 9/2014 | Michel |
| 2014/0278536 A1 | 9/2014 | Zhang |
| 2014/0324647 A1 | 10/2014 | Iyoob et al. |
| 2015/0074635 A1 | 3/2015 | Margiotta |
| 2015/0089224 A1 | 3/2015 | Beckroan |
| 2015/0135160 A1 | 5/2015 | Gauvin |
| 2015/0163121 A1 | 6/2015 | Mahaffey et al. |
| 2015/0294090 A1 | 10/2015 | Kodiyan |
| 2016/0058287 A1 | 3/2016 | Dyell |
| 2016/0092339 A1 | 3/2016 | Straub |
| 2016/0094622 A1* | 3/2016 | Thomas ................. H04L 41/22 709/203 |
| 2017/0048215 A1 | 2/2017 | Straub |
| 2017/0085447 A1 | 3/2017 | Chen et al. |
| 2017/0199770 A1* | 7/2017 | Peteva ................. G06F 9/5088 |
| 2017/0224275 A1 | 8/2017 | Zhang et al. |
| 2018/0018154 A1 | 1/2018 | Burns et al. |
| 2018/0046453 A1 | 2/2018 | Nair |
| 2018/0048532 A1 | 2/2018 | Poort et al. |
| 2018/0121187 A1 | 5/2018 | Jain et al. |
| 2018/0288143 A1* | 10/2018 | Hwang ............... H04L 67/1031 |
| 2019/0122132 A1* | 4/2019 | Rimini ................. G06N 20/00 |
| 2020/0026580 A1 | 1/2020 | Bahramshahry et al. |
| 2020/0285503 A1 | 9/2020 | Dou et al. |
| 2020/0311573 A1 | 10/2020 | Desai et al. |
| 2021/0064388 A1 | 3/2021 | Gardner et al. |

OTHER PUBLICATIONS

Airwatch: "Airwatch laptop management demo," YouTube, Oct. 3, 2014, retrieved from the Internet <https://www.youtube.com/watch?v=3gHfmdVZECM>, retrieved on May 3, 2017, 1 page.

Henze et al., Push the study to the App store: evaluating off-screen visualizations for maps in the android market, Sep. 2010, 2 pages.

Taivan et al., Application Diversity in Open Display Networks, Jun. 2014, 6 pages.

Zhang et al., "Workload Patterns for Quality-Driven Dynamic Cloud Service Configuration and Auto-Scaling," 2014 IEEE/ACM 7th International Conference on Utility and Cloud Computing, 2014, 156-65.

Office Action in U.S. Appl. No. 16/556,596, dated Feb. 4, 2022, 14 pages.

Office Action in U.S. Appl. No. 16/556,596, dated Aug. 19, 2022, 17 pages.

* cited by examiner

Cloud Computing Usage Summary

Hi, Zhen

Here is your weekly cost summary for Dec 27 – Jan 02

1
Total Deployments

$35
Cost

100%
Idle Time

$7
Potential Cost Saving

| Last week: 1 | Last week: $43 ▼18.6% | Last week: 50% ▲100.0% | Last week: $4 ▲75.0% |

ⓘ Potential Cost Saving indicates cost that could be saved if environment was stopped during the idle time.

Active Environments

| ID | Environment | Enterprise Application | Idle Time | Cost | Potential Cost Saving | Created on | Cost (YTD) |
|---|---|---|---|---|---|---|---|
| Total | | | 100% | $35 | $7 | | $254 |
| 173600 | xy_UB_11.2_2261 | Univ-Benchmark | 100% | $35 | $7 | 12/2/2019 | $245 |

Terminated Environments

You don't have any terminated environments for this week.

*Click here* to view environment details on Provisioning Console.

FIG. 9

ENVIRONMENT MONITORING AND MANAGEMENT

CROSS-REFERENCE TO RELATED APPLICATION

This application is a continuation-in-part of U.S. application Ser. No. 16/556,596, filed Aug. 30, 2019, the contents of which is incorporated herein by reference in its entirety.

TECHNICAL FIELD

This specification relates generally to computer systems that can monitor and manage computing resources, such as cloud-computing environments.

BACKGROUND

Some computing systems, such as servers, provide computing environments that are accessed by other devices. To ensure availability, many server-provided environments operate continuously. However, the actual need for an environment may vary and significant periods of time can pass when there is low usage or even no usage the environment. Continuing to operate environments that are idle can be a very inefficient use of computing resources and power that could better used for other purposes. On the other hand, aggressively shutting down environments may make environments unavailable to process client requests and result in outages and poor service.

SUMMARY

In some implementations, a computer system tracks and manages usage of cloud computing resources. The system can monitor usage of resources, compare usage with predetermined criteria (e.g., thresholds, usage limits, etc.), and notify users about usage levels and usage trends. The system can also be configured to automatically take actions to manage cloud computing environments based on usage levels and usage plans. These actions can include selectively shutting down cloud-based environments, increasing or decreasing resources to cloud-based environments, and so on. These features can be used to keep users and administrators informed of resource usage and to automatically take actions to adjust usage without user action.

Many companies and other organizations use cloud computing services to run server environments or perform other computing tasks. Services such as AMAZON WEB SERVICES (AWS) and MICROSOFT AZURE enable users to create and run computing environments on remote servers, and this allows users to run large numbers of environments in parallel without running into resource constraints. Nevertheless, the seemingly unlimited computing capacity that cloud service providers offer can lead to excessive or wasteful use, such as when environments remain running while idle or when users run redundant or duplicative environments. In some cases, many different users within an organization may run different cloud computing environments for different purposes, making it difficult to track and manage usage for departments and other groups within the organization. These factors can also make the usage level and costs incurred for cloud services difficult to manage and predict.

The systems and techniques discussed herein enable more efficient and effective use of cloud computing services with information and tools to plan usage, monitor usage, and enforce usage plans. The system can be configured to track cloud computing resource usage for a group of multiple users or systems, e.g., for an organization, a department, etc. This may include tracking aggregate usage for the group as well as more fine-grained usage tracking, such as for projects, users, or computing environments. A usage plan or budget can be set for the group as a whole and/or for elements within the group (e.g., projects, users, computing environments, etc.). The system may track the usage of cloud computing resources in an ongoing or real-time manner, so the system can rapidly initiate management actions and send notifications in response to changing conditions. In addition, or as an alternative, the system can track usage for defined time periods, e.g., a day, a week, a month, etc., and periodically send notifications and initiate management actions based on usage over those periods. The system can compare the tracked usage of cloud computing resources to one or more thresholds to determine if any of the thresholds are met or exceeded. The thresholds may represent, for example, planned or budgeted levels of usage or milestones along the way to reaching a planned level of usage.

For example, the system may be configured to monitor cloud-computing usage for a department of a company. This may include tracking aggregate usage for the department as a whole, as well as tracking usage for individual projects, users, or computing environments. A planned usage level can be set for the department for the time period, such as a budgeted amount of resources for a month. The system can provide a periodic report of usage, such as by sending a daily message to administrators that shows the cumulative usage for the month and the planned usage for the month. The system can also provide forecasted usage information, for example, an indication of the department's expected total usage at the end of the month, determined based on a trend of the department's usage at the beginning of the month and/or the department's usage in prior months. The system may additionally or alternatively send alerts to in response to certain conditions being met, such as the department's cumulative usage for the month reaching 50%, 75%, or 100% of the planned usage. The system can notify individual users in the department of their own usage, planned usage levels, and forecasts for the environments that they use or manage. These and other features of the system can assist the department in using the cloud computing resources more efficiently. As discussed further below, the system may also take actions to enforce usage plans or usage limits, such as by detecting and limiting anomalous usage, reducing the amount of environments running, reducing the duration that environments run, and limiting the amount of computing resources allocated to individual environments.

The system may detect patterns in the tracked usage of cloud computing resources, and use the usage patterns in managing usage of cloud computing resources and/or notifying users. Specifically, the system may use identified usage patterns in determining if forecasted usage is in line or exceeds a usage plan or a usage budget, e.g., for a particular time period. For example, a set of usage patterns may indicate an expected usage of cloud computing resources for a given cloud computing environment over the next two weeks. The system can use these usage patterns with the know usage levels of cloud computing resources, e.g., monitored over the past two weeks, to determine that a usage budget or planned usage level for the month is likely to be exceeded. In response, the system can notify corresponding users of the cloud computing environment that the forecasted usage levels are likely to exceed the usage budget. Similarly, the system can use identified usage patterns to determine actions to manage cloud computing environments. For example, the system can use detected usage patterns to predict if performing a particular remedial action will be sufficient to bring the forecasted usage levels in line with a usage plan or usage budget.

The system may identified usage patterns (e.g., usage trends) from monitored usage data and activity data. For example, the system can use identify usage patterns for a given cloud computing environment from currently active user sessions in computer environment, a number of users logged in to the computer environment, a number of active users logged in, scheduled application activity, user-initiated application activity, historical user activity on the computer environment, and a priority ranking of active CPU tasks. As an example, a usage pattern can indicate an expected increase in usage in the afternoon between 2:00 pm and 5:00 pm, can indicate decreased usage on weekends compared to weekdays, can indicate an expected usage for the current month compared to other months, etc. The system can use multiple usage patterns to forecast usage levels. For example, the system can use a usage pattern that indicates an expected usage level for the current month along with a usage pattern that indicates recent usage trends to forecast the usage levels for the rest of the current month. The recent usage trends can highlight, for example, unusually high user activity for the given time of day, day, week, month, etc. The system can use one or more machine learning models to detect usage patterns. Additionally or alternatively, the system can use one or more machine learning models to forecast usage levels, e.g., based on the detected usage patterns.

In some implementations, the system performs actions based on the tracked usage of cloud computing resources, determinations that thresholds are met or exceeded, and/or based on detected usage patterns. The actions can include starting up or shutting down cloud computing environments. The actions can include generating and sending notifications to users or administrators of cloud computing environments. The actions can include modifying configuration settings for cloud computing environments, e.g., increasing or reducing the cloud computing resources allocated to the cloud computing environments. The actions can include reserving cloud computing resources for the cloud computing environments.

In some implementations, the system receives data that indicates a planned usage level, e.g., a budgeted amount of resources to be allocated over a time period. The usage budget can be for a group of users (e.g., an organization, department, a group of employees working on a particular project, etc.) or a group computing environments, or for individual users or individual computing environments. The planned usage level can be set by an administrator for the cloud computing environments. The usage budget can indicate a planned or budgeted usage amount for a time period, e.g., one day, one week, one month, etc.

In some implementations, the system generates predictions or forecasts for the usage of cloud computing resources. For example, the system can use records of previous usage of cloud computing resources by a group to estimate the total usage for a current or future time period. As an example, the system can predict the usage for an organization for the current month (or a later month) based on usage for the organization in prior months. The system can also use tracked usage of cloud computing resources in a current time period to make the forecast, for example, using the trend shown by the organization's usage through the month so far to predict the total usage expected at the end of the month. The forecasted usage of cloud computing resources can indicate the expected usage of cloud computing resources by the end of the current time period.

The system can use one or more machine learning models to determine a forecasted usage of cloud computing resources. The system can use the forecasted usage amount to determine if any budget thresholds are likely to be met or exceeded (e.g., in the current time period corresponding to the budget, or a future time period). The system can use the forecasted usage amount to evaluate whether to shut down or start up cloud computing environments. For example, comparison of the forecasted amount with the planned usage level may indicate that the planned usage level will be exceeded. As a result, the system can alter idle thresholds and other settings to more aggressively shut down computing environments and reduce expected resource consumption. The system can use the forecasted usage of cloud computing resources to generate and send notifications to users or administrators of the cloud computing environments. The system can use the forecasted usage of cloud computing resources to modify configuration settings for the cloud computing environments, e.g., to increase or reduce the cloud computing resources allocated to the cloud computing environments. The system can use the forecasted usage of cloud computing resources to reserve cloud computing resources for the cloud computing environments.

In some implementations, the system is configured to detect anomalous usage levels or usage patterns and take actions in response. The system can detect a usage anomaly using, for example, the tracked usage of the cloud computing resources and/or activity data corresponding to the cloud computing environments. The system can store activity data that indicates the way that environments are used over time, e.g., which environments are run, the times and durations that they are run, the number of users logged on, the number and type of tasks performed, the amount and types of computing resources they use, and so on. This information can be tracked for users who generate or manage environments, e.g., indicating how many environments a user typically has running and which environments those are, how frequently the user creates new environments, the times and durations that the environments run, the computing resources used by that user's environments, and so on. The activity data provides the system a customized baseline level of activity for users and environments, as a reference for the typical behavior of users and computing environments.

With the expected level or range of activity known for specific users and environments, the system can compare current usage and recent trends with the typical activity levels observed previously. When the system determines that the current or recent usage by a user or environment (or group of users and environments) is outside the typical or expected range, as determined from historical activity for the user or environment, the system can send a notification of the anomaly to an administrator or to the user involved in the anomalous condition. The system may take other actions to respond to a detected usage anomaly, such as to require additional authentication or verification for the usage to continue, to limit or restrict resources available to a running environment, to shut down an environment, to require user input confirming that the anomalous usage to continue, etc. As a few examples, the system can detect a usage anomaly based on determining that a cloud computing environment is using more resources than is typical or expected, is using less resources than is typical or expected, has an unexpected number of active users, has a resource utilization that is currently above a threshold, has a resource utilization that is currently below a threshold, etc. In response to detecting an anomaly, the system can generate one or more anomaly notifications and send them to an administrator of a cloud computing environment corresponding to the detected anomaly.

In some implementations, the system generates periodic notifications based on tracked usage of cloud computing resources. The notifications can indicate, for example, the usage of cloud computing resources measured so far within a time period, the expected usage of cloud computing resources by the end of the time period, a recommended action to take, and an action that the system will take with respect to the one or more cloud computing environments. The system can send the notifications to one or more administrators of the cloud computing environments.

In some implementations, the system uses the detected usage patterns and/or the forecasted usage to shut down or start up cloud computing environments. For example, if the patterns of usage indicate that the utilization of resources for a given cloud computing environment drops generally drops below 5% between 11:00 pm and 4:00 am, the system can shutdown the cloud computing environment at 11:00 pm and can restart the cloud computing environment at 4:00 am.

In some implementations, the system the detected usage patterns and/or the forecasted usage to change the configuration of cloud computing environments. For example, if the usage patterns indicate that, for a given cloud computing environment, there is increased demand on weekends between the 11:00 am and 3:00 pm, the system can adjust the configuration settings for the cloud computing environment such that 20% more CPUs are allocated to the cloud computing environment during the time of increased demand.

In some implementations, the system uses the detected usage patterns and/or the forecasted usage to determine the type or priority of cloud computing resources that are used. The aggregate level of usage for a group of users or environments (e.g., for a company or other organization, a department, assigned to a project, etc.) can be used to determine an amount of computing capacity to reserve, in advance, for a future time period. For example, the system can use an organization's usage measures for the current month and several prior months to estimate expected demand for computing resources the next month. The system can then reserve computing resources for the next month based on the expected future usage, e.g., at 80% of the expected usage, to secure availability and in many cases to obtain better pricing or other terms.

Cloud computing providers may offer different tiers or levels of service or access, which can have different costs and features available. For example, there can be standard resources available on-demand, while other resources reserved in advance. Low priority or non-guaranteed resources may also be available, which may be subject to interruption if demand is high but are also available at low cost. The usage data and activity data generated by the system can indicate the type and priority of computing resource usage, allowing the system to forecast how much of different tiers or types of service will be needed. In reserving cloud computing resources, the cloud computing system can set the amount of each service tier to reserve based on the needs based on the usage patterns and/or the forecasted usage.

In one general aspect a method includes: accessing, by the one or more computers, information indicating a planned usage level for usage of cloud computing services by a group of multiple computing environments over a period of time; monitoring, by the one or more computers, usage of cloud computing services for the group of multiple computing environments; generating, by the one or more computers, a usage measure indicating an amount of usage of cloud computing services by the group of multiple computing environments over the period of time; generating, by the one or more computers, a cloud computing usage notification based on the planned usage level and the usage measure; and providing, by the one or more computers, the cloud computing usage notification for presentation by an electronic device.

Implementations can include one or more of the following features. In some implementations, the method includes comparing, by the one or more computers, the generated usage measure with the planned usage level; and where providing the cloud computing usage notification includes providing the cloud computing usage notification based on the comparison.

In some implementations, the method includes performing a management action for one or more of the multiple computing environments based on the usage measure and the planned usage level, where the management action includes at least one of: changing a duration that a running computing environment is permitted to continue running; changing a default duration limit that computing environments are permitted to run; changing a level of computing resources allocated to a running computing environment; changing a default level of computing resources allocated to computing environments; changing a policy governing extension of computing environment duration; changing a threshold for an amount of activity for a computing environment to be shut down; changing a threshold for an inactive computing environment to be re-started; changing an execution priority for a computing environment; or changing an amount of environments that are permitted to run concurrently.

In some implementations, the planned usage level is a planned usage level for an organization or portion of an organization; where the group of multiple computing environments are computing environments of the organization or the portion of the organization, the group of multiple computing environments including computing environments managed by different members of the organization; where the usage measure is an aggregate measure of usage of cloud computing services by the organization or the portion of the organization; and where providing the notification includes providing the notification to one or more users designated to receive notifications regarding usage for the organization or the portion of the organization.

In some implementations, the method includes determining a forecasted usage of cloud computing services over the period of time based on at least one of: usage measures for the group of computing environments during one or more time periods before the current time period; a usage measure for the group of computing environments for the current time period; or one or more patterns of usage of cloud computing services by the group of computing environments.

In some implementations, the method includes providing periodic alerts indicating (i) usage during a current time period and (ii) a usage limit corresponding to the current time period.

In some implementations, the method includes determining, for each of the periodic alerts, a forecasted usage measure of cloud computing resources for the group of computing environments for the current time period; and providing the forecasted usage measures in the respective periodic alerts.

In some implementations, determining that the usage measure has reached a threshold that is based on the planned usage level; where providing the notification includes, in response to determining that the usage measure has reached the threshold, providing a notification indicating that the usage measure has reached the threshold.

In some implementations, the method includes: accessing data indicating multiple thresholds each indicating different predetermined proportions of the planned usage level; and monitoring whether the usage of cloud computing services by the group of multiple computing environments reaches any of the multiple thresholds.

In some implementations, the method includes storing planned usage levels for each of multiple classes of cloud computing services; where monitoring the usage of cloud computing services includes monitoring the usage of each of the different classes of cloud computing services by the group of multiple computing environments and comparing monitored usage with corresponding planned usage levels.

In some implementations, the method includes providing, for presentation to a user, a notification that is conditioned on determining that one or more predetermined criteria have been satisfied, the one or more predetermined criteria including at least one of: determining that the user has a number of running environments that satisfies a threshold; determining that usage of cloud computing services by computing environments of the user exceeds a typical pattern for the user or for the computing environments; determining that the user has used at least a minimum amount of cloud computing services over the current time period; determining that the user has at least one computing environment running; determining that a computing environment associated with the user was automatically shut down; and determining that a computing environment associated with the user has less than a threshold level of activity for at least a minimum amount of time.

In some implementations, the method includes: for one or more proper subsets of the group of multiple computing environments: tracking usage of cloud computing services; and providing cloud computing usage notifications indicating a usage measure indicating cloud computing services used by the subset.

In some implementations, the one or more proper subsets includes at least one of: an individual computing environment, a subset formed of computing environments associated with a specific user, a subset formed of computing environments associated with any of the users in a group of users, a subset formed of computing environments associated with a project, or a subset formed of computing environments for a department or portion of an organization.

In some implementations, the planned usage level is a usage budget or a usage limit.

In some implementations, the computing environments include one or more of virtual computing environments, virtual machines, software instances, or container-based instances of software.

In some implementations, the method includes: determining to stop a particular computing environment that runs using first cloud computing resources; identifying one or more second cloud computing resources with which the particular computing environment is configured to interact, the one or more second cloud computing resources being different from the first computing resources; evaluating whether other computing environments rely on the one or more second cloud computing resources; determining, based on the evaluation, that no other active computing environments rely on the one or more cloud resources; and in response to determining that no other active computing environments rely on the one or more cloud resources, shutting down the one or more second resources.

In some implementations, the one or more second resource include at least one of a storage volume, a database instance, a file system, a machine learning accelerator, a web server, a virtual private cloud (VPC) resource, or a networking resource.

In some implementations, the method includes: setting a default maximum duration for cloud computing environments to run; determining that a particular cloud computing environment has been running for the default maximum duration; and terminating the particular cloud computing environment in response to determining that determining that the particular cloud computing environment has been running for the default maximum duration.

In some implementations, the method includes: identifying an execution duration limit applicable to a particular cloud computing environment that is running; identifying a user or electronic account associated with the particular cloud computing environment; determining that the execution duration limit for the particular cloud computing environment has reached or is within a predetermined threshold of the execution duration limit; and in response to determining that the runtime duration has reached or is within a predetermined threshold of the identified runtime duration limit, providing a notification for presentation at a client device associated with a user associated with the particular cloud computing environment.

In some implementations, the method includes providing data for a user interface control configured to extend execution time beyond the execution duration limit in response to user interaction with the control.

In some implementations, the method includes providing output data configured to cause a client device to provide a user interface option to extend the execution of the particular cloud computing environment for a fixed amount of time; receiving interaction data indicating user interaction with the control; extending the permitted execution time for the particular computing environment in response to the user interaction.

In some implementations, the method includes: storing usage data that indicates, for one or more computing environments, usage of cloud computing services at different times by the one or more computing environments; determining baseline usage characteristics for the one or more computing environments based on the usage data; determining that usage characteristics for the one or more computing environments for the current time period differs from the baseline usage characteristics by at least a predetermined threshold amount; and providing a notification in response to determining that the usage characteristics for the one or more computing environments for the current time period differs from the baseline usage characteristics by at least a predetermined threshold amount.

In some implementations, the baseline usage characteristics indicate a range or typical level for at least one of: an amount of instances, a frequency of execution, an amount of computing resources used, a duration of execution, concurrency of the one or more computing environments, or pattern of variation in resource usage over time.

In some implementations, the method includes accessing usage measures for the group of multiple computing environments corresponding to different periods of time; based on the usage measures, determining a predicted usage amount for a future time period; and providing output indicating the forecasted usage amount or reserving an amount of cloud computing resources for the future time period based on the predicted usage amount.

In some implementations, the method includes identifying one or more of the computing environments in the group of computing environments that are configured for execution in a low-priority mode; and determining whether to assign the one or more computing environments to execution in the low-priority mode based on a comparison of the usage measure with the planned usage level or a comparison of a predicted usage measure with the planned usage level.

In some implementations, the method includes identifying the one or more computing environments configured for execution in the low-priority mode includes identifying computing environments or computing tasks that have at least one of: a start-up time below a threshold; a configuration to save progress at a rate or frequency that satisfies a threshold; a capability to save execution state and restore execution state; or a priority rating that satisfies a threshold.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 is a diagram that illustrates an example periodic usage notification.

Like reference numbers and designations in the various drawings indicate like elements.

DETAILED DESCRIPTION

Figure 1:
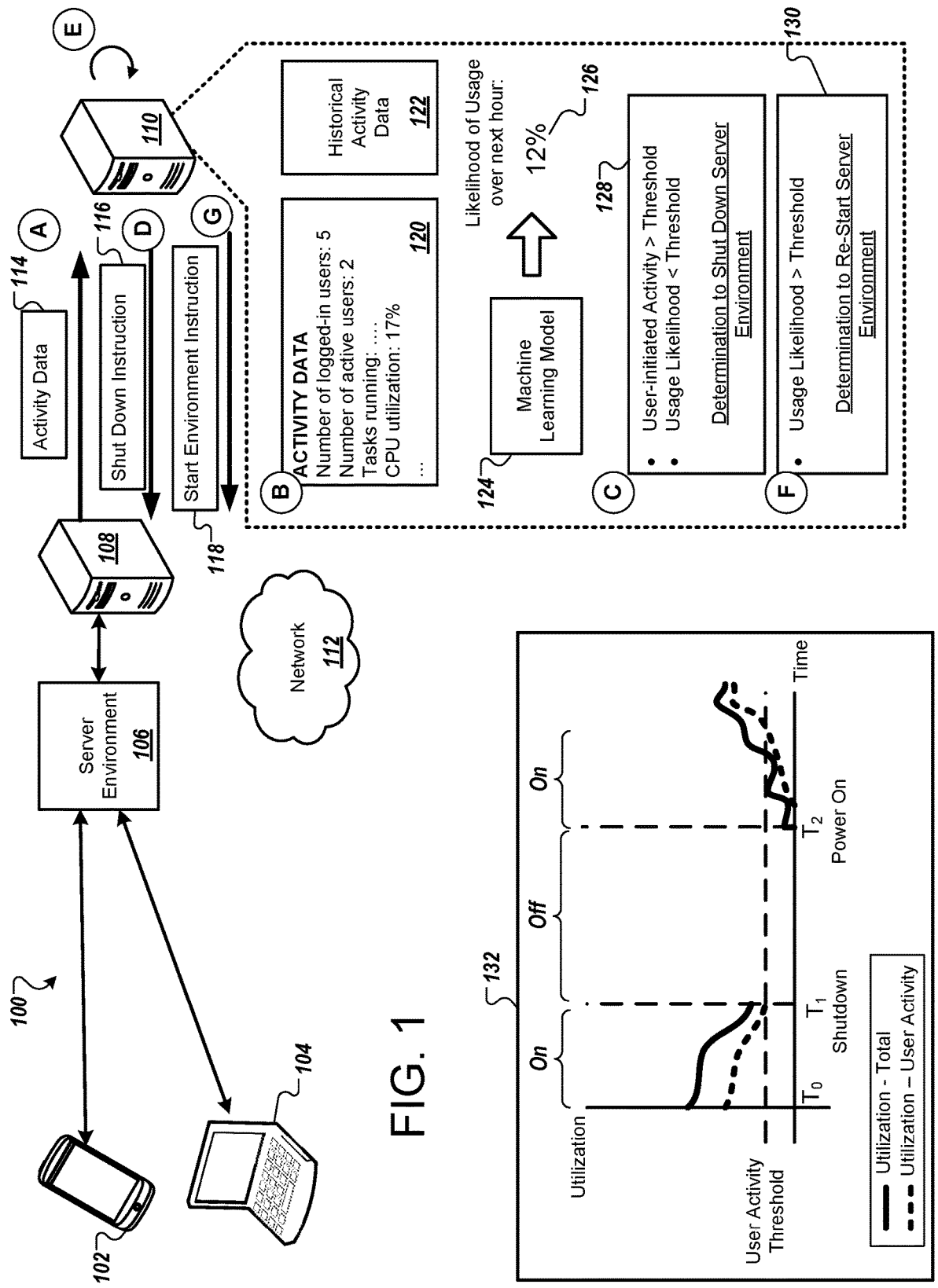
FIG. 1 is a block diagram that illustrates an example of a system for automatic idle environment shut down.

FIG. 1 is a block diagram that illustrates an example of a system 100 for automatic idle environment shut down. The system 100 includes a client device 102, another client device 104, a server environment 106, a cloud computing system 108, a computing system 110, and a network 112.

The cloud computing system 108 can be a server system that hosts or otherwise provides the server environment 106, which can be a software environment that includes applications and/or services to respond to various requests. The server environment 106 may represent the operation of a specific server system (e.g., the software of a specific server), but may similarly represent one of potentially many virtualized environments running on a hardware platform. In some implementations, the server environment 106 is a server environment hosted by a cloud computing platform such as AMAZON WEB SERVICES (AWS), MICROSOFT AZURE, or another cloud computing provider. Accordingly the server environment 106 may represent a virtual machine or a collection of containers running on a host. In some implementations, the server environment 106 is provided by hardware that is directly managed by an organization, such as a local or on-premises server.

In some implementations, the server environment 106 and other server environments discussed herein are hosted by cloud computing platforms. For example, the cloud computing system 108 may represent a cloud computing platform operated by a third party. The computing system 110 can represent a management system that manages server environments for a company or other organization. By communicating with the cloud computing system represented by cloud computing system 108, the computing system 110 can efficiently manage cloud computing resources and predictively avoid running idle cloud-hosted environments, while also not shutting down environments prematurely.

The illustrated system 100 shows the computing system 110 monitoring the activity data of the server environment 106 through the cloud computing system 108. The cloud computing system 108 communicates with the server environment 106 that can communicate with one or more connected client devices, such as client device 102 and client device 104.

In some implementations, the computing system 110 can directly communicate with the server environment 106 without the use of the cloud computing system 108. In other implementations, the cloud computing system 108 is required to communicate status and activity data of the server environment 106 to the computing system 110. FIG. 1 illustrates various operations in stages (A) to (G), which can be performed in the sequence indicated or in another sequence.

In general, the system 100 provides for generating and providing activity instructions to the cloud computing system 108 based on a variety of factors of the server environment 106. The instructions can include whether to restart the server environment 106, power on the server environment 106, or to shut down the server environment 106. The system 100 can determine to provide one of these instructions to the cloud computing system 108 dynamically based on a variety of factors associated with the server environment 106 and the corresponding client devices 102 and 104. For example, the variety of factors can include data such as:

the number of users or client devices logged in to the server environment 106; the number of users logged in to the server environment 106 that are currently active; the number of tasks executing on the server environment 106; the number of the current tasks that were initiated due to user action or will cause results to be provided to a user; the CPU utilization and other resource utilization of the server environment 106; historical user activity data for the server environment 106; and other factors about the characteristics, usage, and status of the server environment 106.

The computing system 110 can monitor the variety of factors associated with the server environment 106, and provide data indicative of those factors to its machine learning model 124. These factors can be used to train the machine learning model 124 to predict a likelihood of usage over a predetermined period of time. For example, the machine learning model 124 can be trained to predict a likelihood of an amount of usage over a subsequent period of time. A user can set the subsequent period of time to be, for example, 30 minutes, 1 hour, or 24 hours. Once training of the machine learning model 124 is complete, the computing system 110 can provide the data indicative of those factors to the machine learning model 124 to produce an output indicting a predicted likelihood or level of future usage of the server environment 106. This prediction may apply to a specific time period, such as the next hour. The computing system 110 can then use the predicted likelihood to determine whether to instruct the cloud computing system 108 to restart, shut down, or power on the server environment 106 at a particular time. The system can use the predictions to determine a schedule for starting or stopping environments, to adjust the schedules, or to dynamically decide when to start or stop environments without using any schedule.

In some implementations, the computing system 110 can store the activity data of the server environment 106 in a database for subsequent retrieval. For example, the computing system 110 can store the activity data of the server environment 106, the characteristics of the machine learning model 124 (e.g., such as the weight values of a neural network), and the output prediction by the machine learning model 124 in the database for further operations. These operations can include training and fine-tuning the machine learning model 124 at a later point in time should the machine learning model 124 output an incorrect prediction or training the machine learning model 124 if new situations are encountered by the server environment 106.

In order to ensure that the client devices only use the server environment 106 for the minimum amount of time necessary to perform the requested task, the computing system 110 can monitor current activity and previous activity on the server environment 106 associated with the client devices to determine how long these devices typically use the server environment 106. In some implementations, the computing system 110 can monitor current activity and previous activity on the server environment 106 associated with the client devices to determine whether to shut down or power on the server environment 106. Additionally, the computing system 110 can monitor the current activity and previous activity of the server environment 106 associated with the client devices to predict at a future point in time when client devices will connect or disconnect from the server environment 106. Thus, the computing system 110 can anticipate client device action and minimize overall cost for the client devices for using the services provided by the server environment 106.

Referring to FIG. 1, in the system 100, each of the client devices 102 and 104 can be, for example, a desktop computer, a laptop computer, a tablet computer, a wearable computer, a cellular phone, a smart phone, a music player, an e-book reader, a navigation system, or any other appropriate computing device. The network 112 can be wired or wireless or a combination of both, and can include the Internet. The cloud computing system 108 can represent a single computer or multiple computers, which may be distributed across multiple geographic areas. Similarly, the computing system 110 can represent a single computer of multiple computers, which may be distributed across multiple geographic areas.

A user can interact with each of the computers and client devices shown in system 100. For example, a user can interact with the computing system 110 to set the parameters of the machine learning model 124, set the user activity and usage likelihood threshold levels of the computing system 110, and set the communication protocols between the computing system 110 and the cloud computing system 108. The user can interact with the computing system 110 to communicate with the cloud computing system 108 to see logs that indicate connection requests, disconnections, and utilization of the client devices to the server environment 106. The user can retrieve the logs from the cloud computing system 108 and store the retrieved logs on the computing system 110.

During stage (A), the computing system 110 monitors activity data 114 of the server environment 106. This includes receiving activity data 114 corresponding to connection requests to the server environment 106, utilization of the server environment 106 based on the requests from the client devices (e.g., client device 102 and client device 104), and utilization data corresponding to server environment 106. For example, the activity data 114 executing on the server environment 106 can include one or more jobs, processes, or tasks running on the server environment 106, the types of jobs/tasks executing on the server environment 106, the types of inputs received at the server environment 106, and when the inputs are received at the server environment 106. Additionally, the activity data 114 can include CPU utilization, memory usage, an amount of network bandwidth utilized, an amount of input or output operations, thread count, disk usage, network usage, a level of interactivity between the tasks executing, and GPU usage.

The activity data 114 can be based on user-initiated activity from the client devices or system initiated activity. The computing system 110 can monitor the activity data 114 of the server environment 106 over a period of time, such as a day, one week, or one month, for example. In some implementations, the computing system 110 can determine a portion of the measured user-initiated activity that supports active user sessions that receive user input at a particular rate. The computing system 110 can analyze how often and at what rate the server environment 106 receives input from a client device connected to the server environment. If the rate at which the server environment 106 receives input from a client device is greater than a predetermined threshold, such as a rate of five inputs per minute, then the computing device 110 can deem the user-initiated activity as an active user session. The user currently using the computing device can define the predetermined threshold for the rate at which the server environment 106 receives input from the client device. Alternatively, the computing system 110 can automatically generate the predetermined threshold based on averaging previous rates from historical activity data.

The computing system 110 can communicate with the cloud computing system 108 to retrieve the activity data 114 corresponding to the server environment 106. The computing system 110 communicates over network 112 to the cloud computing system 108. The computing system 110 can also retrieve a time the connection was made to the server environment 106, how long the connection was made before the respective client device or the server environment 106 severed the connection, a portion of the time the session was active, a portion of the time the session was inactive, and which computer of the server environment 106 connected to the client device.

In some implementations, the computing system 110 can retrieve activity data 114 corresponding to the processes performed on the server environment 106. For example, this data can include a number of users logged in to the server environment 106, a number of idle users that are logged in to the server environment 106, a number of currently active user sessions, a number of applications executing corresponding to each client device logged in to the server environment 106, and a type of each of the applications that are executing on the server environment 106. The type of active sessions can include a scheduled activity or a user initiated activity. For example, a scheduled activity can include a recurring virus scan on the computer or a virus scan on the client device 102 performed by the server environment 106. A user-initiated activity can include, for example, an application selected by a user of the client device 102 for performing an online payment or performing an online storage execution. Other data can be gleaned from the server environment 106 to be added to the activity data 114, such as GPU processing data, network processing data, and memory usage information corresponding to each application executing on the server environment 106.

If the computing system 110 cannot determine a user session or a type of the activity performed on the server environment 106, the computing system 110 can verify whether logs are generated in response to or during the execution of the activity. The reports can indicate tasks performed, date of the task performed, the type of tasks performed, how long each task executes, and potentially, one or more issues associated with the execution of the activity.

During stage (B), the computing system 110 evaluates the activity data 114. For example, the computing system 110 determines, from the activity data 114, an amount of the activity on the server environment 106 that is due to user actions. For example, in response to the client device 102 connecting to the server environment 106, the client device 102 may request the server environment 106 execute a particular application. The server environment 106 can spawn one or more applications in a single or multi-threaded environment in response to executing the particular application requested for by the client device 102. The computing system 110 can determine which additional applications are spawned in response to the client device 102 executing a particular application. For example, a user at client device 102 may request the server environment 106 to execute an online payment transaction. The server environment 106 can then initiate a thread that includes applications such as, a bank application, a communication protocol application, and a verification of money transfer application. The computing system 110 can note that each of these applications is executing on the server environment 106 in the activity data 114.

In some implementations, the computing system 110 can also note applications that are executing on the server environment 106 that are not due to user actions, such as system actions. These applications can include applications that are initiated by the processor without the request from the user. For example, these applications can include system updates, system malware review, and cron jobs. By noting the applications that are not user-driven, the computing system 110 can help the machine learning model 124 to focus its processing on application that are, in fact, user driven. Additionally, the machine learning model 124 can identify tasks which are user driven and which tasks are system driven.

The computing system 110 can additionally determine which tasks that execute on the server environment 106 communicate back to the client devices. For example, the computing system 110 can determine from the activity data 114 which applications executing on the server environment 106 communicates back to client device 102. For example, the computing system 110 can determine from the activity data 114 that an application corresponding to an online transaction will communicate back to the client device 102 for verification of the transaction. Thus, the computing system 110 can note the applications that communicate back to the client devices in order to ensure that the machine learning model 124 does not generate a shut down instruction while those applications execute. Alternatively, for the applications that do not require communicating back to the client devices in response to executing the request by the client device, the computing system 110 can ensure that the machine learning model 124 considers this when generating a prediction to shut down or power on the server environment 106.

In some implementations, the computing system 110 can retrieve historical activity data 122 from a database to analyze during the analyzing of activity data 114. The historical activity data 122 can come from the same client device as activity data 114. Alternatively, the historical activity data can come from similar client devices to the client device that reported activity data 114. The historical activity data can be retrieved before the current measuring period corresponding to the time when the activity data 114 is retrieved. For example, the historical activity data can be retrieved from various time periods before the current measuring period, such as one year before the current measuring period or 1 month before the current measuring period. Additionally, the historical activity data can be retrieved from a particular time period, such as during the month of April 2017.

The computing system 110 can retrieve historical activity data 122 for a particular client device, such as client device 102, over a particular time period. Alternatively, the computing system 110 can retrieve historical activity data 122 for each client device that connected to the server environment 106 over a particular time period. The time periods for retrieving historical activity data 122 can range over particular intervals, such as during 6:00 AM to 6:00 PM over each day of the month of October 2017. In some implementations, the computing system 110 can retrieve historical activity data 122 during time periods in which the server environment 106 previously received a high number of connection requests or a low number of connection requests from client devices.

The computing system 110 can use this historical activity data 122 to train the machine learning model 124 to recognize when to power on the server environment 106 in the likelihood that the server environment 106 will receive a high number of connection requests from client devices during that times. Additionally, the computing system 110 can retrieve historical activity data 122 during time periods in which the server environment 106 was expected to receive a high number of connection request from client devices, but in fact, received a low number or no connection requests from client devices. This historical activity data 122 can be used to train the machine learning model 124 to more accurately predict when the server environment 106 will receive connection requests from client devices.

In other implementations, the computing system 110 can retrieve historical activity data 122 during time periods in which the server environment 106 previously received a low number of connection requests from client devices. The computing system 110 can use this historical activity data 122 to train the machine learning model 124 to recognize times when to shut down the server environment 106 in the likelihood that the server environment 106 will not receive connection requests from client devices during those times. Additionally, the computing system can retrieve historical activity data 122 during time periods in which the server environment 106 was not expected to receive a high number of connection requests from client devices, but in fact, received a high number of connection requests from client devices. This historical activity data 122 can be used to train the machine learning model 124 to more accurately predict when the server environment 106 will receive connection requests from client devices.

The historical activity data 122 can include data similar to the activity data 114. As previously mentioned, the historical activity data 122 can include activity data over a predetermined period of time corresponding to a particular client device or multiple client devices. For example, the historical activity data 122 can include one or more jobs or processes running on the server environment 106 over a period of 1 month, a type of each of these jobs or processes, the CPU usage, the memory usage, thread count, disk usage, network usage, and GPU during this time period.

In some implementations, the historical activity data 122 can include metadata that describes the historical activity data. For example, the metadata can include the prediction made by the machine learning model 124 during this time period, the number of connection requests, data describing the client device that corresponds to the historical activity data, and a timestamp corresponding to the time period of the historical activity data. In some implementations, a user may embed the metadata in the historical activity data 122. In other implementations, the computing system 110 embeds the metadata in the activity data 114 before storing the activity data in the database.

In some implementations, the computing system 110 provides the analyzed activity data 120 (e.g., generated from the activity data 114 with the embedded metadata and other analyzations) and the historical data 122 to the machine learning model 124. The machine learning model 124 may include one or more neural network layers that are trained to predict a usage likelihood 126 of usage of the server environment 106. The usage likelihood 126 can be a percentage or a number indicating how likely the server environment will be used over a predetermined time period. For example, as illustrated in system 100, based on the analyzed activity data 120 and the historical activity data 122, the machine learning model 124 outputs data indicating a likelihood of 12% that the server environment 106 will be used over the next hour.

In some implementations, the predicted likelihood can include an indication that future use of at least a minimum level will occur over a particular period of time in the future. For example, the likelihood of 12% can indicate that at least a minimum level of 12% of future use of the server environment 106 will occur over the next hour. This can also include an indication that only half of the likelihood (e.g., 6%) is the minimum level of future use of the server environment 106 that will occur over the next hour.

The machine learning model 124 can also provide an indication of a predicted time when the use of the server environment 106 is expected to reach a particular level. For example, the machine learning model 124 can produce a likelihood 126 of 30% over the next three hours. Additionally, the machine learning model 124 can indicate at usage level at different times over the next three hours. For example, at hour 1, the usage level is expected to be 15%, at hour 2, the usage level is expected to be 30%, and at hour 3, the usage level is expected to be 25%. The machine learning model 124 can perform this mapping of usage level to times and provide the mappings to a user for review. Alternatively, the machine learning model 124 can indicate that the usage level of 30% is expected to be the same level across the span of three hours, for example.

In some implementations, a user can set the predetermined time period for the machine learning model 124. The predetermined time period, can be, for example, 1 hour, 2 hours, or 1 day. Alternatively, the predetermined time period can be automatically generated by the computing system 110. The computing system 110 can generate the predetermined time period by analyzing a time period of historical activity data 122 that indicates the highest region of users providing connection requests and/or utilizing the server environment 106.

In response to generating the usage likelihood 126, the computing system 110 stores data corresponding to the predicted usage likelihood 126 in the database. The data corresponding to the predicted usage likelihood 126 includes the analyzed activity data 120, the historical activity data 122 and corresponding metadata, characteristics of the machine learning model 124, and the predicted usage likelihood 126 itself. The computing system 110 can store this data corresponding to the predicted usage likelihood 126 for retraining the machine learning model 124 at a later point in time.

In some implementations, the machine learning model 124 acts as a classifier and produces an indication of whether to shut down or power-on the server environment 106 instead of producing a usage likelihood 126. For example, the machine learning model 124 would output a label that indicates "Shut Down" or "Power On." The final neural network layer of the machine learning model 124 can perform additional processing to convert a likelihood generated by one or more hidden layers of the machine learning model 124 to a classification label.

During stage (C), the computing system 110 applies one or more thresholds, e.g., usage likelihood threshold and user activity threshold, to the usage likelihood 126 of the server environment 106 to determine whether criteria for shut down or power on are satisfied. The computing system 110 uses the one or more thresholds to improve the accuracy of the machine learning model 124's prediction. Thus, the computing system 110 can use a usage likelihood threshold to compare to the output of the machine learning model 124's prediction. For example, if the predicted usage likelihood 126 is less than the usage likelihood threshold set by the computing system 110, then the computing system 110 can generate a "Shut Down" command. Alternatively, if the predicted usage likelihood 126 is greater than the usage likelihood threshold set by the computing system 110, then the computing system 110 can generate a "Power On" command. The computing system 110 can generate a "Restart" command if the server environment 106 is already powered on. Alternatively, the computing system 110 may not generate a "Restart" command if the server environment 106 is already powered on and is connected to one or more client devices.

In some implementations, the computing system 110 may apply other thresholds to the analyzed activity data 120 before generating the instruction to provide to the server environment 106. For example, the computing system 110 may compare activity types from the analyzed activity data 120 to one or more thresholds. If the number of activity types that are user initiated is greater than a threshold, then the computing system 110 can generate a "Power On" or "Restart" command. In another example, if the CPU utilization of the server environment 106 is greater than a predetermined utilization threshold, then the computing system 110 can generate a "Power On" or "Restart" command.

The computing system 110 can rely on other data from the analyzed activity data 120 to compare to threshold values. Thus, the computing system 110 can rely on both the threshold comparison to the usage likelihood 126 and the threshold comparison to the data from the analyzed activity data 120. For example, as illustrated in system 100, the module 128 shows the computing system 110 applying multiple threshold comparisons to various data types before making its determination whether to power on or shut down the server environment 106. For example, module 128 shows the computing system 110 determining that the usage likelihood 126 generated by the machine learning model 124 is less than the usage likelihood threshold. Additionally, the computing system 110 determines that the number of activity types that are user initiated is greater than a threshold. Thus, from these threshold comparisons, the computing system 110 determines to shut down the server environment 106.

Alternatively, if the computing system 110 determined that the usage likelihood 126 is greater than the usage likelihood threshold, then the computing system 110 can determine to power on or restart the server environment 106. The computing system 110 can store the results of the comparison and corresponding usage likelihood threshold value in a database for retraining the machine learning model 124 at a later point in time.

In some implementations, the computing system 110 can also check the status of the server environment 106 before generating an instruction to provide the server environment 106. For example, if the computing system 110 determines using its machine learning model 124 that the server environment 106 needs to be powered on, then the computing system 110 can determine whether the server environment 106 is already powered on. If the computing system 110 determines the server environment 106 is already powered on, the computing system 110 can then generate a "Restart" command to provide to the server environment 106, rather than a "Power On" command. The "Restart" command can be generated if no client devices are connected to the server environment 106. In other cases, the computing system 110 may not provide any instruction to the server environment 106 if the server environment 106 is powered on and client devices are connected to the server environment 106. A "Restart" command may disconnect client devices from the server environment 106 and cease an application the user intended to execute.

In some implementations, administrators monitoring the computer system 110 can provide feedback to the computer system 110 based on its decision-making. For example, administrators can provide ratings to the computer system 110 based on actions of the computer system 110. The ratings can indicate whether the actions of the computer system 110 were correct or incorrect. Based on the ratings provided by the administrator, the computer system 110 can retrain its machine learning model 124 if the computer system 110's actions were incorrect.

During stage (D), the computing system 110 sends an instruction to the cloud computing system 108 causing the server environment 106 to perform the action included within the instruction. The computing system 110 can provide the instruction to the cloud computing system 108 over the network 112. For example, the computing system 110 can provide an instruction 116 to the cloud computing system 108 that instructs the server environment 106 to shut down. Alternatively, the computing system 110 can provide an instruction to the cloud computing system 108 that instructs the server environment 106 to power on or restart, based on a status of the server environment 106. In some implementations, the computing system 110 can provide the instruction directly to the server environment 106 over the network 112, without providing the instruction to the cloud computing system 108.

In some implementations, the instruction can include an indication of which computers at the server environment 106 to shut down or power on. As previously mentioned, the server environment 106 can include one or more computers connected locally or connected over a network. When a client device, such as client device 102, connects to the server environment 106, the client device 102 may particularly only require using two of the ten computers located at the server environment 106, for example. The computing system 110 may instruct the remaining eight computers at the server environment 106 to power down while the client device 102 utilizes the remaining two computers. This conserves resources at the server environment 106.

Before the cloud computing system 108 shuts down the server environment 106 or one or more computers of the server environment 106, the cloud computing system 108 stores a current state information corresponding to the server environment 106 in memory. For example, the computing environment stores, in non-volatile memory, state information that comprises data corresponding to one or more tasks executing at the server environment 106, memory contents stored at the server environment 106, and connections made to the server environment 106 at the server environment 106. Such that, at a later point in time, when the server environment 106 is restarted or powered on, the cloud computing system 108 can load the current state information on the server environment 106. Thus, the server environment 106 can resume the one or more tasks that were running before the server environment 106 was shut down.

By powering down computers not in use at the server environment 106, the server environment 106 conserves resources, such as hardware resources that may be reallocated to other environments, and minimizes its power consumption. For example, the shut down instruction 116 may indicate to the cloud computing system 108 to power down two nodes (e.g., two computers) of the server environment 106 for the next hour. Alternatively, the computing system 110 may instruct only one of the computers of the server environment 106 to power on based on a prediction from the machine learning model 124 that a single client device is predicted to utilize the server environment over the next hour.

During stage (E), the computing system 110 periodically determines a usage likelihood for the server environment

106 and determines when the usage likelihood reaches a minimum threshold value. In some implementations, the computing system 110 polls the server environment 106 at periodic intervals to monitor its status. For example, the computing system 110 polls the server environment 106 every minute, every five minutes, every 15 minutes, every hour, every five hours, or at another rate, to name a few examples. The computing system 110 polls the server environment 106 at periodic intervals to retrieve activity data 114 from the server environment 106, e.g., data indicating current load levels, numbers of users who are active, numbers of tasks being processed, and so on. For example, the computing system 110 communicates with the cloud computing system 108 to retrieve the activity data 114 from the server environment 106. When server environment 106 is shut down, the computing system 110 uses various types of context, e.g., the time of day, errors, failed attempts by users to connect with the server environment 106, and so on to determine a usage likelihood for the server environment 106. Then, the computer system 110 provides the context information to the machine learning model 124 to produce predictions on a periodic basis, and these predictions can be used to determine when to turn on the server environment 106 after it has been shut down.

Each time the activity data 114 is retrieved from the server environment 106, the computing system 110 stores a copy of the activity data 120 in the database. Thus, the activity data 114 stored in the database can be used at a later point in time for potentially re-training the machine learning model 124. Additionally, the computing system 110 analyzes and evaluates the activity data 114. The computing system generates the analyzed activity data 120 from the activity data 114 by embedding metadata into the activity data 120 that includes a type of the task, a computing device in the server environment 106 performed the task requested for by the user, a number of users logged in to the server environment 106, and a number of users logged in to the server environment 106 that are active, to name a few examples. The computing system 110 then retrieves historical activity data 122 from the database that includes previous activity data 114 over various periods of time from the server environment 106. Using the retrieved historical activity data 122 and the analyzed activity data 120 as input to the machine learning model 124, the machine learning model 124 outputs data indicating a likelihood of usage over the next predetermined time period.

For example, the machine learning model 124 generates the usage likelihood 126 to indicate a predicted level of usage over the next predetermined time period, such as an hour. The machine learning model 124 may generate a usage likelihood 126 of 70% indicating that the server environment 106 is expected to experience usage of at least a minimum amount over the next hour. The computing system 110 can store the generated usage likelihood 126 along with the analyzed activity data 120 and the historical activity 122 in the database for retrieving later in further training the machine learning model 124.

During stage (F), the computing system 110 determines that the usage likelihood 126 is sufficiently high to justify providing the server environment 106, so the computing system 110 determines to restart or power on the server environment 106. The computing system 110 compares the usage likelihood 126 to the usage likelihood threshold. For example, the usage likelihood threshold can be a percentage. In response to comparing the usage likelihood 126 to the usage likelihood threshold, the computing system 110 can determine that the usage likelihood 126 of 70%, for example, is greater than the usage likelihood threshold of 50%. For example, module 130 compares the usage likelihood 126 to the usage likelihood threshold. In response, the computing system 110 generates an instruction to power on the server environment 106 since it is 70% likely that a client device will use the one or more computers at the server environment 106. The computing system 110 can generate a power on instruction instead, if the server environment 106 is currently powered off. The computing system 110 may not generate a restart instruction if one or more client devices are currently connected to the server environment 106. The generated instruction can be a message, a text file, a binary representation of a power on instruction, or other data representing a power on instruction.

During stage (G), the computing system 110 sends an instruction to the cloud computing system 108 causing the server environment 106 to power on the server environment 106. Stage (G) is similar to stage (D), in that instructions are sent from the computing system 110 to the server environment 106. The instruction to the cloud computing system 108 is provided over the network 112. In response to the cloud computing system 108 receiving the instruction, the computing system 110 restarts or powers on the server environment 106. In some instances, the computing system 110 restarts or powers on at least one of the computers of the server environment 106 based on the predicted likelihood generated by the machine learning model 124.

In some implementations, the computing system 110 generates an instruction to power on, restart, or power off one or more computers of the server environment 106 based on the usage likelihood 126. The higher the usage likelihood generated by the machine learning model 124, the more likely more computers may be required at the server environment, and consequently, the more computers the computing system 110 will instruct the server environment 106 to power on or restart. For example, if the computing system 110 determines that the usage likelihood 126 is greater than the usage likelihood threshold, the computing system 110 can then determine how many computers of the server environment 106 to turn on or restart. If the usage likelihood 126 is between 100% and 90%, for example, then the computing system 110 can instruct the cloud computing system 108 to power on each of the computers at the server environment 106. If the usage likelihood 126 is between 89% and 80%, the computing system 110 can instruct the cloud computing system 108 to power on half of the computers of the server environment 106. Additionally, if the usage likelihood 126 is less than 80% (while still being greater than the usage likelihood threshold), the computing system 110 can instruct the cloud computing system 108 to power on one or two of the computers of the server environment 106. Other ranges and corresponding amount of computers to turn on or shut down is possible. A user interacting with the computing system 110 or the cloud computing system 108 can set the percentages and number of computers to power on at the server environment 106. Alternatively, the user can indicate that each of the computers at the server environment 106 power on each time the usage likelihood 126 is greater than the usage likelihood threshold.

Over a period of time, the computing system 110 can power on and off the server environment 106 based on user activity utilization of the server environment 106, total utilization of the server environment 106, and a user activity threshold. For example, visualization 132 depicts how the server environment 106 operates. As shown in visualization 132, the computing system 110 can predict using its machine learning model 124 from time 0 to time $T_1$, the server environment 106 is to be powered on; from time $T_1$ to time $T_2$ the server environment 106 is to be powered off, and after time $T_2$ the server environment 106 is to be powered on.

The computing system 110 can transmit an instruction to the cloud computing system 108 to power off the server environment 106 at time $T_1$ until time $T_2$. At time $T_2$, the cloud computing system 108 can automatically power on the server environment 106. Alternatively, the computing system 110 can transmit an instruction to the cloud computing system 108 to power on the server environment 106 at time $T_2$. Based on the trend of user activity utilization and the total utilization from time $T_0$ to after time $T_2$ as shown in visualization 132, the computing system 110 correctly predicted when to power off on power on the server environment 106.

As shown from time $T_0$ to time $T_1$, the total utilization and the user activity utilization of the server environment 106 is greater than the user activity threshold. Once the user activity utilization dips below the user activity threshold, as shown at time $T_1$, the computing system 110 instructs the server environment 106 to shut down from time $T_1$ to time $T_2$. The computing system 110 instructs the server environment 106 to shut down based on the indication that the user activity utilization is below the user activity threshold during time $T_1$ to time $T_2$. During the time after time $T_2$, the user activity utilization and the total utilization slowly begin to increase until the utilization crosses the user activity threshold indicating that the usage on the server environment 106 is increasing.

Various techniques can be used to train machine learning models. When server environments are automatically stopped and restarted, there will be periods of unavailability for stopped environments. Data indicating how user requests line up with periods of unavailability can be used to fine-tune the predictions and commands of the system. When a user or client device attempts to access a shut-down server environment, the request can be considered to be an "out-of-band" request. The computing system 110 can detect when out-of-band requests are performed, e.g., when user-initiated requests are sent while the server environment 106 is unavailable due to the computing system 110's instruction. The timing of the requests and the previous and subsequent load levels of server environment can be used to update the training of machine learning models to keep the server environment active to capture more requests similar to out-of-band requests detected.

As another example, the cloud computing system 108 may receive a notification from the computing system 110 that the server environment 106 is shut down for the next five hours. The cloud computing system 108 can execute shutting down the server environment 106. However, after two hours have passed, the cloud computing system 108 determines that the server environment 106 has received multiple connection requests from client device 102 and client device 104, opposite to the prediction generated by the machine learning model 124 at the computing system 110. The cloud computing system 108 can log these receipts from the client devices and log the disparity between the prediction and the actual connection requests from the client devices. In response, the cloud computing system 108 can transmit a notification of the disparity to the computing system 110 to further train its machine learning model 124.

The computing system 110 can refine its machine learning model 124 to correct for the incorrect prediction of shutting down the server environment 106 when multiple connection requests were received from the client devices. For example, the computing system 110 can provide the data used by the machine learning model 124 to generate the prediction that the server environment 106 is not expected to receive the connection request from one or more client devices over the next hour, an indication that an out-of-band request was received during this hour period, and data used to modify the characteristics of the machine learning model 124 to generate the correct prediction. The correct prediction includes an indication that at least one request will be received by the server environment 106 during the five hour long period.

In another example, the cloud computing system 108 may receive a notification from the computing system 110 that the server environment 106 is to power on because the server environment 106 is expected to receive a connection request from one or more client devices over the next hour. However, after the hour has passed, the cloud computing system 108 determines that the server environment 106 did not receive a single connection request from a client device, opposite to the prediction generated machine learning model 124 at the computing system 110. The cloud computing system 108 can log these this notification of the disparity between the computing system 110's instruction and in response, transmit the notification of the disparity to the computing system 110 to further train its machine learning model 124.

The computing system 110 can retrain its machine learning model 124 to correct for the erred prediction of power on the server environment 106 when no connection requests were received from the client devices. Similar to the previous example, the computing system 110 can provide the data used by the machine learning model 124 to generate the prediction that the server environment 106 is expected to receive connection requests during the time period, an indication that no requests were received during the time period, and data used to modify the characteristics of the machine learning model 124 to generate the correct prediction. The correct prediction includes an indication that no requests will be received during the time period.

In some implementations, the computing system 110 predicts whether to shut down or power on the server environment 106 for a predetermined period of time in order to reduce the amount of time the client devices connect to the server environment 106. The client devices may have to pay money to the server environment 106 or another third party system in order to use the services provided by the server environment 106. The services can include online storage, online payment, or foreign language translation, to name a few examples.

Figure 2:
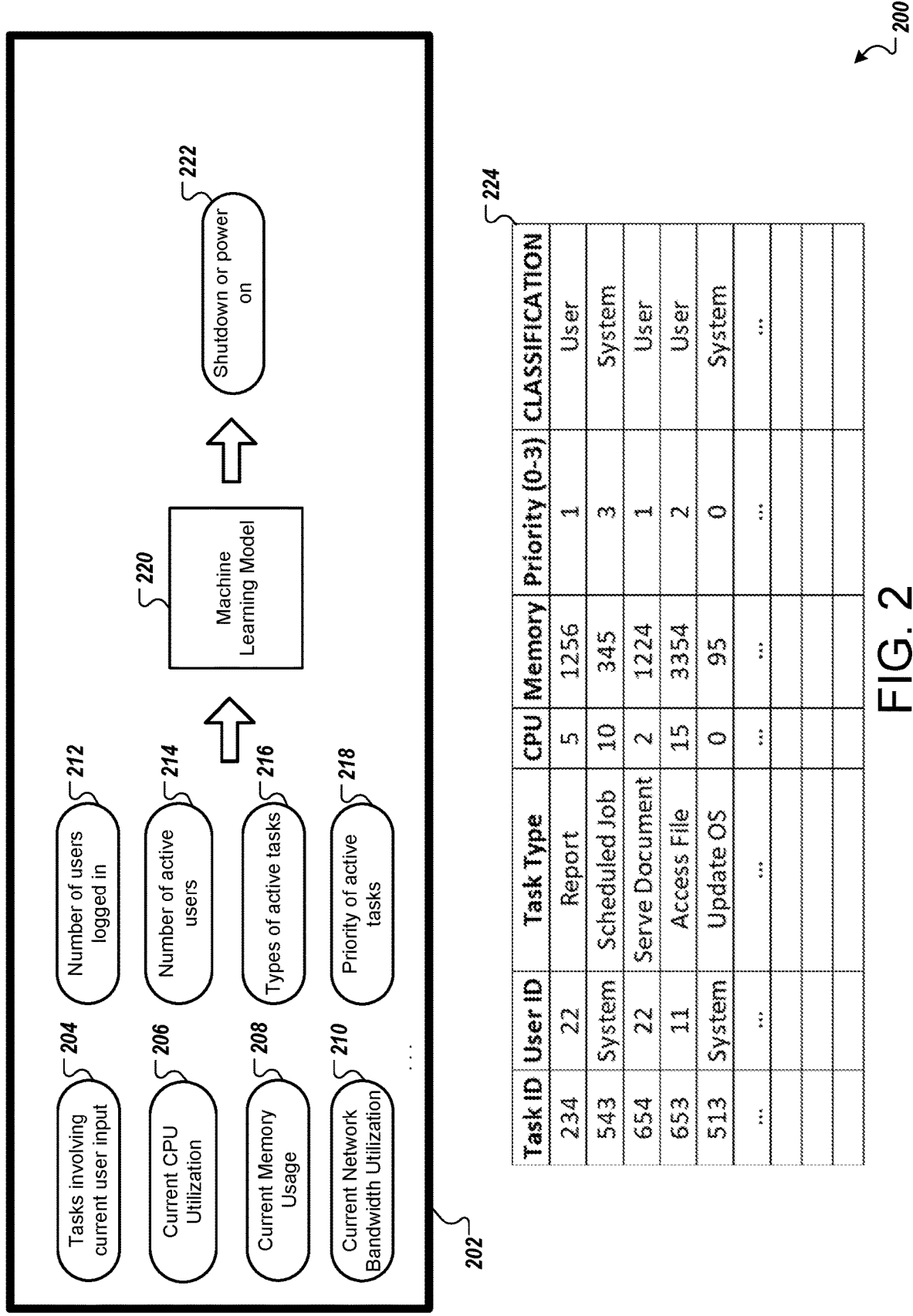
FIG. 2 is a diagram that illustrates an example of monitoring the characteristics of the server environment to generate a power command.

FIG. 2 is a diagram that illustrates an example of a system 200 for monitoring the characteristics of the server environment to generate a power command. The system 200 occurs on the computing system 110. The module 202 included in system 200 illustrates the various inputs to provide to a machine learning model 220 for training and implementation.

For example, the computing system 110 retrieves activity data 114 from the server environment 106. The activity data 114 is parsed and analyzed into different data sets. For example, as illustrated in system 200, the data sets can include tasks involving current user input 204, current CPU utilization 206, current memory usage 208, and current network bandwidth utilization 210. Additionally, the data sets can include a number of users logged in 212, a number of active users 214, a type of active tasks 216 and a priority level of active tasks 218. The computing system 110 can additionally include historical activity data retrieved from a database to provide to the machine learning model 220.

Other data sets can be provided to the machine learning model 220, such as GPU processing utilization and data indicative of reports generated from the activities.

The machine learning model 220 can generate data that represents a likelihood of usage at the server environment 106. The data representing the likelihood of usage can be a percentage or a number from 0 to 100, for example. The computing system 110 can compare the data representing the likelihood of usage to a usage likelihood threshold to determine an instruction 222, to either shut down or power on the server environment 106. In some implementations, the machine learning model 220 can be a classifier that outputs an indication of whether to shut down or power on the server environment 106.

In some implementations, the training of the machine learning model 220 can be performed by the computing system 110. The computing system 110 can use one or more techniques to train the machine learning model 220 to generate a prediction of usage at the server environment 106. For example, the computing system 110 can provide the data sets 204 through 218 and others to the machine learning model 220 to generate an output likelihood that matches a known output. The computing system 110 can retrieve historical activity data 122 that indicates a 100% usage data over a one-hour period on a particular day. The computing system 110 can provide the historical activity data 122 as training data to the machine learning model 220 and compare its output to the 100% usage data over the one-hour period. If the computing system 110 determines the machine learning model 220 does not output a 100% usage data likelihood from historical activity data 122, then the computing system 110 adjusts the characteristics of the machine learning model 220 and reapplies the historical activity data 122 as input until the machine learning model 220 outputs a 100% usage data likelihood. The computing system 110 iteratively performs this process on the machine learning model 220 with each historical activity data 122 stored in the database.

During implementations, the computing system 110 can provide the analyzed activity data 120 (e.g., from the activity data 114) to the trained machine learning model 220 to generate a likelihood of usage over a subsequent predetermined time period. In some implementations, the analyzed activity data 120 can be data sets 204 through 218 analyzed over the current time. The likelihood of usage can be compared to one or more thresholds, e.g., user activity threshold and usage likelihood threshold, to generate a shut down, power on, or restart command to provide to the server environment 106.

Table 224 can include the activity data corresponding to the server environment 106. The table 224 can be retrieved by the computing system 110 from the server environment 106. The table 224 can include a task ID, a user ID, a task type, CPU utilization, memory utilization, a priority ranking, and a classification. For example, the first row of table 224 includes a task ID of 224, a user ID of 22, and a task type of a report. Additionally, task ID 234 consumes 5% CPU utilization, memory consumption of 1256 bytes, a priority ranking of 1, and classification of the actor that initiated the task, such as the user. The processor of the server environment 106 can designate the task ID, the user ID, and the task type. The CPU utilization can include a percentage or a number. In some implementations, the memory utilization can instead be a memory address where the task takes place in the memory of the server environment 106. The priority ranking indicates to the CPU a priority of importance in completing the task.

Figure 3A:
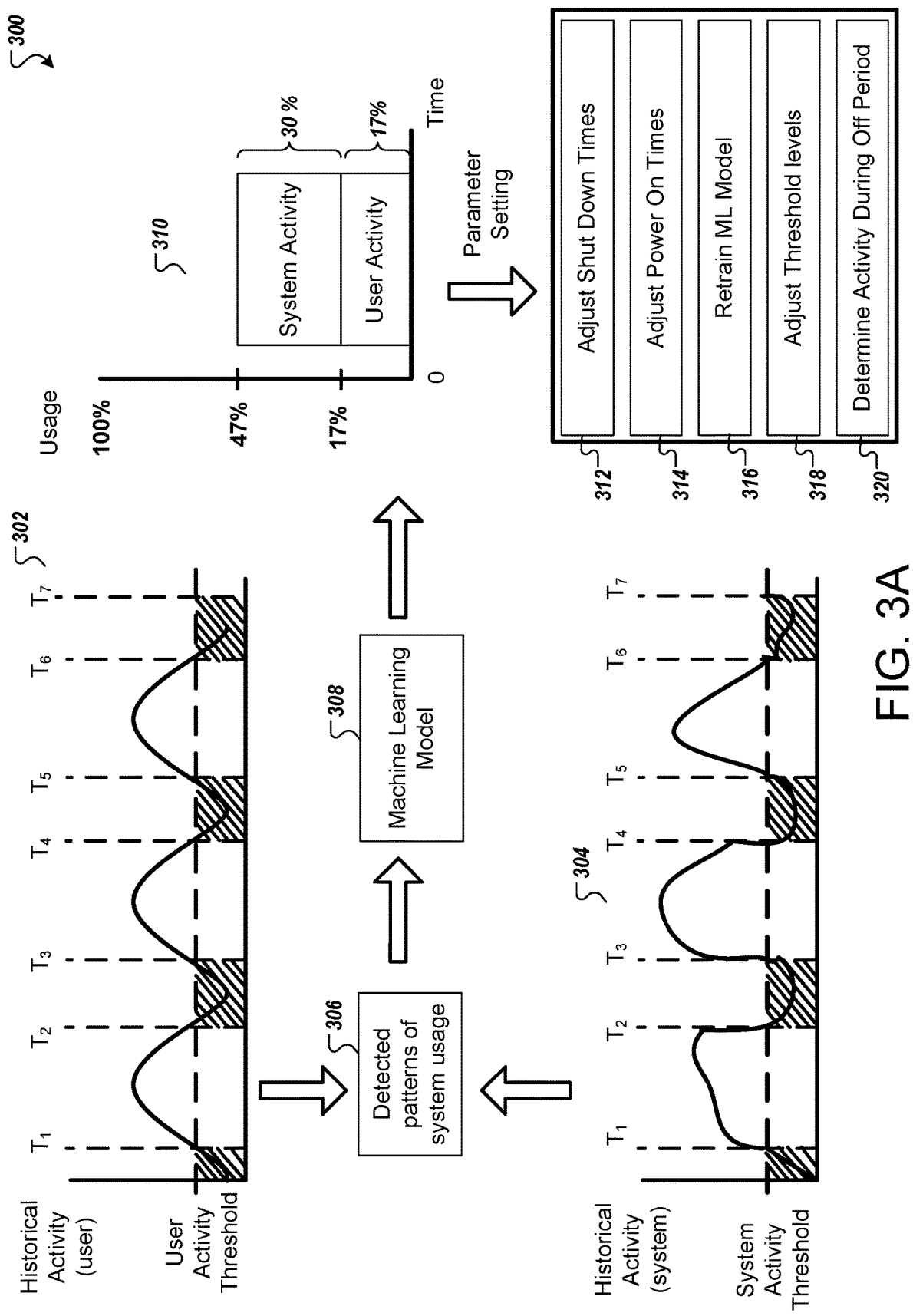
FIG. 3A is a diagram that illustrates an example of monitoring user activity and system activity of the server environment.

FIG. 3A is a diagram that illustrates an example of a system 300 for monitoring user activity and system activity of the server environment. As illustrated in system 300, visualizations 302 and 304 illustrates historical user activity and historical system activity, respectively. For example, these visualizations can be displayed to the user interfacing with the computing system 110. As shown in visualization 302, from time 0 to time $T_7$, the user activity changes in a cyclical pattern. From times 0 to $T_1$, $T_2$ to $T_3$, $T_4$ to $T_5$, and $T_6$ to $T_7$ an amount of user activity at the server environment 106 is below the user activity threshold. Similarly, from times $T_1$ to $T_2$, $T_3$ to $T_4$, and $T_5$ to $T_6$, an amount of user activity data 114 at the server environment 106 is above the user activity threshold.

As shown in visualization 304, the system activity from time 0 to time $T_7$ is not a cyclical pattern, but random. However, from times 0 to $T_1$, $T_2$ to $T_3$, $T_4$ to $T_5$, and $T_6$ to $T_7$ an amount of system activity at the server environment 106 is below the system activity threshold. Similarly, from times $T_1$ to $T_2$, $T_3$ to $T_4$, and $T_5$ to $T_6$, an amount of system activity at the server environment 106 is above the system activity threshold. The system activity threshold is different from the user activity threshold.

The computing system 110 can detect patterns 306 in the user activity and the system activity and provide those patterns 306 to the machine learning model 308. For example, the patterns 306 can include a frequency of activity (e.g., system and user) being above a system activity threshold, frequency of activity being below the system activity threshold, the types of activity, amount of activity at any given time, and how the user activity corresponds to the system activity.

The user activity shown in the visualization 302 can include an amalgamation of application activity that is initiated by a user. For example, this can include CPU utilization, memory utilization, GPU utilization, network bandwidth utilization, and thread count corresponding to user initiation of an application. The user-initiated activity can be analyzed over a predetermined period of time, such as a day, a week, or a month. The system activity shown in the visualization 304 can include an amalgamation of application activity that is initiated by the server environment 106 without user initiation. For example, the system initiated activity can include similar characteristics to that of the user activity but corresponds to system initiation of an application or process.

The computing system 110 provides the detected patterns 306 to the machine learning model 308. The computing system 110 can provide the detected patterns 306 to train the machine learning model 308 to output a likelihood of usage at the server environment 106. Alternatively, the detected patterns 306 can be provided to the machine learning model 308 to output a likelihood of usage at the server environment 106 during its implementation. In some implementations, the machine learning model 308 can output a prediction of likelihood corresponding to the user usage and a prediction of likelihood corresponding to the system usage based on the input provided. For example, if the computing system 110 provides a detected pattern 306 of system usage, the computing system 110 can output a likelihood of system usage at a later point in time. Similarly, if the computing system 110 provides a detected pattern 306 of user usage, the computing system 110 can output a likelihood of user usage for a later point in time. The result of likelihoods of both system and user activity can be plotted on a graph, such as graph 310. The machine learning model 308 can output an indication of 30% likelihood of system usage over the next hour and output an indication of 17% of user usage over the next hour. The computing system 110 can compare each indication of usage (e.g., user and system) to one or more thresholds, e.g., user activity threshold, system activity threshold, and usage likelihood threshold, to determine whether to shut down, power on, or restart the server environment 106.

During training, once the machine learning model 308 generates the likelihood of the system or user usage, the computing system 110 can take one or more additional steps to improve the prediction of the machine learning model 308. The computing system 110 can adjust shut down times 312, adjust power on times 314, retrain the machine learning model 316, adjust threshold levels, and determine activity during off period 320. For example, adjusting shut down times 312 can include adjusting when to shut down the server environment 106 and how long to shut down the server environment 106. The computing system 110 can adjust the shut down times in response to determining how often the computing system 110 has shut down the server environment 106 in the past and if any out-of-band requests were received during that shut down period. The computing system 110 can adjust the shut down times to reduce the amount of out-of-band requests are received during a shut down period.

Adjusting power on times 314 can include adjusting when to power on the server environment 106, how long to keep the server environment 106 powered on, and whether to restart the server environment 106 if already powered on or to power on the server environment 106 if the server environment 106 is turned off. The computing system 110 can adjust the power on times in response to determining how often the computing system 110 has powered on the server environment 106 in the past and not received any requests from client devices to connect. The computing system 110 can adjust the power on times to reduce the amount of opportunities the server environment 106 remains idle when powered on. Thus, the computing system 110 can improve its ability to predict when to shut down and power on the server environment 106.

As previously mentioned, the computing system 110 can retrain the machine learning model 308. The computing system 110 may retrain the machine learning model 308 to improve its prediction ability by correcting for erred predictions. For example, receiving out-of-band requests during a powered off server environment 106, not receiving any requests during a powered on server environment 106, or to adjust the settings of the machine learning model 308 to generate more accurate predictions.

In some implementations, the computing system 110 may train a separate machine learning model for different server environments 106. For example, a machine learning model 308 may be trained for a first server environment and another machine learning model may be trained for a second server environment. By training a particular machine learning model for a corresponding server environment, the machine learning model can be more accurate in predicting when to shut down or power on the corresponding server environment. Alternatively, if the computing system 110 trains a single machine learning model for various server environments, the single machine learning model may require a longer training period. Additionally, the single machine learning model may not generate accurate predictions for various server environments.

The computing system 110 can also adjust threshold levels 318. In some implementations, the computing system 110 can adjust the values of the user initiated activity threshold and the usage likelihood threshold. A user may adjust the values of each of the thresholds to ensure the computing system 110 is more accurate or less accurate in its predictions. A user may adjust the values of the thresholds to be less accurate in order to gather data for future training of the machine learning model 308. Additionally, the computing system 110 can determine activity during off periods 320. As previously, activity during off periods 320 can include out-of-band requests while the server environment 106 is powered off.

Figure 3B:
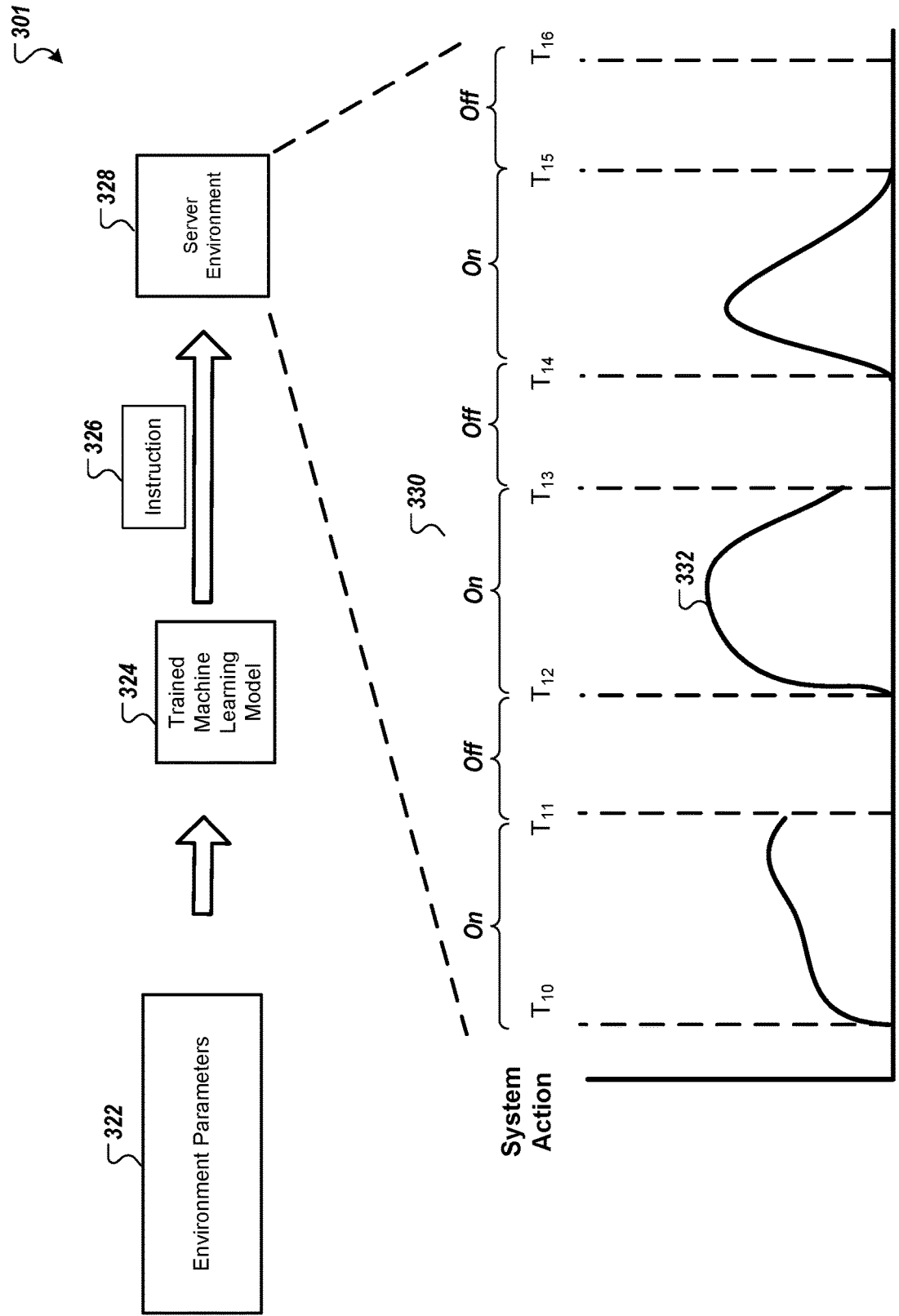
FIG. 3B is a diagram that illustrates an example generating a power command using a trained machine learning model.

FIG. 3B is a diagram that illustrates an example of a system 301 for generating a power command using a trained machine learning model 324. The system 301 can occur on the computing system 110. Once the computing system 110 finishes training the machine learning model 308 from system 300, the computing system 110 can implement a trained version of the machine learning model 324 in practice. For example, as illustrated in system 301, the computing environment 101 provides environment parameters 322 to the trained machine learning model 324.

The environment parameters 322 include the data from the analyzed activity data 120, from system 100. For example, the environment parameters 322 can include tasks involving current user input, current CPU utilization, current memory usage, current network bandwidth utilization, number of users logged in, number of active users, types of active tasks, and priority of active tasks. Other inputs can be provided, such as patterns of user usage and system usage over a period of time, as well as a number of users that are currently logged in the server environment 106 but not active.

The trained machine learning model 324 can output a likelihood of usage over a subsequent predetermined period of time. The computing system 110 can compare the likelihood of usage to one or more predetermined thresholds, e.g., user activity threshold or usage likelihood threshold. Based on the comparison of the likelihood of usage to the predetermined threshold, the computing system 110 generates an instruction 326 to provide to the server environment 328. For instance, the computing system 110 generates an instruction to power down the server environment 328 if the likelihood of usage is less than the predetermined threshold. Alternatively, the computing system 110 generates an instruction to restart or power on the server environment 328 if the likelihood of usage is greater than the predetermined threshold.

As illustrated in system 301, the server environment 328 has a pattern of usage illustrated by visualization 330. For example, from times $T_{10}$ to $T_{11}$, $T_{12}$ to $T_{13}$, and $T_{14}$ to $T_{14}$ the server environment 328 is instructed to power on. Alternatively, from times $T_{11}$ to $T_{12}$, $T_{13}$ to $T_{14}$, and $T_{15}$ to $T_{16}$ the server environment 328 is instructed to power off. During those time periods, the visualization 330 illustrates usage activity 332 that varies over time. The usage activity is based on the current CPU utilization, current memory usage, current network bandwidth utilization, GPU utilization, number of active tasks, and the types of active tasks, to name a few examples. The computing system 110 instructs the server environment 328 to power on and power off during the time periods shown in the visualization 330.

Figure 4:
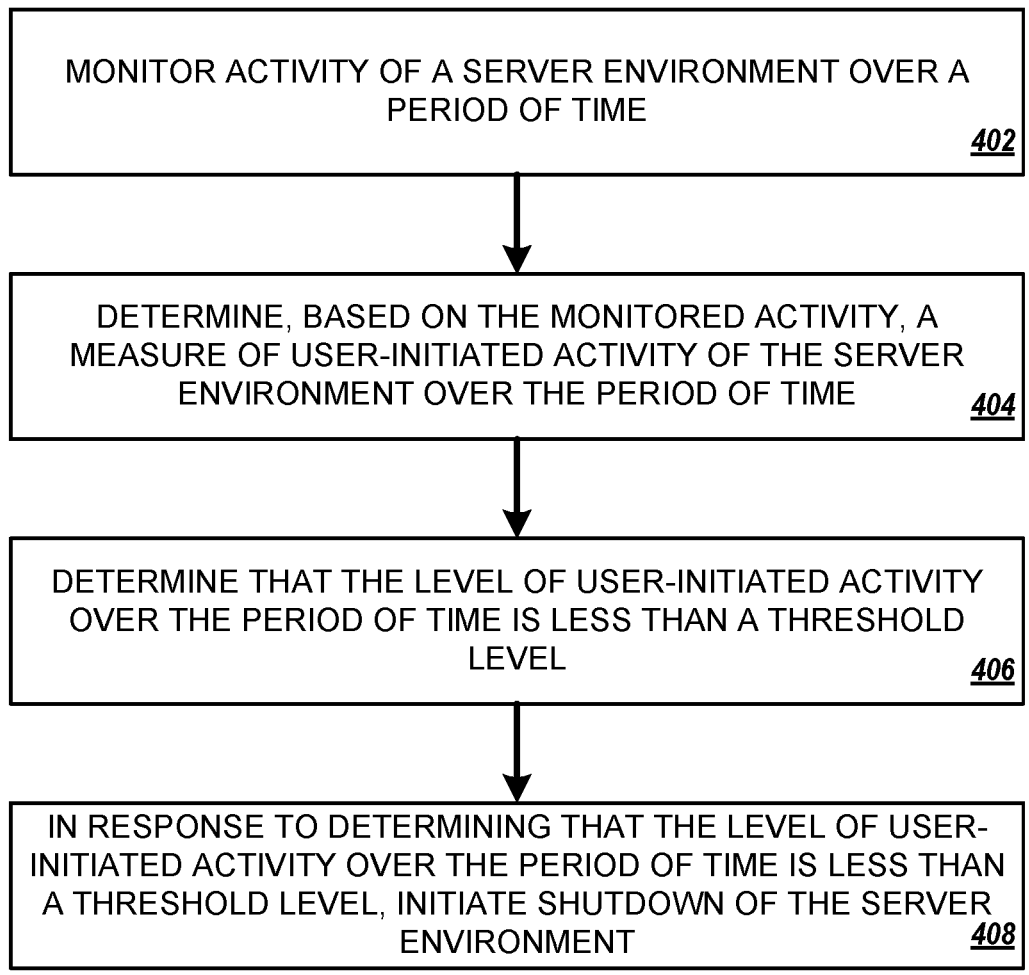
FIG. 4 is flow diagram that illustrates an example of a process for managing a server environment based on activity of the server environment.

FIG. 4 is flow diagram that illustrates an example of a process 400 for initiating a shut down of the server environment based on activity of the server environment.

During step 402, the computer system monitors activity of a server environment over a period of time. This includes receiving activity data corresponding to connection requests to the server environment, utilization of the server environment based on the requests from the client devices, and activity data corresponding to server environment. For example, the activity data executing on the server environment can include one or more jobs or processes running on the server environment, the types of jobs executing on the server environment, the types of inputs received at the server environment, and when the inputs are received at the server environment. Additionally, the activity data can include CPU usage, memory usage, thread count, disk usage, network usage, and GPU usage.

The computer system can also retrieve data corresponding to the processes performed on the computer environment. The data can include a number of users logged in to the server environment 106, a number of idle users that are logged in to the server environment 106, a number of currently active user sessions, a number of applications executing corresponding to each user logged in to the server environment 106, and a type of each of the applications or tasks that are executing on the server environment 106. Other data can be retrieved from the server environment 106, such as GPU processing data, network processing data, and memory usage information corresponding to each application executing on the server environment 106. The type of active sessions can include a scheduled activity or a user initiated activity.

During step 404, the computer system determines, based on the monitored activity of the server environment, a measure of user-initiated activity of the server environment over the period of time. The computer system evaluates the monitored activity data to determine applications that are user driven, which applications communicate back to the client devices, and retrieves historical activity data from a database. The historical activity data can be retrieved from various time periods before the current measuring period. Additionally, the computing system can retrieve historical activity data from a particular time, such as during the month of January 2015.

In some implementations, the computing system provides the analyzed activity data and the historical data to a machine learning model located at the computing system. The machine learning model can output a likelihood of usage of the server environment over a predetermined time period. For example, the usage of the server environment can include user initiated use of the server environment or system initiated use of the server environment. The likelihood can be, for example, 65% that user initiated activity will occur at the server environment within the next hour. The predetermined time period can be set by a user or automatically generated by the computer system based on previous activity time frames at the server environment.

During step 406, the computer system determines that the level of user-initiated activity over the period of time is less than a threshold level. The computer system can compare a usage likelihood threshold to the output of the machine learning model's prediction. For example, if the predicted likelihood is less than the usage likelihood threshold set by the computing system, then the computing system can generate a "Shut Down" command. Alternatively, if the predicted likelihood is greater than the usage likelihood threshold set by the computing system, then the computing system can generate a "Power On" command. The computing system can generate a "Restart" command if the server environment is already powered on.

During step 408, in response to determining that the level of user-initiated activity over the period of time is less than a usage likelihood threshold level, the computer system initiates shut down of the server environment. Once the computing system has determined that the level of user-initiated activity over the period of time is less than the usage likelihood threshold level, the computing system provides an instruction to the computing environment over the network. The computing system provides an instruction to the computing environment that instructs the server environment to power down. In some implementations, the computing system provides the instruction directly to the server environment to power down.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 5:
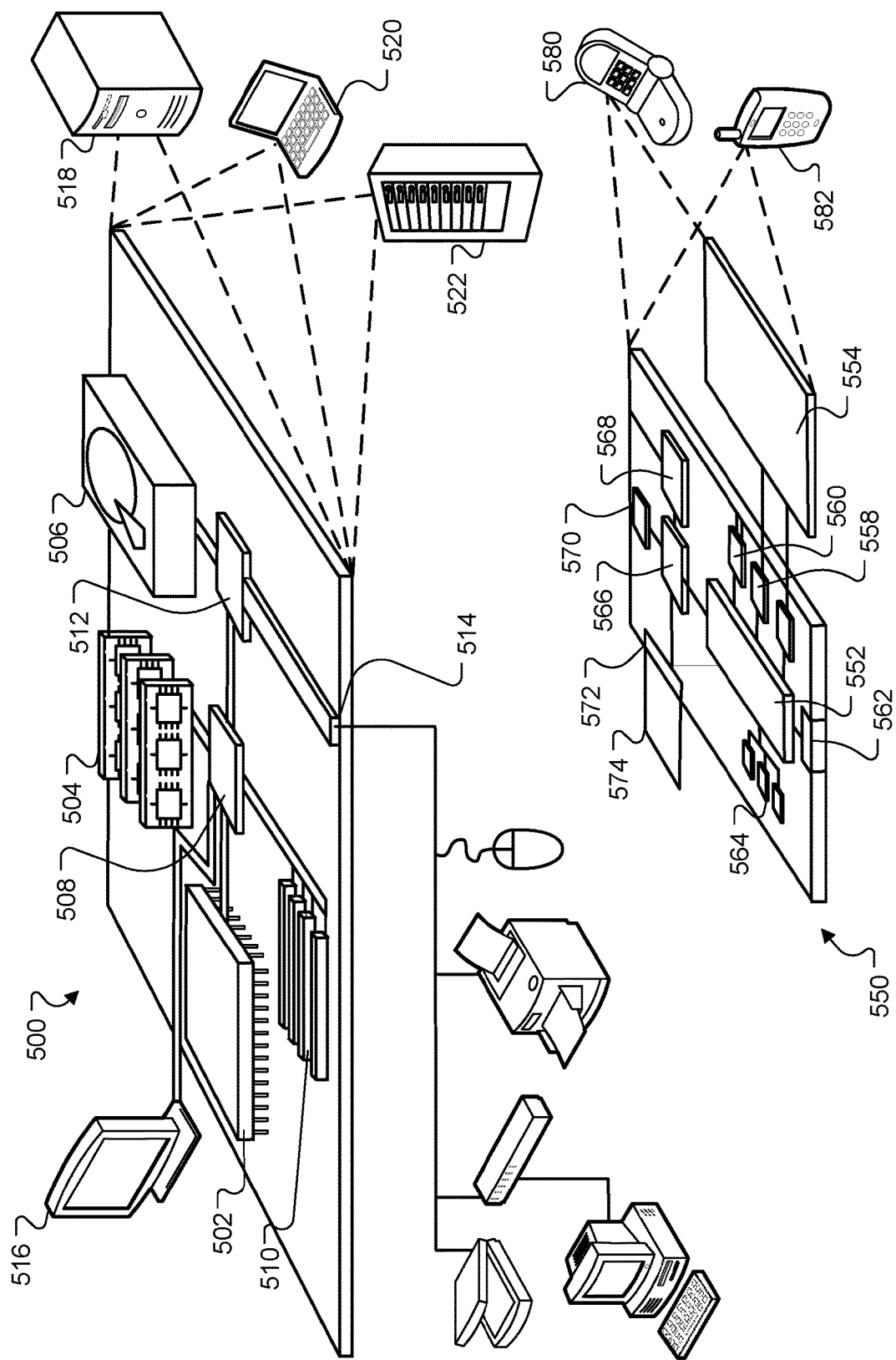
FIG. 5 shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 518, or multiple times in a group of such servers. In addition, it may be implemented in a personal computer such as a laptop computer 520. It may also be implemented as part of a rack server system 522. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Figure 6A:
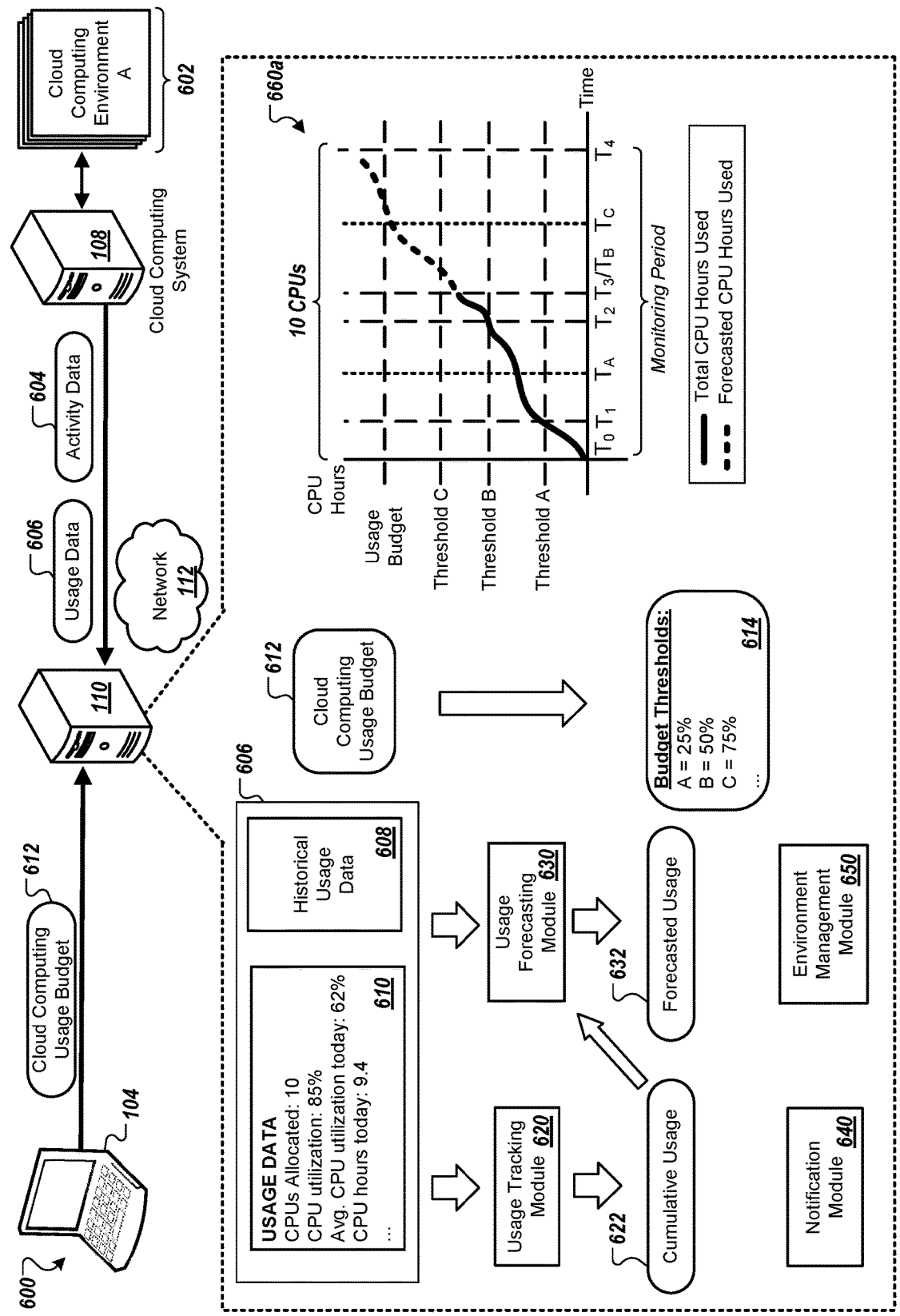
FIGS. 6A-6C are diagrams that illustrate an example of a system for environment monitoring and management.
Figure 6B:
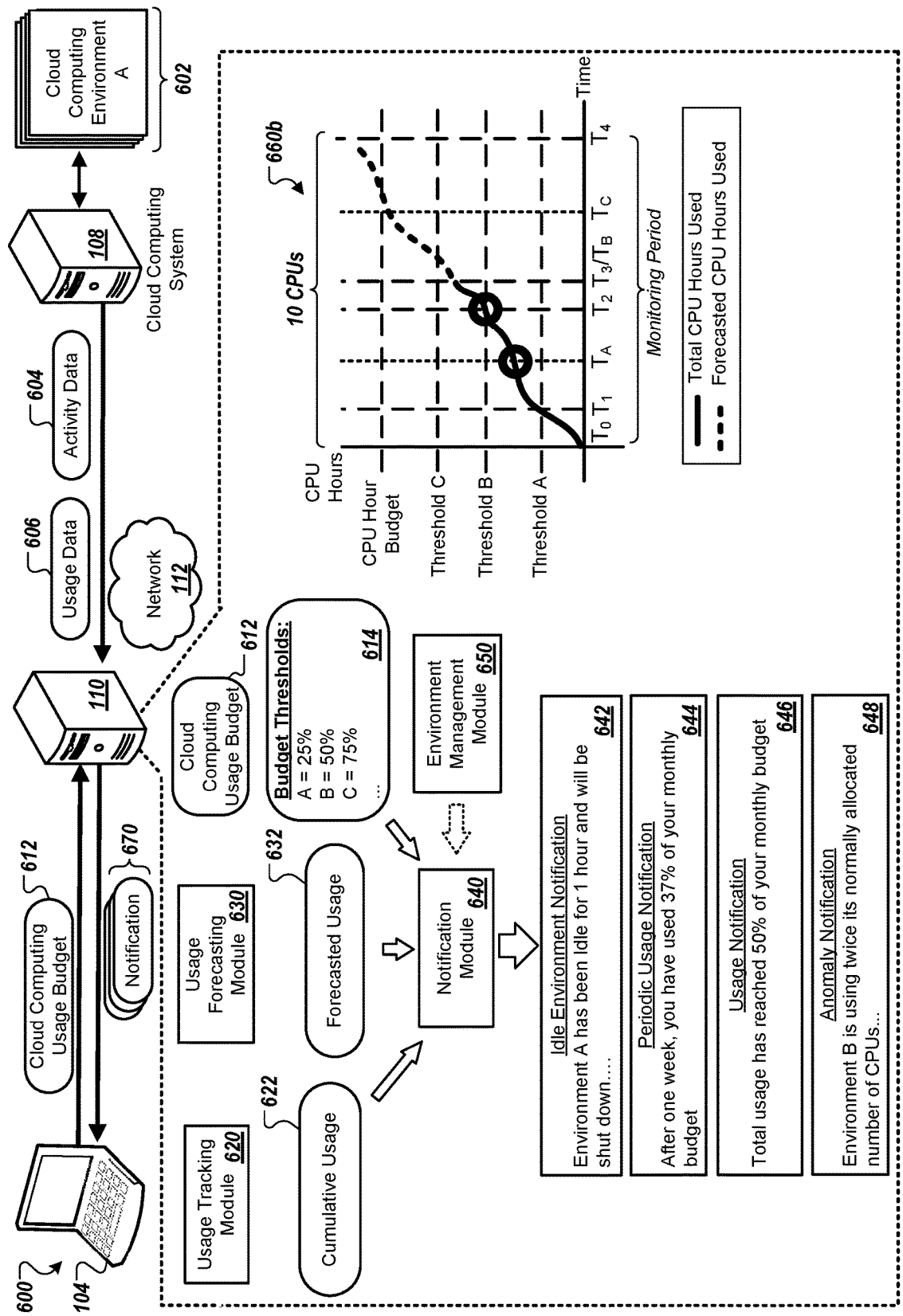
Figure 6C:
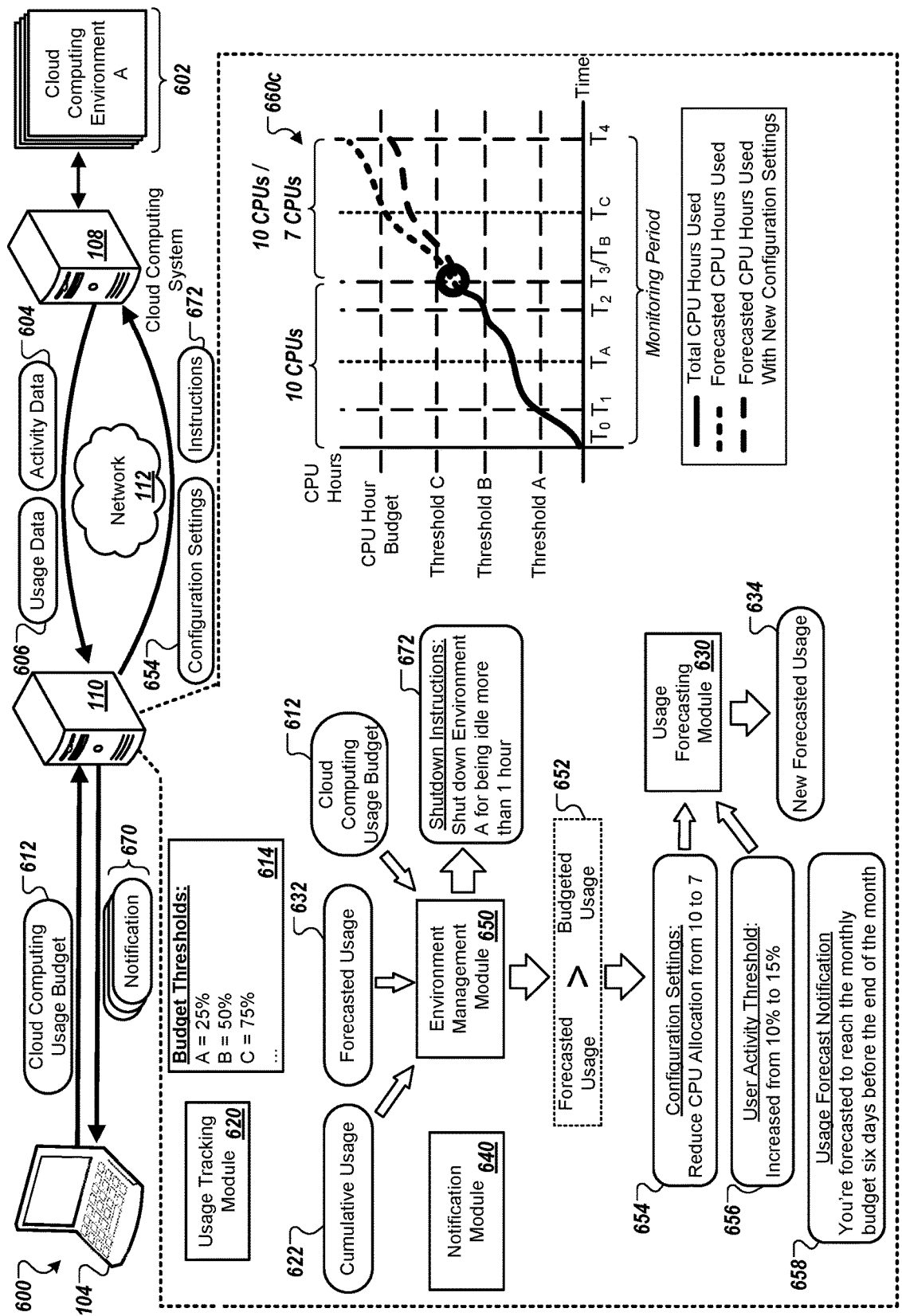

FIGS. 6A-6C are diagrams that illustrate an example of a system 600 for environment monitoring and management. The system 600 includes a client device 104, the cloud computing system 108, cloud computing environments 602, the computing system 110, and the network 112. The cloud computing environments 602 can include multiple server environments.

In some implementations, the system 600 is the system 100 shown in FIG. 1. The cloud computing environments 602 can include the server environment 106.

The computing system 110 can include a usage tracking module 620, a usage forecasting module 630, a notification module 640, and an environment management module 650. These modules cooperate to monitor usage and The usage tracking module 620 can be used by the computing system 110 to track and aggregate usage of the cloud computing environments 602 and/or subsets of the cloud computing environments 602. For example, the computing system 110 can use the usage tracking module 620 to measure and record usage levels of cloud computing resources by the cloud computing environments 602 over time.

The subsets of the cloud computing environments 602 can include related groups of cloud computing environments. The cloud computing environments that make up a subset of the cloud computing environments 602 can be related in that they each correspond to one or more of an organization, a department, a user, an administrator, etc. For example, a subset of the cloud computing environments 602 can include an Environment A and an Environment B due to each of them being managed by an Administrator A.

The subsets of the cloud computing environments 602 can include dynamic sets. For example, a first subset of the cloud computing environments 602 can include all cloud computing environments for a particular organization. A second subset of the cloud computing environments 602 may include all cloud computing environments for a particular department of the organization. As an example, the first subset of the cloud computing environments 602 can include an Environment C, an Environment D, and an Environment E. The Environment C, the Environment D, and the Environment E can be assigned to an Organization A having two departments, Department A and Department B. The second subset of the cloud computing environments can include only the Environment E that is also assigned to the Department B of the Organization A. Both the first subset and the second subset can be dynamic in that any new or existing cloud computing environments that are newly assigned to the Organization A and/or the Department B result in the first subset and/or the second subset being updated. For example, if a new cloud computing environment, Environment F, is run and assigned to the Department B, both the first subset and the second subset of cloud computing environments would be updated to reflect the addition of the Environment F. Similarly, if any cloud computing environments are unassigned from the Organization A and/or the Department B, the first subset and/r the second subset are updated.

The usage tracking module 620 can track and aggregate the usage levels with respect to the subsets of the cloud computing environments 602. For example, continuing the previous example, the usage tracking module 620 can track and aggregate the usage levels of cloud computing resources by the first subset of cloud computing environments and the second subset of cloud computing environments. Specifically, the usage tracking module 620 can generate, for example, a data table for the first subset of cloud computing environments that includes the Environment C, the Environment D, and the Environment E. The usage tracking module 620 can fill the data table with usage levels measured in each of the three environments over time. The usage tracking module 620 can aggregate the usage levels to identify a total amount of cloud computing resources used by the first subset, and/or can aggregate the usage levels over a particular time period to identify a total amount of cloud computing resources used by the first subset in the time period. The usage tracking module 620 can also associate particular data entries (e.g., particular recordings of usage levels of the cloud computing environments) with other information, such as one or more of the time of day, the number of active users, the CPU utilization of the corresponding cloud computing environment, the date, the current week, the current month, or the current year. This information can be useful for the Organization A as it can indicate the Organization A's usage of cloud computing resources, usage efficiency (e.g., when compared to user activity levels, a usage budget, a usage plan, etc.), usage patterns unique to the organization (e.g., unique to employees of the Organization A, customers of the Organization A, and/or users of the Organization A's systems, etc.), spending on cloud computing resources, etc.

The usage tracking module 620 can include and/or use one or more machine learning algorithms. Additionally or alternatively, the usage tracking module 620 can include and/or use one or more static algorithms. These algorithms can be used to, for example, normalize the tracked usage levels based on one or more of the number of active users, the time of day, the current day, the current week, the current month, the current year, allocation of resources (e.g., the number of CPUs, the amount of memory such as RAM, the amount of storage, network resources, etc.), or additional factors (e.g., recent events that are likely to have a temporary effect on usage levels).

The usage forecasting module 630 can be used by the computing system 110 to estimate usage of the cloud computing environments 602 at one or more points in the future. For example, the computing system 110 can use the usage forecasting module 630 to predict the amount of the cloud computing resources that will be used by the first subset of the cloud computing environments 602 over the next two weeks. The usage forecasting module 620 can include and/or use one or more machine learning algorithms. The machine learning algorithms can be used to identify usage patterns, e.g., for the cloud computing environments 602 as a whole and/or for subsets of the cloud computing environments 602. Additionally or alternatively, the machine learning algorithms can be used in determining a forecasted usage of the cloud computing environments 602 or a forecasted usage of subsets of the cloud computing environments 602, e.g., over a particular time period by using previously identified usage patterns that indicate recent usage trends and/or historical usage trends for the time period. Additionally, or alternatively the usage forecasting module 620 can include and/or use one or more static algorithms. The static algorithms can be used in determining a forecasted usage of the cloud computing environments 602 or a forecasted usage of subsets of the cloud computing environments 602, e.g., over a particular time period by using previously identified usage patterns that indicate recent usage trends and/or historical usage trends for the time period.

The notification module 640 can be used by the computing system 110 to generate and/or send notifications. The notifications can correspond to tracked and/or forecasted cloud computing usage. The notification module 640 can include and/or use one or more machine learning algorithms. The notification module 640 can include and/or use one or more static algorithms.

The environment module 650 can be used by the computing system 110 to perform one or more managerial actions with respect to the cloud computing environments 602 or a subset of the cloud computing environments 602. The managerial actions can include actions to reduce usage of cloud computing resources by the cloud computing environments 602 or a subset of the cloud computing environments 602. For example, the managerial actions can include modifying the configuration settings for the cloud computing system 108 (e.g., resulting in the modification of the cloud computing resources, such as number of CPUs, amount of memory, amount of storage, and/or network resources, allocated to the cloud computing environments 602 or allocated to a subset of the cloud computing environments 602). As described in more detail with respect to FIG. 10, the managerial actions can include actions to turn on or turn off the cloud computing environments 602 or a subset of the cloud computing environments 602. As described in more detail with respect to FIG. 11, the managerial actions can include actions to reserve cloud computing resources or to modify an existing reservation for cloud computing resources, e.g., based on the output of the usage forecasting module 630. As described in more detail with respect to FIG. 11, the managerial actions can include actions to enable or disable the reservation of unused cloud computing resources (e.g., cloud computing server instances that are unused by a cloud computing resources provider, such as Amazon AWS).

The managerial actions can also include, for example, generating and/or sending notifications. The notifications can indicate managerial actions that have been taken by the computing system 110 (e.g., through the environment module 650). For example, as described in more detail below with respect to FIGS. 7-8, the notifications can indicate that the cloud computing environments 602 or a subset of the cloud computing environments 602 are idle, will be shut down, and/or have been shut down (e.g., by the computing system 110). Similarly, the notifications can indicate that the cloud computing environments 602 or a subset of the cloud computing environments 602 will be turned on or have been turned on (e.g., by the computing system 110). The notifications can request input from one or more users, such as an administrator of the cloud computing environments 602 or of a subset of the cloud computing environments 602. For example, as described in more detail below with respect to FIG. 10, a shutdown notification can request that an administrator acknowledge the shutdown of the cloud computing environment 602 or of a subset of the cloud computing environments 602. Similarly, a shutdown notification or a startup notification can request or provide an option for an administrator to override the planned shutdown or startup respectively.

The managerial actions can also include, for example, modifications to criteria for performing other managerial actions. For example, the environment module 650 can be used by the computing system 110 to change thresholds to perform other actions (e.g., turn on or off a cloud computing environment, generate and send a notification to an administrator of a cloud computing environment, etc.).

In general, "usage" refers to utilization of cloud computing resources and/or cloud computing services. As an example, usage can refer to the amount or percentage (e.g., relative to the cloud computing resources reserved, relative to the cloud computing resources expected to be used based on a usage plan or a usage budget, etc.) of CPU hours used, memory (e.g., RAM) used, storage used, and/or network resources used. Usage can be a measure of cumulative resources used over a period of time, rather than a utilization level at a moment in time. Nevertheless, the same techniques used to track usage, forecast usage, notify users about usage and trends, and manage usage (e.g., by reducing, delaying, or otherwise changing an amount of resources consumed) can be used to similarly track current utilization, forecast utilization, notify users about current utilization levels and trends, and manage utilization, e.g., with respect to a maximum peak utilization budget or target. In some implementations, usage can refer to the cost to reserve cloud computing resources. In some implementations, usage can refer the cloud computing resources used in a defined time period, or in multiple defined time periods. For example, different usage measures may respectively indicate a current utilization of cloud computing resources, a previous utilization of cloud computing resources, an average utilization of cloud computing resources over a period of time, a cumulative use of cloud computing resources in a period of time, etc. For example, the usage data 606 provided by the cloud computing system 108 can include recent usage data 610. The recent usage data 610 can include, for example, the most recent recording of CPU utilization by the cloud computing system 108 (e.g., 85%), the average CPU utilization by the cloud computing system 108 over a period of time (e.g., 62% average utilization since 12:00 am), the cumulative CPU hours over a period of time (e.g., 9.4 CPU hours spent since 12:00 am), etc. Although the various examples use CPU hours to measure usage, the techniques herein can use other units or types of measurements for budgets, tracking, forecasts, notifications, and displayed information. For example, in some implementations, budgets, forecasts, and tracking measures are expressed in terms of financial cost, allowing a user to determine how usage of cloud computing resources compares to a financial budget of a user or organization allocated for cloud computing services.

As an example, stored and/or calculated usage data can indicate the allocation of cloud computing resources, e.g., resources allocated to the cloud computing system 108 for the cloud computing environments 602. For example, the usage data 606 provided by the cloud computing system 108 can indicate the number of CPUs allocated to the cloud computing system 108 for the cloud computing environments 602 (e.g., ten CPUs), a subset of CPUs allocated to cloud computing system 108 for the cloud computing environments 602 that are currently being used (e.g., four of the twelve CPUs), maximum CPU hours for the cloud computing environments 602 or a subset of the cloud computing environments 602 in a given time period, the amount of memory (e.g., RAM) allocated to the cloud computing environments 602 or a subset of the cloud computing environments 602, an amount of storage allocated to the cloud computing environments 602 or to a subset of the cloud computing environments 602, network resources allocated to the cloud computing environments 602 or to a subset of the cloud computing environments 602, a storage volume, a database instance, virtual private cloud (VPC) resources, etc.

As an example, stored and/or calculated usage data can indicate historical usage. Historical usage can include past utilization of cloud computing resources, past utilization averages of cloud computing resources over a period of time, and/or past cumulative uses of cloud computing resources in a period of time. Historical usage can additionally refer to past allocation of cloud computing resources. For example, the usage data 606 can include historical usage data 608. The historical usage data 608 can indicate, for example, the average CPU hours spent per day by the cloud computing system 108 for the cloud computing environments 602 in each of the past three months. The historical usage data 608 can indicate one or more usage patterns, e.g., that can be detected by the usage forecasting module 630 as described in more detail below. For example, the historical usage data 608 can indicate that the average CPU utilization by the cloud computing system 108 for the cloud computing environments 602 on weekdays between 8:00 pm and 12:00 am is typically 12% (e.g., between 10% and 14% with a standard of deviation of two).

The computing system 110 can receive and store usage data from the cloud computing system 108, including the usage data 606. The usage data, such as the usage data 606, can indicate the usage of the cloud computing environments 602 or a subset of the cloud computing environments 602 (e.g., that correspond to a particular company or other organization, a particular department of the company, a particular group of users such as those that are assigned to a specific project, or a particular user, etc.). The stored usage data can indicate patterns of usage of cloud computing environments (e.g., specific users, specific environments, or project/department/organization level, etc.). In some implementations, the usage data is converted into one or more normalized values before being stored.

In some implementations, the computing system 110 communicates with the cloud computing system 108 through an application programing interface (API). As an example, the usage data 606 can be sent by the cloud computing system 108 to the computing system 110 in response to the computing system 110 sending an API command corresponding to usage data to the cloud computing system 108. Accordingly, the usage data 606 can be a response or be part of a response to a received API command. The API command can include one or more credentials that are associated with one or more of the cloud computing environments 602. For example, the API command can include a credential (e.g., an environment ID) for an Environment A, an Environment B, and an Environment C, allowing for the collection of usage data with respect to these three cloud computing environments. The API command can include one or more identifiers (e.g., account numbers, environment IDs, user IDs, etc.) that indicate one or more of the cloud computing environments 602 that usage data (or other data) should be accessed and retrieved from. Other API commands can include an API command to retrieve status data from one or more of the cloud computing environments 602. The status data may indicate, for example, whether a given cloud computing environment is running/has been started or is stopped/has been shut down.

The computing system 110 can store various credentials associated with the cloud computing environments 602. These credentials can allow the cloud computing system 108 to access and retrieve data associated with the cloud computing environments (e.g., status data, usage data, etc.). These credentials may be provided to the computing system 110 by the client device 104 and/or by other client devices. The computer system 110 can include one or more credentials in API commands that it sends to the cloud computing system 108, that allow the cloud computing system 108 to access and extract data from a subset of cloud computing environments.

The computing system 110 can store identifiers associated with the cloud computing environments 602. These identifiers can include, for example, account numbers, environment IDs, user IDs (e.g., an identification of a user managing one or more of the computing environments 602), etc. These identifiers may be provided to the computing system 110 by the client device 104 and/or by other client devices. The computer system 110 can include one or more identifiers in API commands that it sends to the cloud computing system 108, that allow the cloud computing system 108 to identify a subset of cloud computing environments to access and extract data from.

In some implementations, users can create and run their cloud computing environments directly with the cloud computing system 108 (e.g., directly with the cloud provider).

In some implementations, users can create and run their cloud computing environments through the computing system 110. That is, the computing system 110 can act an intermediary between users and the cloud computing system 108. For example, the computing system 110 can receive instructions to create and run a new cloud computing environments. In response, the computing system 110 can send an API command to the cloud computing system 108 to spin up a new cloud computing environment. The API command can specify the configuration of the new cloud computing environment, such as, for example, the number of CPUs that should be allocated to the environment, the amount of memory that should be allocated to the environment, etc.

In general, computing environments refer to instances of virtual machines. The instances can run applications on the infrastructure of a cloud computing provider (e.g., Amazon AWS). The instances can each have configuration settings that provide, for example, one or more of a number of CPUs allocated, an amount of memory (e.g., RAM) allocated, an amount of storage allocated, or the networking resources allocated to the respective instance. The configuration settings can be defined by a third-party with respect to the cloud computing provider, such as by the computer system 110.

As shown in FIG. 6A, the computing system 110 receives a cloud computing usage budget 612 from the client device 104. The cloud computing usage budget 612 can indicate, for example, an amount of usage that is planned or budgeted for the cloud computing system 108 to use for the cloud computing environments 602. The cloud computing usage budget 612 can also indicate a period of time that the budget corresponds to, e.g., a monitoring period such as a particular day, week, month, etc.

The cloud computing usage budget 612 can specify the budgeted amount of usage in any of various ways, for example, in terms of CPU hours, monetary cost, number of virtual machines or virtual machine execution hours, etc. For example, the cloud computing usage budget 612 can indicate the total CPU hours budgeted for the cloud computing environments 602 over the next day, week, month, etc. As another example, the cloud computing usage budget 612 can indicate a total monetary amount that can be spent on cloud computing resources for the cloud computing environments 602 over the next day, week, month, etc.

The computing system 110 can use the cloud computing usage budget 612 to determine one or more budget thresholds 614. The budget thresholds 614 can include one or more percent thresholds that each correspond to a percentage of the cloud computing usage budget 612. For example, the budget thresholds can include a Threshold A that is 25% of the cloud computing usage budget 612, a Threshold B that is 50% of the cloud computing usage budget 612, and a Threshold C that is 75% of the cloud computing usage budget 612. The computing system 110 can assign a time to each of the thresholds in the budget thresholds 614. For example, the computer system 110 can use the usage forecasting module 630 to determine a first time in the monitoring period when it expects the Threshold A to be met (e.g., $T_A$), a second time in the monitoring period when it expects the Threshold B to be met (e.g., TB), and a third time in the monitoring period when it expects the Threshold C to be met (e.g., Tc). The budget thresholds 614 can be charted on a graph 660a that shows the measured and forecasted cumulative usage of cloud computing resources during the monitoring period. As will be described in more detail below with respect to FIG. 6B, the computer system 110 can generate and/or send a notification when a threshold of the budget thresholds 114 is met or exceeded.

The computing system 110 can the usage data 606 and/or activity data 604 in determining cumulative usage 622 within the monitoring period and forecasted usage 632 for the monitoring period. The computing system 110 can receive the activity data 604 and the usage data 606 from the cloud computing system 108, e.g., over the network 112. The activity data 604 can indicate, for example, the number of active users of the cloud computing environments 602 (e.g., current activity level), the average number of active users of the cloud computing environments 602 over a period of time (e.g., average activity level), past user activity levels, past average user activity levels, identifications of users (e.g., of currently active users, or past users).

The computer system 110 can use the usage tracking module 620 to determine a cumulative usage 622, e.g., the cumulative amount of usage so far within the current monitoring period. For example, the computer system 110 can provide the usage data 606 as input to the usage tracking module 620. The usage tracking module 620 can output the cumulative usage 622 as output. The cumulative usage 622 can be the measured usage of the cloud computing system 108 (e.g., the measured usage of cloud computing resources of the cloud computing system 108 that are allocated for the cloud computing environments 602) in a monitoring period. For example, the cumulative usage 622 can include an indication of the number of CPU hours cumulatively spent in the current day, week, month, etc. As another example, the cumulative usage 622 can indicate a total cost incurred so far during the monitoring period by the computing environments 602.

The usage tracking module 620 may be configured to monitor cloud computing usage for a particular company or other organization, for a particular department in the company, for a particular group of users (e.g., working on a particular project), etc. For example, the usage tracking module 620 may be configured to monitor cloud-computing usage for a department of a company. This may include tracking aggregate usage for the department as a whole, as well as tracking usage for individual projects, users, or of a subset of the cloud computing environments 602. A planned usage level can be set for the department for the time period, such as a budgeted amount of resources for a month. The usage tracking module 620 can provide a periodic report of usage, such as by sending a daily message to client devices of administrators that shows the cumulative usage for the month and the planned usage for the month. The usage tracking module 620 can also provide forecasted usage information, for example, an indication of the department's expected total usage at the end of the month, determined based on a trend of the department's usage at the beginning of the month and/or the department's usage in prior months.

Continuing with this example and as described in more detail below, the computer system 110 can also provide forecasted usage information using the usage forecasting module 630, for example, an indication of the department's expected total usage at the end of the month, determined based on a trend of the department's usage at the beginning of the month and/or the department's usage in prior months.

Continuing with this example and as described in more detail below with respect to FIG. 6B, the computer system 110 may additionally or alternatively send alerts to in response to certain conditions being met, such as the department's cumulative usage for the month reaching 50%, 75%, or 100% of the planned usage. The computer system 110 can notify individual users in the department of their own usage, planned usage levels, and forecasts for the environments that they use or manage. These and other features of the computer system 110 can assist the department in using the cloud computing resources more efficiently.

Planned usage levels can include, for example, priority levels (e.g., for job types), expected computations, machine learning acceleration, required RAM, storage (e.g., large memory) capacity, required CPU numbers, expected CPU hours, amount and/or type of resources to reserve in advance, etc.

Continuing with this example and as described in more detail below with respect to FIG. 6C, the computer system 110 may also take actions to enforce usage plans or usage limits, such as by detecting and limiting anomalous usage, reducing the amount of environments running, reducing the duration that environments run, and limiting the amount of computing resources allocated to individual environments.

The usage tracking module 620 can periodically request and/or receive usage data from the cloud computing system (e.g., every five minutes, every thirty minutes, every hour, every day, etc.), and can determine a corresponding usage to date as a result of each analysis. The outputs of the usage tracking module 620 can be stored in the computing system 110. The usage tracking module 620 can normalizing recently received usage data, e.g., using its stored outputs. Accordingly, the outputs of the usage tracking module 620 can be normalized values. The usage data can be normalized by the usage tracking module 620 based on, for example, one or more of the number of active users, the time of day, the current day, the current week, the current month, the current year, allocation of cloud computing resources (e.g., the number of CPUs, the amount of memory such as RAM, the amount of storage, network resources, a storage volume, a database instance, virtual private cloud (VPC) resources, etc.), or additional factors (e.g., recent events that are likely to have a temporary effect on usage levels). The outputs of the usage tracking module 620, e.g., that each include a usage to date, can be stored by the computing system 110 as part of the historical usage data 608. The outputs of the usage tracking module 620 can indicate one or more usage patterns, e.g., that can be detected by the usage forecasting module 630 as described in more detail below.

As an example, the outputs of the usage tracking module 620 (e.g., each including a usage to date) are shown in the graph 660a. The time $T_0$ corresponds to a start time of a monitoring period (e.g., the start of the day, the start of the week, the start of the month, etc.). The time $T_4$ corresponds to an end time of the monitoring period (e.g., the end of the day, the end of the week, the end of the month, etc.). The time $T_3$ corresponds to a current time, e.g., a time when the cumulative usage 622 is generated by the usage tracking module 620. The outputs of the usage tracking module 620, including the usage to data 622, can be used to track the usage of resources by the cloud computing system 108 for the cloud computing environments 602 (e.g., the cumulative CPU hours) over time in the monitoring period. For example, the cumulative usage 622 can indicate that the about 70% of the budgeted CPU hours have been used by the cloud computing system 108 for the cloud computing environments 602.

In some implementations, in determining the cumulative usage 622, the usage tracking module 620 uses the activity data 604 as input. The cumulative usage 622 outputted by the usage tracking module 620 can indicate, for example, the average cloud computing resources used per user/hundred users/thousand users in the monitoring period. For example, the cumulative usage 622 can indicate that at time $T_3$ an average of 0.21 CPU hours are being used per active user during the current week. This can indicate how efficiently and/or effectively the cloud computing resources are being used.

The computer system 110 can use the usage forecasting module 630 to determine the forecasted usage 632. The forecasted usage 632 can indicate, for example, the expected total usage of cloud computing resources (or expected total cost for cloud computing resources) by the end of the monitoring period. For example, the forecasted usage 632 can indicate that the usage forecasting module 630 expects that the cloud computing usage budget 612 will be exceeded by 15% by the end of the monitoring period unless one or more actions are taken. The forecasted usage 632 can additionally or alternatively indicate the expected usage of cloud computing resources (or expected accrued cost of cloud computing resources) at one or more future points in time prior to the end of the monitoring period. For example, the forecasted usage 632 can indicate a time when the usage forecasting module 630 expects that the Threshold C will be met or exceeded, a time when the usage forecasting module 630 expects that the cloud computing usage budget 612 will be met or exceeded, etc.

The usage forecasting module 630 can determine the forecasted usage 632 using the usage data 606 and the cumulative usage 622 as input. For example, the computer system 110 can provide the usage data 606 as input to the usage forecasting module 630. Similarly, the usage tracking module 620 can provide the cumulative usage 622 as input to the usage forecasting module 630. In determining the forecasted usage 632, the usage forecasting module 630 can analyze the usage data 606 to detect one or more usage patterns. For example, the usage forecasting module 630 can analyze the historical usage data 608 to determine usage trends given, for example, a time of day, a day of the week, weekday versus weekend, the month, the season, the occurrence of a holiday, the occurrence of an event, etc. In detecting one or more usage patterns, the usage forecasting module 630 can treat more recent historical usage data (e.g., usage data collected within the last six months, within the last month, within the last week, within the current monitoring period, etc.) and/or the recent usage data 610 with a higher confidence than older usage data (e.g., usage data collected over a year ago, collected over six months ago, collected over a month ago, collected over a week ago, collected outside of the current monitoring period, etc.).

As an example, the forecasted usage 632 is shown in the graph 660a. The graph 660a shows that the usage forecasting module 630 expects, based on the usage data 606 and the cumulative usage 622 of about 70% of the budgeted CPU hours, that the cloud computing usage budget 612 will be used before the end of the monitoring period and/or that cloud computing usage budget 612 will be exceeded by approximately 15% by the end of the monitoring period.

In some implementations, in determining the forecasted usage 632, the usage forecasting module 630 uses the activity data 604 as input. The activity data 604 may include historical activity data, e.g., historical activity data of the cloud computing environments 602. The usage forecasting module 630 can use the activity data 604 to, for example, determine an expected number of active users for the rest of the monitoring period, and/or an expected average active time for each of the expected active users for the rest of the monitoring period. The forecasted usage 632 can indicate the expected average usage of cloud computing resources per expected user/hundred expected users/thousand expected users. For example, the forecasted usage 632 can indicate that an average of 0.16 CPU hours are expected to be used per expected active user for the rest of the monitoring period. This can indicate how efficiently and/or effectively the cloud computing resources are expected to be used.

As shown in FIG. 6B, the computing system 110 generates and sends notifications 670 to client devices, such as the client device 104. The notifications 670 can be directed to one or more users or administrators that use the client devices, such as the client device 104, or that can access information through the client devices, such as the client device 104. Each of the one or more administrators can be an administrator of the cloud computing system 108 and/or of at least one of the cloud computing environments 602. The computing system 110 can send the notifications 670 to the client devices, such as the client device 104, over the network 112. The computer system 110 can send the notifications in the notifications 670 to the client devices, such as the client device 104, at different times and/or in response to different triggers.

As an example, the computer system 110 can generate a notification warning that an Environment X and an Environment Y have been idle for one hour. The computer system 110 can identify a User X as the administrator of both the Environment X and the Environment Y. The computer system 110 can identify the client device 104 as a device of the User X. The computer system 110 can proceed to send the idle notification to the User X over the network 112.

Administrators can be users who create, run, and/or manage one or more of the cloud computing environments 602. In managing the cloud computing environments 602, administrators can, for example, control the configuration settings of the cloud computing environments 602, or approve/deny a suggested change to the configuration settings of the cloud computing environments 602. In managing the cloud computing environments 602, administrators can, for example, start up or shut down the cloud computing environments 602, or approve/deny the start up or shut down of the cloud computing environments 602. In addition to administrators, users can also include passive users that can access or otherwise use the cloud computing environments 602.

The computing system 110 can use the notification module 640 to generate the notifications 670. For example, the notification module 640 can receive the cumulative usage 622, the forecasted usage 632, and/or the budget thresholds 614 as input. The notification module 640 can use one or more of the cumulative usage 622, the forecasted usage 632, and/or the budget thresholds 614 in generating a notification of the notifications 670. The notification module 640 can optionally receive the usage data 606 and/or the activity data 604 as input. The notification module 640 can optionally receive the output of the environment management module 650 as input. The notification module 640 can use the usage data 606 and/or the activity data 604 in generating a notification of the notifications 670.

The notification module 640 can use the cumulative usage 622, the usage data 606, and/or the activity data 604 to detect that one or more of the cloud computing environments 602 has been idle for a threshold amount of time (e.g., thirty minutes, one hour, two hours, etc.). As will be described in more detail below with respect to FIG. 6C, the threshold amount of time can correspond to one or more actions to be performed by the computing system 110 (e.g., through the notification module 240). In response to detecting that the one or more of the cloud computing environments 602 have been idle for a threshold amount of time, the computing system 110 (e.g., through the environment management module 250) can start performing the one or more actions. For example, the threshold amount of time can trigger the computing system 110 (e.g., through the notification module 240 and/or the environment management module 250) to perform at least one of the following: shut down one or more of the cloud computing environments 602, start a countdown timer for when one or more of the cloud computing environments 602 are to be shut down, generate and send a notification indicating that one or more of the cloud computing environments 602 have been shut down, or generate and send a notification indicating that one or more of the cloud computing environments 602 are to be shut down at a future point in time (e.g., unless a response is received) about the idle environment. The notification should be generated and sent to an administrator (e.g., sent to the client device 104).

In determining if a cloud computing environment is idle, the computing system 110 (e.g., through the notification module 240 and/or the environment management module 250), can compare the CPU utilization for the cloud computing environment over the past threshold amount of time (e.g., thirty minutes, one hour, two hours, etc.) with a threshold CPU utilization (e.g., 5%, 10%, 20%, etc.). Comparing the CPU utilization for the cloud computing environment over the past threshold amount of time with the threshold CPU utilization can include the computing system 110 using the usage data 606 to determine that an average CPU utilization over the past threshold amount of time is below the threshold CPU utilization. For example, the environment management module 250 can determine that the average CPU utilization for the Environment A over the past hour was 8%, can compare the average utilization of 8% during the threshold amount of time to a threshold CPU utilization of 10% to determine that the Environment A has been idle for the threshold amount of time, can provide an indication of the average utilization of 8% and/or an indication that the Environment A has been idle for the threshold amount of time to the notification module 240, and/or can shut down the Environment A in response to determining that the Environment A has been idle for the threshold amount of time.

Alternatively, comparing the CPU utilization for the cloud computing environment over the past threshold amount of time with the threshold CPU utilization can include the computing system 110 using the usage data 606 to determine that the CPU utilization over the past threshold amount of time has remained below the threshold CPU utilization. For example, the environment management module 250 can determine that the CPU utilization for the Environment A over the past hour did not rise above 8%, can compare the maximum utilization of 8% during the threshold amount of time to a threshold CPU utilization of 10% to determine that the Environment A has been idle for the threshold amount of time, can provide an indication of the maximum utilization of 8% and/or an indication that the Environment A has been idle for the threshold amount of time to the notification module 240, and/or can shut down the Environment A in response to determining that the Environment A has been idle for the threshold amount of time.

In some implementations, the environment management module 650 detects that one or more of the cloud computing environments 602 has been idle for a threshold amount of time and notifies the notification module 640 of the detection.

In response to determining that one or more of the cloud computing environments 602 have been idle for a threshold amount of time, the notification module 640 can generate an idle environment notification 642. For example, the notification module 640 can generate the idle environment notification 642 in response to detecting that the Environment A has been idle for one hour.

As an example, the idle environment notification 642 can provide that the Environment A of the cloud computing environments 602 has been idle for one hour and will be (or has been) automatically shut down (e.g., by the computing system 110 sending shutdown instructions to the cloud computing system 108). The idle environment notification 642 can include an indication of the amount of time that the Environment A has been idle for. The idle environment notification 642 can include an indication that the shutdown of the Environment A will occur unless a response overriding the shutdown is received, e.g., from an administrator of the Environment A and/or of the cloud computing system 108. The idle environment notification 642 can include an indication that the Environment A can be restarted upon receipt of a response to restart the Environment A. The idle environment notification 642 can include an indication of the time when the shutdown of the Environment A will occur (e.g., a future time when the computing system 110 will instruct the cloud computing system 108 to shut down the Environment A). The idle environment notification 642 can include an indication of the time remaining until the shutdown of the Environment A will occur (e.g., time remaining until the computing system 110 instructs the cloud computing system 108 to shut down the Environment A). The idle environment notification 642 can include an indication of a time or a range of times when the Environment A will be restarted (e.g., a future time or range of times when the computing system 110 will instruct the cloud computing system 108 to restart the Environment A).

The notification module 640 can use the cumulative usage 622 and/or the forecasted usage 632 to generate a periodic usage notification 644. The notification module 640 can generate periodic usage notifications, such as the periodic usage notification 644, at periodic intervals. Accordingly, the notification module 640 can generate the periodic usage notification 644 in response to determining that a threshold amount of time corresponding to an interval of the periodic intervals has passed since a previous time, e.g., since the start of the monitoring period or since the immediately preceding periodic usage notification was generated by the notification module 640. The periodic intervals can include, for example, intervals of twelve hours, of one day, of one week, of one month, etc. The periodic intervals can be determined from the monitoring period. For example, the periodic intervals can include intervals of one day if the monitoring period is for one week. Similarly, the periodic intervals can include intervals of one week if the monitoring period is for one or more months. The monitoring period and/or the periodic intervals can be selected by an administrator through the client device 104.

The periodic usage notification 644 can correspond to a particular cloud computing environment of the cloud computing environments 602. For example, the periodic usage notification 644 can correspond to the Environment A. That is, the periodic usage notification 644 can indicate, for example, the usage of cloud computing resources for the Environment A.

The periodic usage notification 644 can correspond to the cloud computing environments 602 collectively. For example, the periodic usage notification 644 can indicate the usage of cloud computing resources for the cloud computing environments 602 collectively.

The periodic usage notification 644 can correspond to a particular administrator. That is, the periodic usage notification 644 can be generated by the notification module 640 for a particular administrator. The periodic usage notification 644 can correspond to all cloud computing environments of the cloud computing environments 602 that are managed by the particular administrator. For example, the periodic usage notification 644 can indicate, for example, the usage of cloud computing resources for all cloud computing environments of the cloud computing environments 602 that are managed by the particular administrator.

The periodic usage notification 644 can include an indication of one or more of the following: the cumulative usage 622 (e.g., the most recently observed collective usage of cloud computing resources in the current monitoring period), the forecasted usage 632 (e.g., the most recently determined forecast of usage of cloud computing resources for the rest of the monitoring period), usage since the last interval (e.g., usage since the last periodic usage notification was generated and/or sent), one or more of the budget thresholds 614 that have been met, remaining amount of the cloud computing usage budget 612 (e.g., determined by subtracting the cumulative usage 622 from the cloud computing usage budget 612), or the graph 660.

In some implementations, the periodic usage notification 644 can include an indication of one or more recommended actions, e.g., for an administrator of the cloud computing system 108 and/or of one or more of the cloud computing environments 602 to take. The one or more recommendations can be recommendations that the computer system 110 determines are likely to result in reduced usage, e.g., likely to result in the cloud computing usage budget 612 not being exceeded by the end of the monitoring period. The one or more recommendations can be determined by the environment management module 650.

As an example, the notification module 640 can generate the periodic usage notification 644 in response to determining at time $T_A$ that a threshold amount of time (e.g., $T_A-T_O$) has elapsed since the start of the monitoring period. For example, where the monitoring period is four weeks (or one month), the threshold amount time/time interval can be one week. The notification 644 can include an indication that 37% of the cloud computing budget 612 has been used in the first week of the monitoring period. The notification 644 can include an indication that the expected percent use of the cloud computing budget 612 in the first week was 25%, and/or that usage in the first week is 12% greater than expected. The notification 644 can include an indication of the time (e.g., date) when the cloud computing usage budget 612 is likely to be exceeded, e.g., given the historical usage data 608 and/or the usage in the first week of the monitoring period. The notification 644 can include an indication of the percent of the cloud computing usage budget 612 that is expected to be used and/or exceeded by the end of the monitoring period, e.g., expected use of 115% of the cloud computing usage budget 612 by the end of the monitoring period given the historical usage data 608 and/or the usage in the first week of the monitoring period.

The notification module 640 can use the cumulative usage 622, the forecasted usage 632, and/or the budget thresholds 614 to generate a usage notification 646. The notification module 640 can generate the usage notification 646 in response to determining that one or more of the budget thresholds 614 have been met or exceeded. The notification module 640 can generate the usage notification 646 in response to detecting that the cloud computing usage budget 612 has been met or exceeded.

The usage notification 646 can correspond to a particular cloud computing environment of the cloud computing environments 602. For example, the usage notification 646 can correspond to the Environment A. That is, the usage notification 646 can indicate, for example, the usage of cloud computing resources for the Environment A.

The usage notification 646 can correspond to the cloud computing environments 602 collectively. For example, the usage notification 646 can indicate the usage of cloud computing resources for the cloud computing environments 602 collectively.

The usage notification 646 can correspond to a particular administrator. That is, the usage notification 646 can be generated by the notification module 640 for a particular administrator. The usage notification 646 can correspond to all cloud computing environments of the cloud computing environments 602 that are managed by the particular administrator. For example, the usage notification 646 can indicate, for example, the usage of cloud computing resources for all cloud computing environments of the cloud computing environments 602 that are managed by the particular administrator.

The usage notification 646 can include an indication of one or more of the following: the cumulative usage 622 (e.g., the most recently observed collective usage of cloud computing resources in the current monitoring period), the forecasted usage 632 (e.g., the most recently determined forecast of usage of cloud computing resources for the rest of the monitoring period), one or more of the budget thresholds 614 that have been met, remaining amount of the cloud computing usage budget 612 (e.g., determined by subtracting the cumulative usage 622 from the cloud computing usage budget 612, determined by subtracting the highest budget threshold of the budget thresholds 614 that has been met from the cloud computing budget 612, etc.), or the graph 660.

In some implementations, the usage notification 646 can include an indication of one or more recommended actions, e.g., for an administrator of the cloud computing system 108 and/or of one or more of the cloud computing environments 602 to take. The one or more recommendations can be recommendations that the computer system 110 determines are likely to result in reduced usage, e.g., likely to result in the cloud computing usage budget 612 not being exceeded by the end of the monitoring period. The one or more recommendations can be determined by the environment management module 650.

As an example, the notification module 640 can generate the usage notification 646 in response to determining at time $T_2$ that the Threshold B corresponding to a budget threshold of 50% of the cloud computing usage budget 612 has been met. The usage notification 646 can include an indication that 50% of the cloud computing budget 612 for the month has been used. The usage notification 646 can include an indication of what the expected percent use of the cloud computing budget 612 was for the time $T_2$ (e.g., 42%). The usage notification 646 can include an indication of the time (e.g., date) when the cloud computing usage budget 612 is likely to be exceeded, e.g., given the historical usage data 608 and/or the usage between the time $T_0$ and the time $T_2$ in the monitoring period. The usage notification 646 can include an indication of the percent of the cloud computing usage budget 612 that is expected to be used and/or exceeded by the end of the monitoring period, e.g., expected use of 115% of the cloud computing usage budget 612 by the end of the monitoring period given the historical usage data 608 and/or the usage between the time $T_0$ and the time $T_2$ in the monitoring period.

The notification module 640 can use the cumulative usage 622, the usage data 606, and/or the activity data 604 to generate an anomaly notification 648. The notification module 640 can generate the anomaly notification 648 in response to determining that one or more usage and/or activity anomalies. For example, the notification module 640 can receive an indication from the environment management module 650 that one or more anomalies have been detected. A usage anomaly can include for example an abnormal pattern of usage, an abnormal allocation of resources (e.g., an unusually high amount of cloud computing resources have been allocated to one or more of the cloud computing environments 602, an unusually low amount of cloud computing resources have been allocated to one or more of the cloud computing environments 602), a rate of usage meeting a threshold rate (e.g., indicating a sharp increase in usage, or sharp decrease in usage), an abnormal pattern in spending for cloud computing resources, or a rate of spending meeting a threshold rate (e.g., indicating a sharp increase in spending, or a sharp decrease in spending). An activity anomaly can include for example determining an abnormal pattern of activity, an abnormal number of active users (e.g., unusually high number of active users, or an unusually low number of active users), a rate of change in the number of active users meeting a threshold rate (e.g., indicating a sharp increase in the number of active users, or a sharp decrease in the number of active users).

As an example, the computer system 110 can store activity data that indicates the way that the cloud computing environments 602 are used over time, e.g., which environments are run, the times and durations that they are run, the number of users logged on, the number and type of tasks performed, the amount and types of computing resources they use, and so on. This information can be tracked for users who generate or manage environments (e.g., administrators), e.g., indicating how many environments a user typically has running and which environments those are, how frequently the user creates new environments, the times and durations that the environments run, the computing resources used by that user's environments, and so on. The activity data provides the computer system 110 a customized baseline level of activity for users and the cloud computing environments 602, as a reference for the typical behavior of users and cloud computing environments 602.

With the expected level or range of activity known for specific users and the cloud computing environments 602, the computer system 110 can compare current usage and recent trends with the typical activity levels observed previously. When the computer system 110 determines that the current or recent usage by a user or environment (or group of users and environments) is outside the typical or expected range, as determined from historical activity for the user or environment, the computer system 110 can send a notification of the anomaly to an administrator or to the user involved in the anomalous condition, e.g., through the notification module 640. The computer system 110 may take other actions to respond to a detected usage anomaly, such as to require additional authentication or verification for the usage to continue, to limit or restrict resources available to a running environment, to shut down an environment, to require user input confirming that the anomalous usage to continue, etc.

The usage and/or activity anomalies can indicate, for example, a system failure (e.g., hardware or software failure of the cloud computing system 108), poor usage efficiency, the occurrence of an event (e.g., power outage), unusually high cost of cloud computing resources (e.g., that can be used by the computing system 110 to reduce the reservation of cloud computing resources, to change a tier or level of service or access of a cloud computing provider, to enable reservation of unused cloud computing resources at a discounted cost without guarantee that such unused cloud computing resources will be available, to modify the job types that unused reservation can be used for, etc.), or unusually low cost of cloud computing resources (e.g., that can be used by the computing system 110 to increase the reservation of cloud computing resources, to change a tier or level of service or access of a cloud computing provider, to disable reservation of unused cloud computing resources at a discounted cost without guarantee that such unused cloud computing resources will be available, to modify the job types that unused reservation can be used for, etc.).

As described in more detail below with respect to FIG. 11, reservation of unused cloud computing resources at a discounted cost without guarantee that such unused cloud computing resources will be available is an option available to the computer system 110 and/or to administrators of the cloud computing environments 602. This type of reservation is also known as Spot reservation. As an example, enabling Spot reservation can provide for the reservation of cloud computing server instances that are unused by a cloud computing provider, such as Amazon AWS. The cloud computing provider can provide such reservations of resources at a discounted price. However, the risk is that such resources may not be available or always available (e.g., cloud computing resources are not guaranteed), e.g., in the case where all resources are being used by others paying full price or others higher in a queue for unused resources. Spot reservation may be a tier or level of service or access provided by a cloud computing provider, such as Amazon AWS. For example, Spot reservation may be the lowest tier or level offered by the cloud computing provider and, by default of the computing system 110, may be disabled or enabled and only used for low priority job types.

As mentioned, cloud computing providers may offer different tiers or levels of service or access, which can have different costs and features available. For example, there can be standard resources available on-demand (e.g., at full price), while other resources reserved in advance (e.g., at a discounted price). Low priority or non-guaranteed resources may also be available, which may be subject to interruption if demand is high but are also available at low cost, e.g., as is the case with Spot reservation. The usage data and activity data generated by the cloud computing system 108 can indicate the type and priority of computing resource usage, allowing the computer system 110 to forecast how much of different tiers or types of service will be needed. In reserving cloud computing resources, the cloud computing system 108 can set the amount of each service tier to reserve based on the needs based on the usage patterns and/or the forecasted usage 632 provided by the computer system 110. Similarly, in reserving cloud computing resources, the cloud computing system 108 may follow instructions provided by the computer system 110 that explicitly provide the amount of each service tier to reserve based on the needs based on the usage patterns and/or the forecasted usage 632.

The anomaly notification 648 can correspond to a particular cloud computing environment of the cloud computing environments 602. For example, the anomaly notification 648 can correspond to one or more anomalies detected with respect to the Environment A.

The anomaly notification 648 can correspond to the cloud computing environments 602 collectively. For example, the anomaly notification 648 can correspond to one or more anomalies of the cloud computing system 108 and/or that have been collectively experienced by the cloud computing environments 602.

As an example, the notification module 640 can generate the anomaly notification 648 in response to determining that an anomaly with respect to Environment B has occurred. The anomaly notification 648 can include an indication that Environment B is using twice its normally allocated number of CPUs (e.g., four instead of two).

The anomaly notification 648 can include, for example, one or more of the anomalous measure (e.g., the Environment B is using twelve CPUs, the utilization of the Environment C is 8%, the utilization of the Environment D is 150%, etc.), the typical measure (e.g., the Environment B typically uses six CPUs, the utilization of the Environment C is typically 81%, the utilization of the Environment D is typically 78%, etc.), control to allow (e.g., control that permits the continued use of increased cloud computing resources for the Environment B, that permits the continued running of the Environment C despite the low utilization, that permits the continued unusually high utilization of the Environment D, etc.), control to stop/correct the issue (e.g., a control to reduce the amount of cloud computing resources allocated to and/or being used by the Environment B, a control to shut down the Environment C, a control to increase the cloud computing resources allocated to the Environment D, a control to shut down the Environment D, a control to limit the use of the Environment D by one or more particular users, etc.).

The computing system 110 can send the generated notifications 670 to the client device 104 over the network 112, e.g., as they are generated. For example, the notification module 240 can send the idle environment notification 642 to the client device 104 upon determining that the Environment A has been idle for one hour, can send the periodic usage notification 644 to the client device 104 at the time $T_A$, can send the usage notification 646 to the client device 104 at the time $T_2$, and can send the anomaly notification 648 to the client device 104 upon determining that an anomaly has occurred.

The notification module 640 can access and/or receive data indicating users that correspond to the cloud computing environments or a subset of the cloud computing environments 602. For example, the notification module 640 can use the activity data 604 (or configuration settings) from the cloud computing system 108 to identify users or electronic accounts associated with the cloud computing environments 602 or with a particular subset of the cloud computing environments 602 (e.g., those that correspond to a particular user, a particular group of users, a particular department of a company, a particular company, etc.). The users can be those that created the corresponding environments, manage the corresponding environments, are currently using the corresponding environments, have used the corresponding environments, etc.

As an example, after generating the idle environment notification 642 for the Environment A, the notification module 640 can identify all of the users that correspond to the Environment A. These users can include administrators of the Environment A who created and/or manage the Environment A, persons who are using the Environment A, and/or persons that have used or have recently used (e.g., within the last day, the last week, the last month, etc.) the Environment A. The notification module 640 can send the idle environment notification 642 to all of the identified users, to a subset of the identified users (e.g., only to the administrators), or can send different versions of the idle environment notifications to different groups of the identified users. For example, the notification module 640 can generate and send a first version of the idle environment notification 642 to the administrators that includes a confirmation request and/or an option to perform a managerial action with respect to the Environment A, and a second version of the idle environment notification 642 that does not include a confirmation request or an option to perform a managerial action.

In some implementation, the notification module 640 can access and/or receive an indication of the configuration settings for the cloud computing environments 602 and/or a subset of the cloud computing environments 602. The notification module 640 can extract a maximum duration for the cloud computing environments 602 and/or the subset of the cloud computing environments 602. The notification module 640 can generate one or more notifications based on the maximum duration(s), e.g., in response to determining that the maximum duration(s) are within a threshold time of expiring or have expired. For example, the notification module 640 can obtain the configuration settings for the Environment A and identify a maximum runtime of four hours for the Environment A. The notification module 640 can compare the start time of the Environment A with the current time to identify the aggregate runtime (e.g., by subtracting the start time from the current time). If the aggregate runtime is within a threshold of the set maximum runtime for the Environment A (e.g., within 30 minutes, within 15 minutes, within five minutes, etc.), the notification module 640 can identify the administrator(s) for the Environment A (e.g., from the configuration settings for the Environment A and/or from the activity data 604) and send them a notification indicating that the maximum duration is about to expire and that the Environment A will be shut down unless additional runtime is requested.

As shown in FIG. 6C, the computing system 110 generates and sends updated configuration settings 654 and shutdown instructions 672 to the cloud computing system 108. The configuration settings 654 can include, for example, an allocation of cloud computing resources for one or more of the cloud computing environments 602.

As an example, the configuration settings 654 can include an indication of the number of CPUs that are allocated for the Environment A of the cloud computing environments 602, an amount of memory (e.g., RAM) that is allocated for the Environment A of the cloud computing environments 602, an amount of CPU hours that are allocated for the Environment A of the cloud computing environments 602, etc.

The configuration settings 654 can include, for example, an allocation of cloud computing resources for the cloud computing system 108, e.g., for all of the cloud computing environments 602, or an allocation of cloud computing resources for a subset of the cloud computing environments 602. For example, the configuration settings 654 can include an indication of the number of CPUs that are allocated to the cloud computing system 108 for running the cloud computing environments 602, an amount of memory (e.g., RAM) that is allocated to the cloud computing system 108 for running the cloud computing environments 602, an amount of CPU hours that are allocated to the cloud computing system 108 for running the cloud computing environments 602, etc.

The configuration settings 654 can additionally or alternatively include an indication that Spot reservation should be enabled or disabled. The configuration settings 654 can include, for example, an indication of the job type or priority that Spot reservation should be used for. The configuration settings 654 can include, for example, an indication of the amount of cloud computing resources that should be reserved in advance (e.g., reserve 90% of the average CPU hour usage per month in advance). The configuration settings 654 can include, for example, an indication of a spending limit on reserving cloud computing resources.

The configuration settings 654 can additionally or alternatively provide for a maximum duration the cloud computing environments 602 or that a subset of the cloud computing environments 602 run for. This maximum duration can be described as an duration limit, a maximum runtime, a default expiration time (e.g., setting a deadline relative to starting the corresponding cloud computing environment(s)).

The shutdown instructions 672 can include instructions to shutdown (e.g., suspend) one or more of the cloud computing environments 602. For example, the shutdown instructions 672 can be instructions for the cloud computing system 108 to shut down the Environment A. The shutdown instructions 672 can include instructions to shutdown (e.g., suspend) one or more of the cloud computing environments 602 at some future point in time. For example, the shutdown instructions 672 can be instructions for the cloud computing system 108 to shut down the Environment A in fifteen minutes unless instructions overriding the shutdown instructions 672 are received before the fifteen minutes has elapsed.

In some implementations, the computing system 110 can send other instructions to the cloud computing system 108. For example, the computing system 110 can send instructions to the cloud computing system 108 to restart one or more of the cloud computing environments 602 (e.g., instructions to restart one or more of the cloud computing environments 602 at some future point in time), instructions to stop the shutdown of one or more of the cloud computing environments 602, instructions to restart a shutdown time for one or more of the cloud computing environments 602, etc.

The computing system 110 (e.g., through the environment management module 650) can send the configuration settings 654 and/or the shutdown instructions 672 to the cloud computing system 108 over the network 112. The computer system 110 can send the configuration settings 654 and the shutdown instructions 672 at different times and/or in response to different triggers.

The computing system 110 can use the environment management module 650 to generate the shutdown instructions 672. For example, the environment management module 650 can receive the cumulative usage 622, the forecasted usage 632, and/or the cloud computing usage budget 612 as input. The environment management module 650 can optionally receive the usage data 606 and/or the activity data 604 as input. The environment management module 650 can optionally receive the budget thresholds 614 as input. The environment management module 650 can use one or more of the cumulative usage 622, the forecasted usage 632, and/or the cloud computing usage budget 612 in generating the shutdown instructions 672. The environment management module 650 can optionally use the usage data 606, the activity data 604, and/or the budget thresholds 614 in generating the shutdown instructions 672.

The environment management module 650 can generate the shutdown instructions 672 in response to determining that one or more of the cloud computing environments 602 have been idle for a threshold amount of time, that the cloud computing usage budget 612 has been exceeded (e.g., if the cumulative usage 622 exceeds the cloud computing usage budget 612), that one or more of the budget thresholds 614 have been exceeded before they were expected to be exceeded (e.g., upon the environment management module 650 determining that the Threshold B was exceeded at a time $T_2$ that is before the expected time of TB as shown in the graph 660c), that the forecasted usage 632 is greater than the cloud computing usage budget 612, or that an anomaly with respect to one or more of the cloud computing environments 602 or the cloud computing system 108 has occurred.

As an example, the shutdown instructions 672 can be generated by the environment management module 650 upon determining that the Environment A of the cloud computing environments 602 has been idle for a threshold amount of time, e.g. one hour. The environment management module 650 can determine that the Environment A has been idle for the threshold amount of time by using the usage data 606 and/or the activity data 604 to, for example, detect that the utilization of Environment A has been below the a threshold utilization (e.g., 5%, 10%, 15%, etc.) for one hour. The environment management module 650 can determine that the Environment A has been idle for the threshold amount of time by receiving an indication from the usage tracking module 620 and/or from the notification module 640 that the Environment A has been idle for one hour.

The shutdown instructions 672 can correspond to a particular cloud computing environment of the cloud computing environments 602. For example, the shutdown instructions 672 can be instructions for the cloud computing system 108 to shut down the Environment A.

The shutdown instructions 672 can correspond to the cloud computing environments 602 collectively. For example, the shutdown instructions 672 can include instructions for the cloud computing system 108 to shut down all of the cloud computing environments 602.

The computing system 110 can use the environment management module 650 to generate the configuration settings 654. The environment management module 650 can use one or more of the cumulative usage 622, the forecasted usage 632, and/or the cloud computing usage budget 612 in generating the configuration settings 654. The environment management module 650 can optionally use the usage data 606, the activity data 604, and/or the budget thresholds 614 in generating the configuration settings 654.

The environment management module 650 can generate the configuration settings 654 in response to making a determination 652 that the forecasted usage 632 is greater than the cloud computing usage budget 612. For example, the forecasted usage 632 can indicate that 115 CPU hours are expected to be used for running the cloud computing environments 602 by the end of the monitoring period (e.g., the end of the month). The cloud computing usage budget 612 can provided that only 100 CPU hours were to be used for running the cloud computing environments 602 for the entirety of the monitoring period. Accordingly, in making the determination 652, the environment management module 650 can determine that the forecasted usage 632 is greater than the cloud computing usage budget 612. The determination 652 is shown in the graph 660c, which provides that the forecasted CPU hours used is greater than the CPU hour budget by the time $T_4$ that corresponds to the end of the monitoring period.

As an example, the configuration settings 654 can be generated by the environment management module 650 upon making the determination 652. The configuration settings 654 can provide, for example, that the CPUs allocated to the cloud computing system 108 for running the cloud computing environments 602 should be reduced from ten to seven. The reduction of ten CPUs allocated to seven CPUs allocated can be determined, e.g., by the environment management module 650, to reduce the usage (e.g., reduce the number of CPU hours used in the monitoring period). The environment management module 650 may estimate that the reduction of CPUs allocated to the cloud computing system 108 for running the cloud computing environments 602 from ten CPUs to seven CPUs is likely to reduce the usage such that the cloud computing usage budget 612 will not be exceeded by the end of the monitoring period or, if not possible, to minimize the excessive usage. Additionally or alternatively, the environment management module 650 can provide the configuration settings 654 to the usage forecasting module 630 to determine a new forecasted usage 634 given the configuration settings 654.

In some implementations, the environment management module 650 can generate the configuration settings 654 in response to determinations other than the determination 652. For example, the environment management module 650 can generate new configuration settings for the cloud computing system 108 (e.g., for running one or more of the cloud computing environments 602) based on determining a usage and/or activity pattern indicates lower expected utilization, a usage and/or activity pattern indicates higher expected utilization, a utilization has met a threshold utilization (e.g., indicating unusually high or unusually low utilization), a utilization is below a threshold utilization for a threshold amount of time (e.g., one or more of the cloud computing environment 602 are idle), a utilization is above a threshold utilization for a threshold amount of time, a cost of cloud computing resources has met a threshold cost (e.g., a threshold cost associated with an unusually high price of cloud computing resources, or a threshold cost associated with an unusually low price of cloud computing resources), etc.

The configuration settings 654 can correspond to a particular cloud computing environment of the cloud computing environments 602. For example, the configuration settings 654 can be settings that correspond to the Environment A.

The configuration settings 654 can correspond to the cloud computing environments 602 collectively. For example, the configuration settings 654 can include settings for the cloud computing system 108 to use for all of the cloud computing environments 602.

The usage forecasting module 630 can use the configuration settings 654 in determining the forecasted usage 634. The forecasted usage 634 can be, for example, the estimated usage of cloud computing resources (e.g., CPU hours) by the end of the monitoring period if the number of CPUs allocated to the cloud computing system 108 for running the cloud computing environments 602 is reduced from ten to seven. As shown in the graph 660c, the forecasted usage 634 can indicate that the usage given the configuration settings 654 (e.g., the forecasted CPU hours with the configuration settings 654) is expected to be less than or equal to the cloud computing usage budget 612 by the end of the monitoring period. The usage forecasting module 630 can optionally provide an indication to the environment management module 650 that the configuration settings 654 are likely to be successful. If however the forecasted usage 634 indicates that the usage given the configuration settings 654 (e.g., the forecasted CPU hours with the configuration settings 654) is expected to be more than the cloud computing usage budget 612 by the end of the monitoring period, then the usage forecasting module 630 can optionally provide an indication to the environment management module 650 that the configuration settings 654 are likely insufficient (e.g., at least on their own) to keep the usage within the cloud computing usage budget 612.

The usage forecasting module 630 may receive an updated user activity threshold 656 (e.g., from the environment management module 650), and may use the user activity threshold 656 in determining the forecasted usage 634. The user activity threshold 656 can be a threshold used to determine if one or more of the cloud computing environments are idle and/or used to determine if one or more of the cloud computing environments should be shutdown. The environment management module 650 can determine to update the user activity threshold 656 based on the determination 652 in an effort to reduce usage. The environment management module 650 can determine to update the user activity threshold 656 based on the forecasted usage 634 indicating that additional measures will likely need to be taken in order to keep the usage at or below the cloud computing usage budget 612 by the end of the monitoring period.

By increasing the user activity threshold 656, the environment management module 650 can increase the chances of one or more of the cloud computing environments 602 being shut down, can increase the frequency of the one or more cloud computing environments 602 being shut down, and/or can increase the duration that the one or more cloud computing environments 602 are shut down for. As an example, the environment management module 650 can increase the user activity threshold 656 from 10% to 15%. Accordingly, whenever the utilization or the average utilization of a cloud computing environment in the cloud computing environments falls below 15% for a threshold amount of time, then the computing system 110 or the cloud computing system 108 can shut down the cloud computing environment for being idle. Because the user activity threshold 656 was increased, there is a higher likelihood of one or more of the cloud computing environments 602 being found to be idle and being shut down as a result. Similarly, because the user activity threshold 656 was increased, is a higher likelihood of one or more of the cloud computing environments 602 being shut down with greater frequency. Moreover, because the user activity threshold 656 was increased, it may take longer until one or more of the cloud computing environments 602 are restarted (e.g., may not be restarted until a time when the computing system 110 estimates that the utilization of a cloud computing environment will be at least 15% instead of at least 10%).

Additionally or alternatively, the environment management module 650 can attempt to reduce the usage by reducing the threshold amount of time that is required for a cloud computing environment to be considered idle and/or by reducing the amount of time until an cloud computing environment is shut down after being found to be idle. For example, the environment management module 650 can reduce the threshold amount of time from one hour to thirty minutes. Similarly, as an example, the environment management module 650 can reduce the countdown time until the shutdown of an environment after it has been found idle from fifteen minutes to five minutes.

In addition, the computing system 110 can use the environment management module 650 to generate and/or send a usage forecast notification 658. The environment management module 650 can send the usage forecast notification 658 to the client device 104, e.g., over the network 112. The usage forecast notification 658 can be part of the notifications 670. The usage forecast notification 658 can include an indication of the determination 652. The usage forecast notification 658 can include an indication of whether the usage by the end of the monitoring period is expected to exceed the cloud computing usage budget 612. The usage forecast notification 658 can include an indication of the expected final usage by the end of the monitoring period, e.g., as a percent of the cloud computing budget 612. The usage forecast notification 658 can include one or more recommendations that the environment management module 650 suggests to admin to reduce usage or to improve efficiency (e.g., reduce allocation of cloud computing resources, increase allocation of cloud computing resources, increase the user activity threshold 656, reduce the user activity threshold 656, increasing a threshold amount of time for determining when an environment is idle, decreasing a threshold amount of time for determining when an environment is idle, shutting down one or more of the cloud computing environments, etc.). The usage forecast notification 658 can include an indication of one or more expected outcomes (e.g., usage by the end of the monitoring period) that correspond to the one or more recommendations if the one or more recommendations are implemented (e.g., in the form of new configuration settings, modified threshold values, shutdowns of one or more environments, etc.). The usage forecast notification 658 can include an indication of a time (e.g., date) when it expects the cloud computing usage budget to be 100% used.

As an example, the usage forecast notification 658 can include an indication that the monthly cloud computing budget is expected to be completely used six days before the end of the month.

In some implementations, the notification module 640 generates and/or sends the usage forecast notification 658. For example, the notification module 640 generates and/or sends the usage forecast notification 658 in response to receiving an indication of the determination 652 from the environment management module 650.

Figure 7:
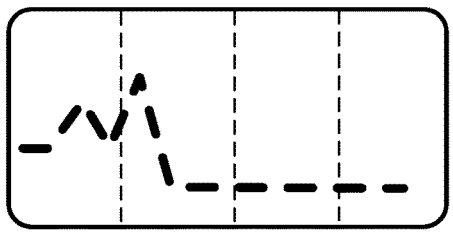
FIG. 7 is a diagram that illustrates an example idle environment notification.

FIG. 7 is a diagram that illustrates an example idle environment notification 700. The idle environment notification 700 can be generated by the notification module 640 shown in FIGS. 6A-6C. The idle environment notification 700 can be sent to the client device 104 by the computing system 110 shown in FIGS. 6A-6C, e.g., as one of the notifications 670. In some implementations, the idle environment notification 700 is the idle environment notification 642 shown in FIG. 6B.

The idle environment notification 700 can include an indication of the cloud computing environment that is idle, such as a name of the environment (e.g., "NEW11.0ViewerTeamMachine") and/or an identification of the environment (e.g., "ID:99661"). The idle environment notification 700 can include an indication of a length of time that the environment has been idle for and/or an indication of the threshold amount of time to determine that an environment is idle (e.g., one hour). The idle environment notification 700 can include an indication of a time when the environment will be shut down (e.g., by the computing system 110 shown in FIG. 6) if it remains in an idle state, or an indication of a length of time remaining until the environment is shut down (e.g., by the computing system 110 shown in FIGS. 6A-6C).

Figure 8:
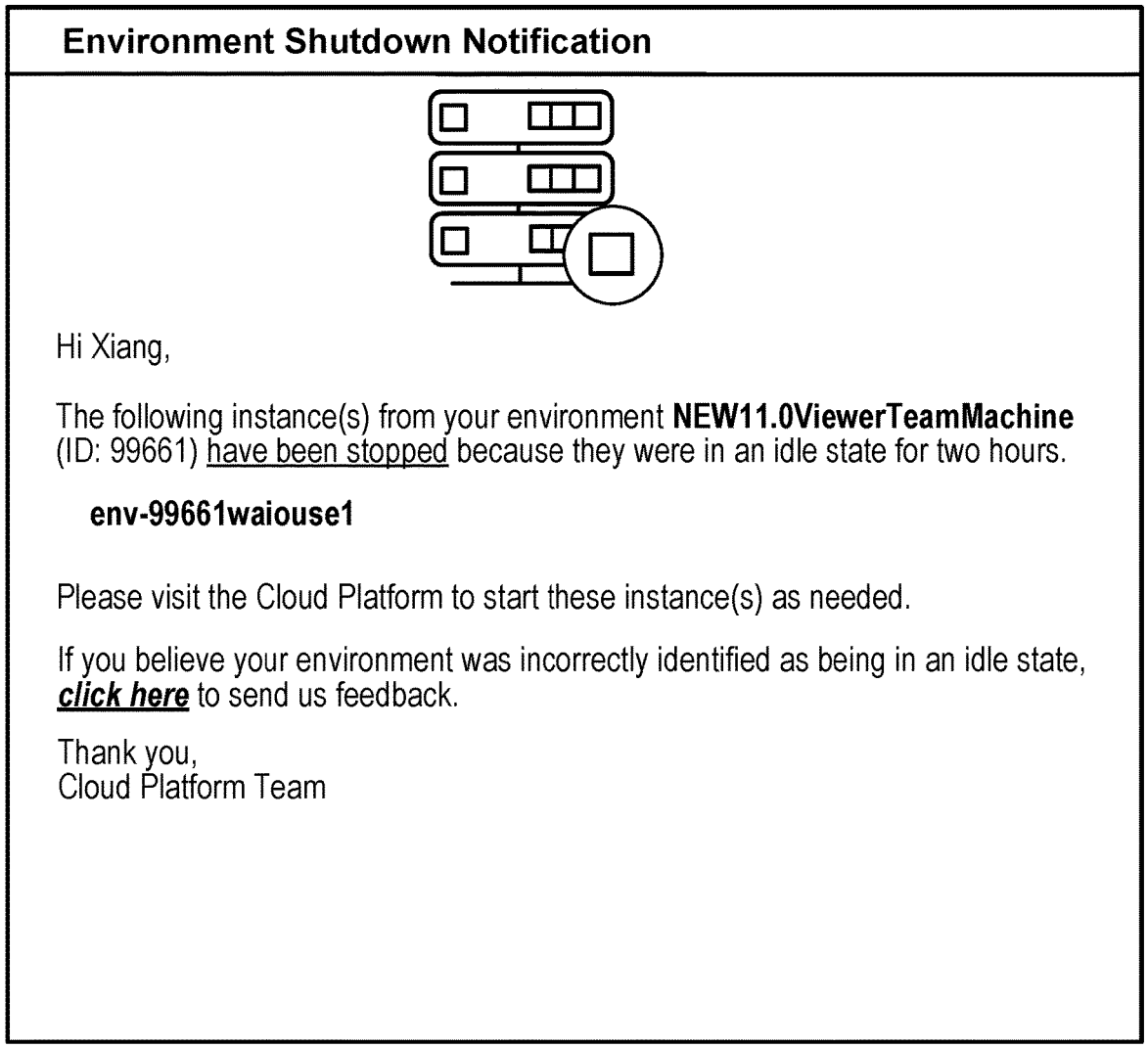
FIG. 8 is a diagram that illustrates an example shutdown notification.

FIG. 8 is a diagram that illustrates an example shutdown notification 800. The shutdown notification 800 can be generated by the notification module 640 and/or by the environment management module 650 shown in FIGS. 6A-6C. The shutdown notification 800 can be sent to the client device 104 by the computing system 110 shown in FIGS. 6A-6C, e.g., as one of the notifications 670.

The shutdown notification 800 can include an indication of the cloud computing environment that has been shut down, such as a name of the environment (e.g., "NEW11.0ViewerTeamMachine") and/or an identification of the environment (e.g., "ID:99661"). The shutdown notification 800 can include an explanation as to why the environment has been shut down (e.g., by the computing system 110 shown in FIGS. 6A-6C). For example, the shutdown notification 800 can provide that the environment was shut down due to being idle for the past two hours. The shutdown notification 800 can optionally include an indication of when the environment will be restarted, such as a restart time, an estimated restart time, or a length of time until the environment is restarted.

FIG. 9 is a diagram that illustrates an example periodic usage notification 900. The periodic usage notification 900 can be generated by the notification module 640 shown in FIGS. 6A-6C. The periodic usage notification 900 can be sent to the client device 104 by the computing system 110 shown in FIGS. 6A-6C, e.g., as one of the notifications 670. In some implementations, the periodic usage notification 900 is the periodic usage notification 644 shown in FIG. 6B.

The periodic usage notification 900 can include an indication of the usage in running one or more cloud computing environments over a period of time, e.g., over the last day, over the last week, over the last month, etc. For example, as shown, the periodic usage notification 900 can include an indication of the cost in running the one or more environments (e.g., $35.00). The one or more cloud computing environments may be all environments managed by a given administrator (e.g., "Zhen") that the periodic usage notification 900 was generated for (e.g., by the computing system 110 shown in FIGS. 6A-6C). The periodic usage notification 900 can include an indication of the one or more cloud computing environments that correspond to the usage (e.g., that are managed by the administrator Zhen). For example, the periodic usage notification 900 can include a name of the one or more environments (e.g., "xz_UB_11.2_2261") and/or an identification of the one or more environments (e.g., ID "173600").

The periodic usage notification 900 can include an indication of the idle time of the one or more environments over the period of time. For example, as shown, the periodic usage notification 900 provides that the one or more environments have been idle 100% of the time over the last week.

The periodic usage notification 900 can include an indication of one or more recommendations, and/or the expected effect of the one or more recommendations on the usage. For example, the periodic usage notification 900 provides a recommendation that the environment(s) should be stopped (e.g., shut down) when they are idle. The periodic usage notification 900 also provides an expected effect of cost savings (e.g., $7.00) if the recommendation is implemented.

The periodic usage notification 900 can include information corresponding to the one or more environments from the immediately preceding time period (e.g., yesterday, last week, last month, etc.). For example, the periodic usage notification 900 can include an indication of the usage of the one or more environments in the immediately preceding time period (e.g., the cost for running the environment xz_UB_11.2_2261 was $43.00 last week). The periodic usage notification 900 can include an indication of the idle time of the one or more environments since the immediately preceding time period (e.g., the idle time for the environment xz_UB_11.2_2261 was 50% last week). The periodic usage notification 900 can include an indication of the potential usage reduction of the one or more environments the immediately preceding time period (e.g., the potential cost savings for the environment xz_UB_11.2_2261 was $4.00 last week).

The periodic usage notification 900 can include an indication of one or more changes in information corresponding to the one or more environments since the immediately preceding time period (e.g., since yesterday, last week, last month, etc.). For example, the periodic usage notification 900 can include an indication of the change in usage of the one or more environments since the immediately preceding time period (e.g., the cost for running the environment xz_UB_11.2_2261 decreased 18.6% since last week). The periodic usage notification 900 can include an indication of the change in idle time of the one or more environments since the immediately preceding time period (e.g., the idle time for the environment xz_UB_11.2_2261 increased 100% since last week). The periodic usage notification 900 can include an indication of the change in potential usage reduction of the one or more environments since the immediately preceding time period (e.g., the potential cost savings for the environment xz_UB_11.2_2261 increased 75% since last week).

The periodic usage notification 900 can include an indication of those changes since the immediately preceding time period (e.g., since the immediately preceding periodic usage notification was generated) that are considered positive changes (e.g., lower cost, lower idle time, lower potential savings, higher CPU utilization, etc.). For example, positive changes can be highlighted in the periodic usage notification 900, or can have a first color or a first shading in the periodic usage notification 900 (e.g., green) when displayed on a client device (e.g., the client device 104 shown in FIGS. 6A-6C). The positive changes can indicate an improvement in the usage of the one or more environments since the last time period.

Similarly, the periodic usage notification 900 can include an indication of those changes since the immediately preceding time period that are considered negative changes (e.g., higher cost, higher idle time, higher potential savings, lower CPU utilization, etc.). For example, negative changes can be highlighted in the periodic usage notification 900, or can have a second color or a second shading in the periodic usage notification 900 (e.g., red) when displayed on a client device (e.g., the client device 104 shown in FIGS. 6A-6C). The negative changes can indicate worsening usage of the one or more environments since the last time period.

The periodic usage notification 900 can include a detailed environment information 902. The detailed environment information 902 can include a list of all cloud computing environments that are managed by a given administrator (e.g., Zhen). The detailed environment information 902 can include an indication of the active cloud computing environments (e.g., those environments that are currently running). The detailed environment information 902 can include an indication of the terminated cloud computing environments (e.g., those environments that are currently shutdown). The detailed environment information 902 can include information that is specific to each of the one or more environments listed. For example, the detailed environment information 902 can include, for example, one or more of the identification of an environment, a name of the environment, an indication of an enterprise application that is used to operate the environment, an idle time of the environment since the immediately preceding time period, a usage of cloud computing resources for the environment since the immediately preceding time period, a potential reduction in usage of cloud computing resources for the environment since the immediately preceding time period, a date that the environment was created on, or a usage of cloud computing resources for the environment in a monitoring period (e.g., over the last month, the last year, etc.).

Figure 10:
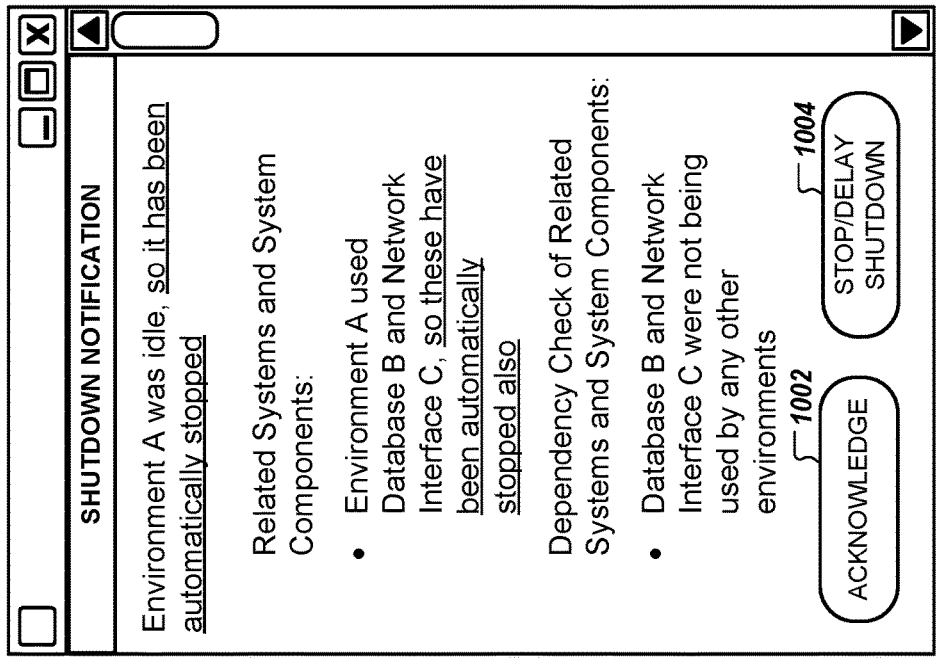
FIG. 10 is a diagram that illustrates an example shutdown notification interface.

FIG. 10 is a diagram that illustrates an example shutdown notification interface 1000. The shutdown notification interface 1000 can be displayed on a client device, such as the client device 104 shown in FIGS. 6A-6C. The shutdown notification interface 1000 can display a shutdown notification, such as a shutdown notification generated by the notification module 640 of the computing system 110 shown in FIGS. 6A-6C. In some implementations, the shutdown notification interface 1000 displays the shutdown notification 800 shown in FIG. 8.

The shutdown notification interface 1000 provides that a cloud computing environment has been stopped (e.g., shut down), is in the process of being stopped, or will be stopped at some future point in time. The shutdown notification interface 1000 can display an indication of the systems and/or system components that are related to cloud computing environment that has been shut down. The shutdown notification interface 1000 can display an indication of one or more actions that have been taken (e.g., by the computing system 110 or the cloud computing system 108 shown in FIGS. 6A-6C) with respect to the related systems and/or system components. For example, the shutdown notification interface 1000 provides that related systems and/or system components of the Environment A include a Database B and a Network Interface C. The shutdown notification interface 1000 provides that, as a result of shutting down an environment or as a result of determining to shut down the environment, one or more of the related systems and/or system components have been shut down as well (e.g., by the computing system 110 or the cloud computing system 108 shown in FIGS. 6A-6C). For example, the shutdown notification interface 1000 provides that, as a result of stopping the Environment A, the Database B and the Network Interface C have also been automatically stopped (e.g., by the computing system 110 or the cloud computing system 108 shown in FIGS. 6A-6C).

The shutdown notification interface 1000 can provided an indication of a dependency check (e.g., performed by the computing system 110 shown in FIGS. 6A-6C). The dependency check can indicate whether other computing environments rely on the one or more cloud computing resources that have been identified for possible shut down (e.g., due to their use by the Environment A). Determining reliance for the dependency check can include the computer system 110 shown in FIGS. 6A-6C determining that other cloud computing environments are currently using the resources, or are likely to use the resources (e.g., have used the resources at some point in the past, have used the resources in the past week, have use the resources in the past month, have used the resources in the past year, there is an indication of a relationship between one of the other cloud computing environments and the resources, etc.). For example, the dependency check can provide an indication that a check was performed on the related systems and/or system components to determine whether any of the related systems and/or system components were being used by (or are otherwise being relied upon by) other cloud computing environments than the one being shut down (e.g., cloud computing environments other than the Environment A).

If it is determined (e.g., by the computing system 110 shown in FIGS. 6A-6C) that one or more related systems and/or system components are not being used by any other cloud computing environments, the one or more related systems and/or system components can be shut down (e.g., by the computing system 110 and/or the cloud computing system 108 shown in FIGS. 6A-6C) along with the cloud computing environment that the shutdown notification was generated for. If it is determined (e.g., by the computing system 110 shown in FIGS. 6A-6C) that one or more related systems and/or system components are being used by one or more cloud computing environments, the one or more related systems and/or system components may not be shut down with the cloud computing environment that the shutdown notification was generated for.

As an example, the shutdown notification interface 1000 indicates that a dependency check was performed on the Database B and the Network Interface C. The dependency check may have been performed by the computing system 110 shown in FIGS. 6A-6C. As a result of performing the database check, the computing system 110 can determine that the Database B and the Network Interface were not being used by any cloud computing environments other than the Environment A. The computing system 110 can proceed generate shutdown instructions that provide that the Environment A, the Database B, and the Network Interface C should be shut down, and a shutdown notification to be sent to the client device 104.

As an example, with respect to FIGS. 6A-6C, the computing system 110 shown in can generate a shutdown notification that is used by the client device 104 to display the shutdown notification interface 1000. In generating the shutdown notification, the computing system 110 can determine to shut down a cloud computing environment (e.g., Environment A due to the Environment A being idle for two hours). The computing system 110 can detect systems and/or system components that are related to the cloud computing environment, e.g., other cloud resources used by the cloud computing environment. These other cloud resources can include one or more databases, one or more network interfaces, one or more web servers, etc. For example, the computing system 110 can determine that the Environment A uses the Database B and the Network Interface C. The computing system 110 can determine whether the other cloud resources are used by any of the cloud computing environments 602 other than the cloud computing environment (e.g., currently using one of the other cloud resources, or are configured to use as indicated by their configuration nettings). If none of the other cloud computing environments use the other cloud resources, then the computing system 110 will generate instructions to shut down the other cloud resources withe the cloud computing system. The computing system 110 can send the instructions to the cloud computing system 108. However, if one or more of the other cloud computing environments do use a one or more of the other cloud resources, then the computing system 110 can refrain from generating instructions to shut down the one or more other cloud resources. When the cloud computing environment is to be restarted, the computer system 110 can generate instructions to restart the other cloud resources that were previously shut down the cloud computing environment, and to restart the cloud computing environment. The computing system 110 can send the instructions to the cloud computing system 108.

The shutdown notification interface 1000 can include one or more interface elements. For example, the shutdown notification interface 1000 can include an acknowledgement interface element 1002. As an example, with respect to FIGS. 6A-6C, if the interface element 1002 is selected by an administrator, a response can be sent from the client device 104 to the computing system 110. The response can indicate that the administrator acknowledges the shutdown notification, e.g., acknowledges that the Environment A, the Database B, and the Network Interface C have been or will be shut down. The response can be used by the computing system 110 as a confirmation. For example, the computing system 110 can suspend sending instructions to shut down the Environment A, the Database B, and the Network Interface C to the cloud computing system 108 until the computing system 110 receives the response indicating that the administrator has selected the interface element 1002 (e.g., acknowledges the shutdown notification).

As an example, the shutdown notification interface 1000 can include a stop/delay shutdown interface element 1004. As an example, with respect to FIGS. 6A-6C, if the interface element 1004 is selected by an administrator, a response can be sent from the client device 104 to the computing system 110. The response can indicate that the cloud computing environment, and its related systems and/or system components should not be shut down, or, if they already have been shut down, should be restarted. After receiving the response, the computing system 110 can restart the cloud computing environment and its related systems and/or system components if they have been shut down. If the cloud computing environment and its related systems and/or system components have not yet been shut down, the computing system 110 can refrain from sending the shutdown instructions to the cloud computing system 108. The computing system 110 can also perform one or more other actions as a result of receiving the response. For example, the computing system 110 can restart a timer for the idle time of the cloud computing environment (e.g., the Environment A).

Figure 11:
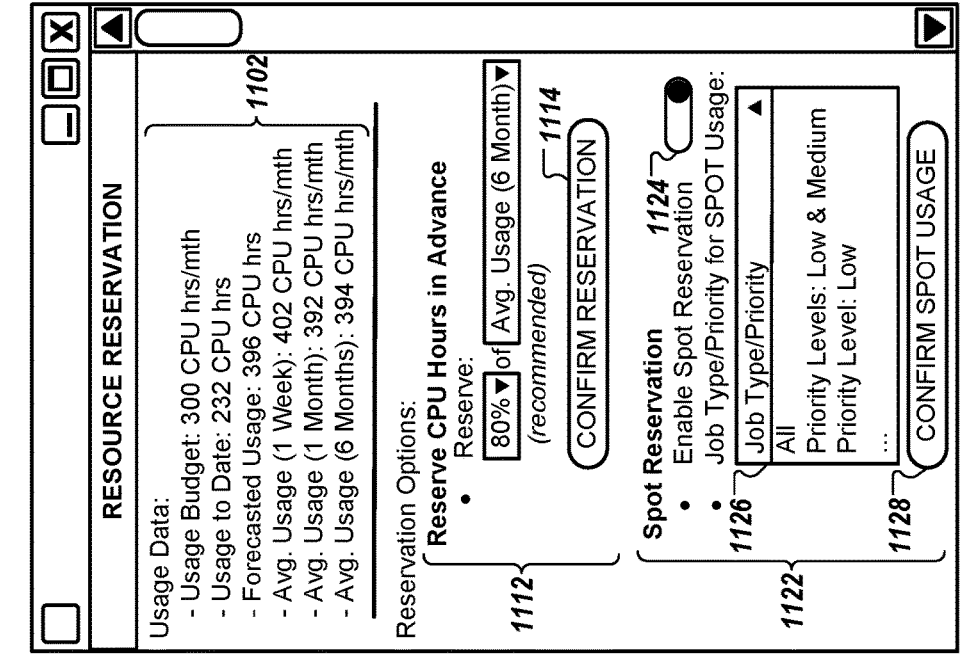
FIG. 11 is a diagram that illustrates an example resource reservation interface.

FIG. 11 is a diagram that illustrates an example resource reservation interface 1100. The resource reservation interface 1100 can be presented on a client device, such as the client device 104 shown in FIGS. 6A-6C. An administrator using a client device can use the resource reservation interface 1100 to reserve cloud computing resources for one or more cloud computing environments.

The resource reservation interface 1100 includes a usage data area 1102. The usage data area 1102 can provide various metrics related to the usage of one or more cloud computing environments. For example, with respect to FIGS. 6A-6C, the usage data area 1102 can provide all or a portion of the usage data 606, the cloud computing usage budget 612, the cumulative usage 622, the forecasted usage 632, etc. The information included in the usage data area 1102 can be used, e.g., by an administrator using the client device 104, to help determine an amount of cloud computing resources that should be reserved.

The resource reservation interface 1100 can include a cloud resource reservation area 1112. The cloud resource reservation area 1112 can include one or more interface elements (e.g., drop down menus, fields, check boxes, selectable buttons, etc.) that allow an administrator to reserve cloud resources for one or more cloud computing environments. For example, as shown, an administrator can use the cloud resource reservation area 1112 to reserve CPU hours in advance (e.g., as opposed to ordering them on demand which can be less efficient). Specifically, as shown, the administrator can use the cloud resource reservation area 1112 to select a percent and a base for the CPU hours. The base can be an average usage (e.g., an average number of CPU hours used by the one or more cloud computing environments over the last week, the last month, the last six months, the last year, etc.). The cloud resource reservation area 1112 can be pre-filled with recommended values (e.g., obtained from a recommendation provided by the computing system 110 shown in FIGS. 6A-6C). For example, the cloud resource reservation area 1112 can be pre-filled with a percent of 80% and a base of the average usage over the last six months based on a recommendation provided by the computing system 110.

Although FIG. 11 provides for the reservation of CPU hours, the interface 1100 can provide for the reservation of other cloud computing resources. For example, FIG. 11 can provide one or more additional areas that provide for the reservation of memory (e.g., RAM), for the reservation of storage, and/or for the reservation of network resources. The interface 1100 can similarly can indicate a recommended amount of resources, e.g., a recommended amount of memory or storage to reserve in advance.

The interface 1100 can correspond to a particular group of users or a subset of the cloud computing environments 602 shown in FIGS. 6A-6C. The particular group of users and/or the subset of cloud computing environments 602 can correspond to a particular company or other organization, to a particular department of the company, to a particular group of users working on or assigned to a particular project, etc. The recommended amount of resources to reserve in advance, e.g., for a future time period, can be based on the aggregate level of usage for the particular group of users or the subset of the cloud computing environments 602. For example, the computer system 110 can use an organization's usage measures for the current month and several prior months to estimate expected demand for computing resources the next month. The computer system 110 can then reserve computing resources for the next month based on the expected future usage, e.g., at 80% of the expected usage, to secure availability and in many cases to obtain better pricing or other terms.

Specifically, in making a recommendation that is used to pre-fill the cloud resource reservation area 1112, the computing system 110 shown in FIGS. 6A-6C can use the usage data 606 (e.g., can use the historical usage data 608) to identify a certain level of usage that is consistently observed over a period of time (e.g., one month, six months, one year, etc.). For example, the computing system 110 can use the historical usage data 608 to determine that the cloud computing environments 602 consistently use at least 80% of their past six month usage average of 394 CPU hours per month for any given month (e.g., within a standard deviation of three). Based on this determination, the computing system 110 can generate a recommendation and can send the recommendation to the client device 104. The recommendation can include an indication of the usage percent (e.g., 80%) and the usage base (e.g., average usage over the last six months) to use for reserving cloud resources. The client device 104 can use the recommendation to pre-fill the cloud resource reservation area 1112. The cloud resource reservation area 1112 can include an indication it is displaying a recommended amount of cloud resources to reserve.

The cloud resource reservation area 1112 can include a selectable interface element 1114. In response to an administrator selecting the interface element 1114, a response can be sent to the computing system 110 and/or the cloud computing system 108 shown in FIGS. 6A-6C. The response can provide an indication as to the amount of cloud resources that should be reserved in advance, e.g., for an upcoming monitoring period.

The resource reservation interface 1100 can include a Spot reservation area 1122. The Spot reservation area 1122 can include one or more interface elements (e.g., drop down menus, fields, check boxes, buttons, sliders, switches, etc.) that allow an administrator to enable Spot reservation and/or indicate a job type/priority that is permitted for Spot reservation. For example, the Spot reservation area 1122 can include an interface element 1124 that allows an administrator to enable or disable Spot reservation. Spot reservation can be enabled to, for example, help reduce spending on cloud resources, and/or as a preference of the administrator. The Spot reservation area 1122 can also include an interface element 1126 that allows an administrator to select the job types/priorities that can be used for Spot reservation. For example, an administrator can use the interface element 1126 to indicate that Spot reservation should only be used for low priority jobs. The Spot reservation area 1122 can be pre-filled with recommended values (e.g., obtained from a recommendation provided by the computing system 110 shown in FIGS. 6A-6C). For example, the Spot reservation area 1122 can be pre-filled with Spot reservation enabled, and an indication that Spot reservation should be used for low and medium priority jobs.

As described above, Spot reservation can refer to the reservation of unused cloud computing resources at a discounted cost without guarantee that such unused cloud computing resources will be available. As an example, enabling Spot reservation can provide for the reservation of cloud computing server instances that are unused by a cloud computing provider, such as Amazon AWS. The cloud computing provider can provide such reservations of resources at a discounted price. However, the risk is that such resources may not be available or always available (e.g., cloud computing resources are not guaranteed), e.g., in the case where all resources are being used by others paying full price or others higher in a queue for unused resources. Spot reservation may be a tier or level of service or access provided by a cloud computing provider, such as Amazon AWS. For example, Spot reservation may be the lowest tier or level offered by the cloud computing provider and, by default of the computing system 110, may be disabled or enabled and only used for low priority job types.

As mentioned, cloud computing providers may offer different tiers or levels of service or access, which can have different costs and features available. For example, there can be standard resources available on-demand (e.g., at full price), while other resources reserved in advance (e.g., at a discounted price). Low priority or non-guaranteed resources may also be available, which may be subject to interruption if demand is high but are also available at low cost, e.g., as is the case with Spot reservation. The usage data and activity data generated by the cloud computing system 108 can indicate the type and priority of computing resource usage, allowing the computer system 110 to forecast how much of different tiers or types of service will be needed. In reserving cloud computing resources, the cloud computing system 108 can set the amount of each service tier to reserve based on the needs based on the usage patterns and/or the forecasted usage 632 provided by the computer system 110. Similarly, in reserving cloud computing resources, the cloud computing system 108 may follow instructions provided by the computer system 110 that explicitly provide the amount of each service tier to reserve based on the needs based on the usage patterns and/or the forecasted usage 632.

In making a recommendation that is used to pre-fill the Spot reservation area 1122, the computing system 110 shown in FIGS. 6A-6C can use the usage data 606, the cumulative usage 622, the cloud computing usage budget 612, and/or the forecasted usage 632 to determine if Spot reservation should be enabled to help meet the cloud computing usage budget 612. The computing system 110 can select a job type/priority based on administrator preferences and/or based on the extent that usage needs to be reduced (e.g., based on the forecasted usage 632 and the cloud computing usage budget 612). For example, if the computing system 110 determines that usage does not need to be reduced much in order for the cloud computing usage budget 612 to be met, then the computing system 110 can determine that Spot reservation should be enabled and used only for low priority jobs. However, if the computing system 110 determines that usage needs to be reduced significantly in order to meet the cloud computing usage budget 612, then the computing system 110 can determine that Spot reservation should be enabled and used for jobs of all priorities/types. The computing system 110 can generate a recommendation and can send the recommendation to the client device 104. The client device 104 can use the recommendation to pre-fill the Spot reservation area 1122. The Spot reservation area 1122 can include an indication that it is displaying recommended Spot reservation settings.

The Spot reservation area 1122 can include a selectable interface element 1128. In response to an administrator selecting the interface element 1128, a response can be sent to the computing system 110 and/or the cloud computing system 108 shown in FIGS. 6A-6C. The response can provide an indication as to whether Spot reservation should be enabled and/or an indication of the job types/priorities that Spot reservation can be used for.

Figure 12:
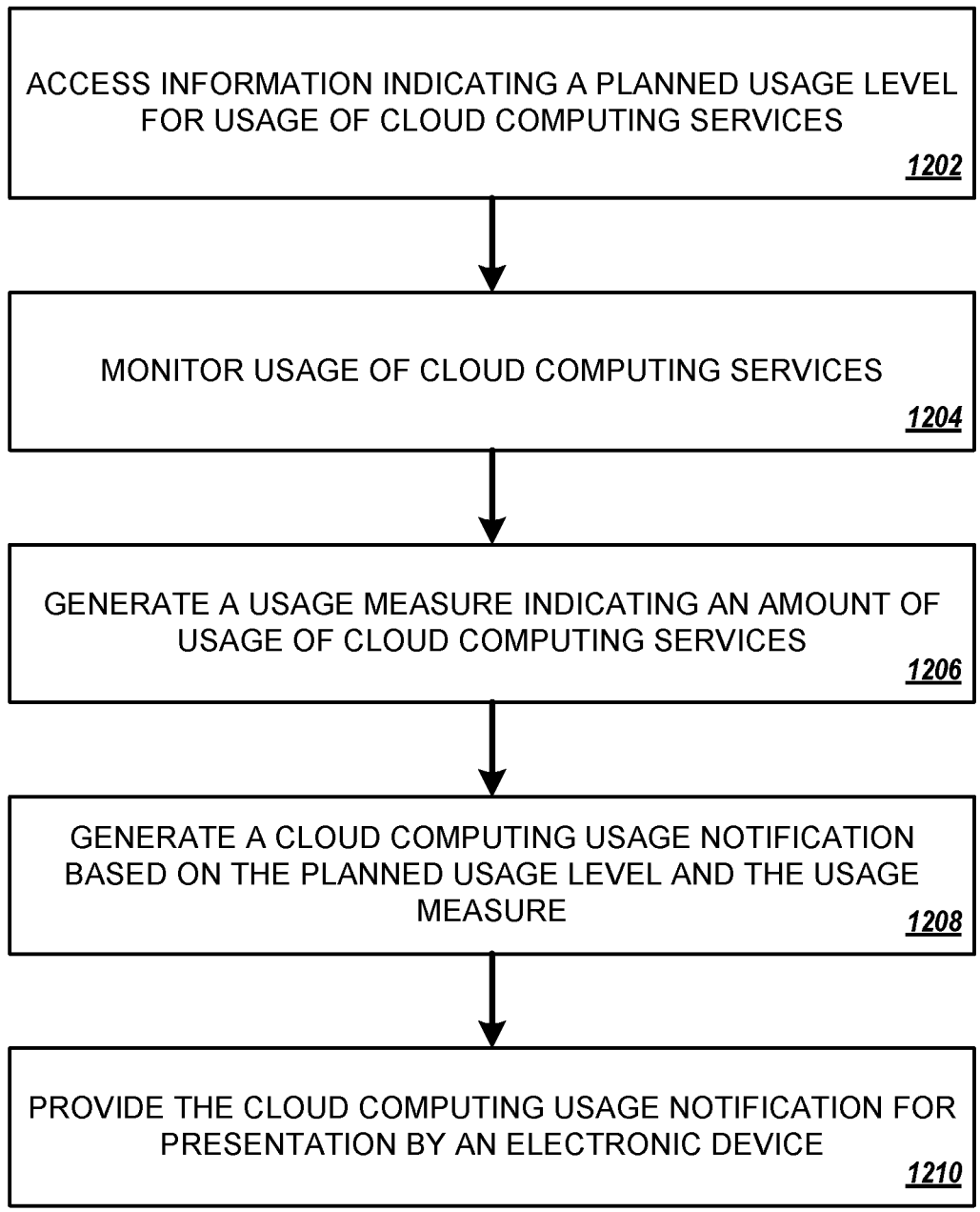
FIG. 12 is a flow diagram that illustrates an example process for monitoring and managing an environment.

FIG. 12 is a flow diagram that illustrates an example process 1200 for monitoring and managing an environment. The process 1200 can be performed, at least in part, using the system 100 described herein. The process 1200 can be performed, at least in part, using the system 600 described herein.

The process 1200 includes accessing information indicating a planned usage level for usage of cloud computing services (1202). As an example, with respect to FIGS. 6A-6C, the information can include the cloud computing usage budget 612 that indicates a planned usage level for usage of cloud computing services by the cloud computing environments 602 over a period of time (e.g., one day, one week, one month, six months, etc.). The information indicating a planned usage level can be accessed from one or more client devices, such as the client device 104. As an example, the information indicating a planned usage level can include one or more of a maximum amount of CPU hours, a minimum CPU utilization, a minimum average CPU utilization, a maximum cost of cloud computing resources, etc. The information indicating a planned usage level can include a time period. For example, the information indicating a planned usage level can include one or more of a maximum amount of CPU hours over a time period, a minimum CPU utilization over a time period, a minimum average CPU utilization over a time period, a maximum cost of cloud computing resources over a time period, etc.

In some cases, the process 1200 includes generating usage metrics from the information indicating the planned usage level for usage of cloud computing services. These metrics can include budget thresholds, anomaly definitions, idle environment definitions, etc. For example, with respect to FIGS. 6A-6C, the computer system 110 can use the cloud computing usage budget 612 to generate the budget thresholds 614. The budget thresholds 614 can include percent thresholds of one or more limitations specified in the cloud computing usage budget 612. For example, the budget thresholds 614 can include one or more percent thresholds of CPU hours, cost of cloud computing resources, CPU utilization, average CPU utilization, etc. Similarly, the metrics can include one or more definitions for usage anomalies. For example, the computer system 110 can identify metrics that define a usage anomaly as occurring when a given cloud computing environment or group of cloud computing environments is/are using twice the number of allocated (or typically allocated) CPUs. As another example, the metrics can include one or more definitions for determining if a cloud computing environment is idle. For example, a metric can define that a cloud computing environment or a group of cloud computing environments is/are idle when the CPU utilization in the environment(s) falls below a percentage (e.g., 10%, 15%, 20%, etc.) for a length of time (e.g., fifteen minutes, thirty minutes, one hour, etc.). These metrics can be determined by the computer system 110 based on the cloud computing usage budget 612 and/or other information provided by the client device 104 and/or one or more other client devices.

In some cases, the usage metrics correspond to a particular cloud computing environment or a particular group of cloud computing environments. For example, with respect to FIGS. 6A-6C, the budget thresholds for the Environment A may include 33%, 66%, and 100% of the maximum CPU hours provided in the cloud computing usage budget 612. The budget thresholds for an Environment X may include 12%, 24%, 36%, 60%, and 96% of the maximum CPU hours provided in the cloud computing usage budget 612.

The process 1200 includes monitoring usage of cloud computing services (1204). A cloud computing provider can acquire the usage of cloud computing services and can send the resulting usage data to a monitoring system. For example, with respect to FIGS. 6A-6C, the cloud computing system 108 can acquire the activity data 604 and/or the usage data 606, and can send the activity data 604 and/or the usage data 606 to the computer system 110. The computer system 110 can use the activity data 604 and/or the usage data 606 to monitor the usage of the cloud computing environments 602. Specifically, the computer system 110 can use the usage tracking module 620 to track the usage of the cloud computing environments 602, and can use the usage forecasting module 630 to forecast the usage of the cloud computing environments 602.

The process 1200 includes generating a usage measure indicating an amount of usage of cloud computing services (1206). As an example, the usage measures can include the total CPU hours used in a time period, the CPU hours amassed over time in a time period, the CPU utilization over a time period, the average CPU utilization over a time period, the total cost of cloud computing resources in a time period, the cost amassed over time in a time period, etc. for a given cloud computing environment or a given group of cloud computing environments. The usage measures can additionally or alternatively include forecasted total CPU hours by the end of the time period, forecasted CPU hours over time until the end of the time period, forecasted CPU utilization overt time until the end of a time period, forecasted average CPU utilization by the end of a time period, forecasted total cost by the end of the time period, forecasted cost over time until the end of the time period, forecasted usage at times corresponding to one or more usage thresholds, etc. For example, with respect to FIG. 6A, the usage measure can include the cumulative usage 622 and/or the forecasted usage 632.

The process 1200 includes generating a cloud computing usage notification based on the planned usage level and the usage measure (1208). For example, with respect to FIG. 6B, the computing system 110 can generate the usage notification 646 using the notification module 640 when it determines that one of the budget thresholds 614 has been met. As another example, the computing system 110 can generate the idle environment notification 642 using the notification module 640 when it determines that one or more of the cloud computing environments 602 are idle using one or more usage measures indicating the CPU utilization for the one or more cloud computing environments and metrics defining an idle environment. Similarly, the computing system 110 can generate the anomaly notification 648 using the notification module 640 when it determines that an anomaly has occurred with respect to one or more of the cloud computing environments 602 based on one or more usage measures and metrics defining the anomaly. As another example, with respect to FIG. 6C, the computing system 110 can generate the usage forecast notification 658 using the notification module 640 and/or the environment management module 650 when it determines that the forecasted usage is expected to reach limit defined in the cloud computing usage budget 612, the forecasted usage is expected to reach limit defined in the cloud computing usage budget 612 before the end of a time period, the forecasted usage is expected to reach a budget threshold before an expected time, etc.

The process 1200 includes providing the cloud computing usage notification for presentation by an electronic device (1210). For example, with respect to FIGS. 6A-6C, the notifications 670 can be sent to the client device 104 and/or to one or more other client devices over the network 112. The notifications 670 can include one or more of the idle environment notifications 642, the periodic usage notification 644, the usage notification 646, the anomaly notification 648, the usage forecast notification 658, an environment shutdown notification, an environment startup notification, etc. With respect to FIG. 7, the notification can be the idle environment notification 700 that includes an indication that one or more cloud computing environments have been idle for a particular length of time and an indication that the one or more cloud computing environments will be automatically shut down if they continue to remain idle for a particular length of time. With respect to FIG. 8, the notification can be the shutdown notification 800 that includes an indication that one or more cloud computing environments have been shut down. With respect to FIG. 9, the notification can be the periodic usage notification 900 that includes indications of the usage of one or more cloud computing environments since the last periodic usage notification, and changes in the usage of the one or more cloud computing environments since the last periodic usage notification.

In some cases, the process 1200 includes comparing the generated usage measure with the planned usage level. For example, with respect to FIG. 6C, the environment management module 650 can compare the forecasted usage 632 to the cloud computing usage budget 612. As a result, the environment management module 650 makes the determination 652 that the forecasted usage 632 is greater than the budgeted usage 652. As another example, with respect to FIG. 6B, the notification module 640 can compare the cumulative usage 622 to the budget thresholds 614 to determine that the total CPU hours in the current time period have met one of the thresholds, e.g., have reached 50% of the monthly budget provided by the cloud computing usage budget 612. Here, providing the cloud computing usage notification can include providing the cloud computing usage notification based on the comparison. For example, the notification module 640 can generate and send the usage notification 646 in response to determining that 50% of the monthly budget has been reached.

In some cases, the process 1200 includes performing a management action for one or more of the multiple computing environments based on the usage measure and the planned usage level. The management action can include one or more of the following: changing a duration that a running computing environment is permitted to continue running; changing a default duration limit that computing environments are permitted to run; changing a level of computing resources allocated to a running computing environment; changing a default level of computing resources allocated to computing environments; changing a policy governing extension of computing environment duration; changing a threshold for an amount of activity for a computing environment to be shut down; changing a threshold for an inactive computing environment to be re-started; changing an execution priority for a computing environment; or changing an amount of environments that are permitted to run concurrently. For example, with respect to FIG. 6C, management action can include the environment management module 650 generating the updated configuration settings 654 and/or the updated user activity threshold 656. The computer system 110 can send the updated configuration settings 654 to the cloud computing system 108 to effect a change in the configuration settings of the cloud computing system 108 with respect to one or more of the cloud computing environments 602.

In some cases, the planned usage level is a planned usage level for an organization or portion of an organization. For example, the planned usage level can be a planned usage level for all cloud computing environments that are managed by a particular department of a company. Here, the group of multiple computing environments can be computing environments of the organization or the portion of the organization. The group of multiple computing environments can include computing environments managed by different members of the organization. For example, with respect to FIGS. 6A-6C, the Environment A of the cloud computing environments 602 can be managed by a first member of a company, and the Environment B of the cloud computing environments 602 can be managed by a second member of the company. Both the first and second members can be part of the same department of the company. The usage measure can be an aggregate measure of usage of cloud computing services by the organization or the portion of the organization. For example, with respect to FIGS. 6A-6C, the cumulative usage 622 can be the cumulative CPU hours of all cloud computing environments of the cloud computing environments 602 that are managed by the department of the company. Providing the notification can include providing the notification to one or more users designated to receive notifications regarding usage for the organization or the portion of the organization. For example, with respect to FIG. 6B, the notification module 640 can provide the usage notification 646 to a user who works in the department of the company and manages the Environment A of the cloud computing environments 602.

In some cases, the process 1200 includes determining a forecasted usage of cloud computing services over the period of time based on at least one of: usage measures for the group of computing environments during one or more time periods before the current time period; a usage measure for the group of computing environments for the current time period; or one or more patterns of usage of cloud computing services by the group of computing environments. For example, with respect to FIGS. 6A-6C, the usage forecasting module 630 of the computer system 110 can use the usage data 606 and/or the activity data 604 to determine the forecasted usage 632.

In some cases, the process 1200 includes providing periodic alerts indicating (i) usage during a current time period and (ii) a usage limit corresponding to the current time period. For example, with respect to FIG. 6B, the notification module 640 of the computer system 110 can generate and send the periodic usage notification 644 to the client device 104. The periodic usage notification 644 can indicate that 37% of the monthly budget has been used in the first week of the time period (e.g., the current month).

In some cases, the process 1200 includes determining, for each of the periodic alerts, a forecasted usage measure of cloud computing resources for the group of computing environments for the current time period, and providing the forecasted usage measures in the respective periodic alerts. For example, with respect to FIGS. 6B-6C, the notification module 640 can include the usage forecast notification 658 in the periodic usage notification 644. The usage forecast notification 658 can indicate the time/date when the corresponding group of cloud computing environments are forecasted to reach the monthly budget, and/or indicate the time/date when the corresponding group of cloud computing environments are forecasted to reach one or more of the budget thresholds 614.

In some cases, the process 1200 includes determining that the usage measure has reached a threshold that is based on the planned usage level. Providing the notification comprises, in response to determining that the usage measure has reached the threshold, providing a notification indicating that the usage measure has reached the threshold. For example, with respect to FIGS. 6A-6B, the notification module 640 can generate and send the usage notification 646 in response to determining that the Threshold B of the budget thresholds 614 has been met by comparing the cumulative usage 622 with the budget thresholds 614.

In some cases, the process 1200 includes accessing data indicating multiple thresholds each indicating different predetermined proportions of the planned usage level, and monitoring whether the usage of cloud computing services by the group of multiple computing environments reaches any of the multiple thresholds. For example, with respect to FIGS. 6A-6B, the computer system 110 can access data indicating that the budget thresholds 614 should include a first threshold that is 25% of the monthly budget, a second threshold that is 50% of the monthly budget, a third threshold that is 75% of the monthly budget, and a fourth threshold that is 100% of the monthly budget. The accessed data can be provided to the computer system 110 by the client devices 104 or by another client device. The accessed data can correspond to a particular group of cloud computing environments. That is, the thresholds can be defined differently for different groups of cloud computing environments. For example, the thresholds for a first group of cloud computing environments can be different to thresholds of another group of cloud computing environments in that there is a different number of thresholds, the thresholds correspond to one or more differing percentages, the thresholds are defined using one or more different algorithms, etc. The notification module 640 can compare cumulative usage 622 to the budget thresholds 614, e.g., each time the cumulative usage 622 is updated by the usage tracking module 620.

In some cases, the process 1200 includes storing planned usage levels for each of multiple classes of cloud computing services. Monitoring the usage of cloud computing services can include monitoring the usage of each of the different classes of cloud computing services by the group of multiple computing environments and comparing monitored usage with corresponding planned usage levels. The planned usage levels can include, for example, priority levels (e.g., for job types), expected computations, machine learning acceleration, required RAM, storage (e.g., large memory) capacity, required CPU numbers, expected CPU hours, amount and/or type of resources to reserve in advance, etc. With respect to FIGS. 6A-6C, for a given group of cloud computing environments, the computer system 110 can monitor the usage of high priority jobs performed by the group of cloud computing environments, medium priority jobs performed by the group of cloud computing environments, and/or low priority jobs performed by the group of cloud computing environments.

In some cases, the process 1200 includes providing, for presentation to a user, a notification that is conditioned on determining that one or more predetermined criteria have been satisfied. The one or more predetermined criteria can including at least one of: determining that the user has a number of running environments that satisfies a threshold; determining that usage of cloud computing services by computing environments of the user exceeds a typical pattern for the user or for the computing environments; determining that the user has used at least a minimum amount of cloud computing services over the current time period; determining that the user has at least one computing environment running; determining that a computing environment associated with the user was automatically shut down; and determining that a computing environment associated with the user has less than a threshold level of activity for at least a minimum amount of time. For example, with respect to FIGS. 6A-6C, the computer system 110 can generate and send an anomaly notification using the notification module 640 upon determining that the usage of cloud computing services by computing environments of the user exceeds a typical pattern for the user or for the computing environments (e.g., usage is 0.5 times, or less, the typical usage for the cloud computing environments, usage is 1.5 times, or greater, the typical usage for the cloud computing environments, etc.).

In some cases, the process 1200 includes for one or more proper subsets of the group of multiple computing environments: tracking usage of cloud computing services, and providing cloud computing usage notifications indicating a usage measure indicating cloud computing services used by the subset. For example, with respect to FIGS. 6A-6C, the computer system 110 can monitor usage and generate notifications for a subset of the cloud computing environments 602 that correspond to a particular user (e.g., are managed by a particular user), a particular company or other organization, a particular department in a company or other organization, etc.

In some cases, the process 1200 includes determining to stop a particular computing environment that runs using first cloud computing resources, identifying one or more second cloud computing resources with which the particular computing environment is configured to interact, evaluating whether other computing environments rely on the one or more second cloud computing resources, determining, based on the evaluation, that no other active computing environments rely on the one or more cloud resources, and in response to determining that no other active computing environments rely on the one or more cloud resources, shutting down the one or more second resources. For example, with respect to FIGS. 6A-6C and FIG. 10, the computer system 110 can determine to stop the Environment A due to being idled for a predetermined amount of time (e.g., thirty minutes, one hour, two hours, etc.), can identify the Database B and the Network Interface C as second cloud computing resources with which the Environment A is configured to interact with, can evaluate whether the other cloud computing environments rely on the Database B and the Network Interface C, can determine, based on the evaluation, that no other active cloud computing environments rely on the Database B and the Network Interface C, and, in response to determining that no other active cloud computing environments rely on the Database B and the Network Interface C, can shut down the Database B and the Network Interface C.

In some cases, the process 1200 includes setting a default maximum duration for cloud computing environments to run, determining that a particular cloud computing environment has been running for the default maximum duration, and terminating the particular cloud computing environment in response to determining that determining that the particular cloud computing environment has been running for the default maximum duration. For example, with respect to FIGS. 6A-6C, the computer system 110 can determine a maximum duration (e.g., a duration limit or a maximum runtime) and/or a default expiration time (e.g., a deadline relative to a time when a the corresponding cloud computing environment(s) were started) for one or more of the cloud computing environments 602 provided in the cloud computing usage budget 612. The computer system 110 can determine that a cloud computing environment of the cloud computing environments 602 has been running for the maximum duration and/or that default expiration time has elapsed. In response to determining that the cloud computing environment has been running for the maximum runtime and/or that the default expiration time has elapsed, the computer system 110 can shut down the cloud computing environment. The computer system 110 can use the notification module 640 to generate and send a shutdown notification to one or more client devices, e.g., client device(s) of users who manage the cloud computing environment.

In some cases, the process 1200 includes identifying an execution duration limit applicable to a particular cloud computing environment that is running, identifying a user or electronic account associated with the particular cloud computing environment, determining that the execution duration limit for the particular cloud computing environment has reached or is within a predetermined threshold of the execution duration limit, and, in response to determining that the runtime duration has reached or is within a predetermined threshold of the identified runtime duration limit, providing a notification for presentation at a client device associated with a user associated with the particular cloud computing environment. For example, with respect to FIGS. 6A-6C, the computer system 110 can determine an execution duration limit (e.g., maximum duration, maximum runtime, etc.) for a cloud computing environment of the cloud computing environments 602 based on the cloud computing usage budget 612. The computer system 110 can access data on users corresponding to the cloud computing environment. The data may be stored on the computer system 110. Additionally or alternatively, the data may be stored on the cloud computing system 108 and be accessed by the computer system 110. The data can include, for example, names of users, IDs of users, roles of users (e.g., administrator, passive user, etc.), cloud computing environments associated with each of the users (e.g., cloud computing environments managed by the user, cloud computing environments used by the user, etc.), etc.

Continuing the previous example, the computer system 110 can determine that the execution duration limit for the cloud computing environment of the cloud computing environments 602 has been reached or is within a predetermined threshold of the execution duration limit (e.g., 75%, 85%, 95%, etc. of the execution duration limit). In response to determining that the execution duration (e.g., the elapsed runtime of the cloud computing environment) has reached or is within a predetermined threshold of the identified execution duration limit, the computer system 110 can use the notification module 640 to provide a notification for presentation at a client device associated with a user associated with the cloud computing environment. The notification can indicate that the execution duration limit has been reached or is close to being reached. The notification can indicate that the cloud computing environment has been shut down or will be shut down.

In some cases, the process 1200 includes storing usage data that indicates, for one or more computing environments, usage of cloud computing services at different times by the one or more computing environments, determining baseline usage characteristics for the one or more computing environments based on the usage data, determining that usage characteristics for the one or more computing environments for the current time period differs from the baseline usage characteristics by at least a predetermined threshold amount, and providing a notification in response to determining that the usage characteristics for the one or more computing environments for the current time period differs from the baseline usage characteristics by at least a predetermined threshold amount. For example, with respect to FIGS. 6A-6C, the computer system 110 can store historical usage data 608 on the computer system 110, and/or can store the recent usage data 610 as part of the historical usage data 608. When the computer system 110 stores the usage data, the cloud computing system 108 may only provide the computer system 110 the recent usage data 610 (e.g., instead of the recent usage data 610 and the historical usage data 608), e.g., periodically or when requested by the computer system 110. The computer system 110 can use the usage forecasting module 630 to determine baseline usage characteristics for the one or more computing environments 602 based on the historical usage data 608, such as, for example, an expected total CPU hours per month, an expected total CPU hours for the current month, an expected average CPU utilization per month, an expected average CPU utilization for the current month, etc. The usage forecasting module 630 can determine that usage characteristics for the one or more computing environments for the current time period differs from the baseline usage characteristics by at least a predetermined threshold amount (e.g., by 10%, 15%, 20%, etc.). This determination can indicate the occurrence of an anomaly. The threshold amount used can be provided to the computer system 110 by a client device. The threshold amount can be included in the cloud computing usage budget 612.

Continuing the previous example, the computer system 110 can use the notification module 640 to generate and send a notification in response to determining that the usage characteristics for the one or more computing environments for the current time period differs from the baseline usage characteristics by at least a predetermined threshold amount. For example, the notification can be the anomaly notification 648 shown in FIG. 6B.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

The invention claimed is:

1. A method performed by one or more computers, the method comprising:
  accessing, by the one or more computers, information indicating a planned usage level for a period of time, wherein the planned usage level represents a total amount of usage of cloud computing services that is planned for a group of multiple computing environments to use over the period of time;
  monitoring, by the one or more computers and during an initial portion of the period of time, usage of cloud computing services during the initial portion of the period of time to determine a cumulative amount of cloud computing services used by the group of multiple computing environments during the initial portion of the period of time;
  accessing, by the one or more computers, historical usage data indicating usage patterns that indicate usage of cloud computing services by the group of multiple computing environments over one or more prior periods of time;
  before the end of the period of time, generating, by the one or more computers, a predicted usage measure for the period of time based on (i) the cumulative amount of cloud computing services used by the group of multiple computing environments during the initial portion of the period of time and (ii) the usage patterns, the predicted usage measure indicating a total amount of usage of cloud computing services that the group of multiple computing environments is predicted to use over the period of time;
  generating, by the one or more computers, a cloud computing usage notification based on the total amount of planned usage for the period of time that is indicated by the planned usage level and the total amount of predicted usage that is indicated by the predicted usage measure;
  providing, by the one or more computers, the cloud computing usage notification for presentation by an electronic device; and
  changing, by the one or more computers and based on determining that the total amount of predicted usage that is indicated by the predicted usage measure exceeds the total amount of planned usage for the period of time that is indicated by the planned usage level, a configuration setting to limit at least one of an amount of computing environments that are permitted to run, an amount of resources allocated to computing environments, or a duration of execution of computing environments.

2. The method of claim 1, comprising comparing, by the one or more computers, the total amount of planned usage for the period of time that is indicated by predicted usage measure with the total amount of predicted usage that is indicated by the planned usage level; and
  wherein providing the cloud computing usage notification comprises providing the cloud computing usage notification based on the comparison.

3. The method of claim 1, wherein the planned usage level is a planned usage level for an organization or portion of an organization;
  wherein the group of multiple computing environments are computing environments of the organization or the portion of the organization, the group of multiple computing environments including computing environments managed by different members of the organization;
  wherein the predicted usage measure is an aggregate measure of usage of cloud computing services by the organization or the portion of the organization; and
  wherein providing the notification comprises providing the notification to one or more users designated to receive notifications regarding usage for the organization or the portion of the organization.

4. The method of claim 1, comprising determining that the predicted usage measure has reached a threshold that is based on the planned usage level;
  wherein providing the notification comprises, in response to determining that the predicted usage measure has reached the threshold, providing a notification indicating that the usage measure has reached the threshold.

5. The method of claim 1, comprising:
  accessing data indicating multiple thresholds each indicating different predetermined proportions of the planned usage level; and
  monitoring whether the usage of cloud computing services by the group of multiple computing environments reaches any of the multiple thresholds.

6. The method of claim 1, comprising storing planned usage levels for each of multiple classes of cloud computing services;
  wherein monitoring the usage of cloud computing services comprises monitoring the usage of each of the multiple classes of cloud computing services by the group of multiple computing environments and comparing monitored usage with corresponding planned usage levels.

7. The method of claim 1, comprising providing, for presentation to a user, a notification that is conditioned on determining that one or more predetermined criteria have been satisfied, the one or more predetermined criteria including at least one of:
  determining that the user has a number of running environments that satisfies a threshold;
  determining that usage of cloud computing services by computing environments of the user exceeds a typical pattern for the user or for the computing environments;

determining that the user has used at least a minimum amount of cloud computing services over the period of time;

determining that the user has at least one computing environment running;

determining that a computing environment associated with the user was automatically shut down; and determining that a computing environment associated with the user has less than a threshold level of activity for at least a minimum amount of time.

8. The method of claim 1, comprising:

for one or more proper subsets of the group of multiple computing environments:

tracking usage of cloud computing services; and providing cloud computing usage notifications indicating a usage measure indicating cloud computing services used by the subset.

9. The method of claim 1, comprising:

determining to stop a particular computing environment that runs using first cloud computing resources;

identifying one or more second cloud computing resources with which the particular computing environment is configured to interact, the one or more second cloud computing resources being different from the first cloud computing resources;

evaluating whether other computing environments rely on the one or more second cloud computing resources;

determining, based on the evaluation, that no other active computing environments rely on the one or more second cloud computing resources; and in response to determining that no other active computing environments rely on the one or more cloud computing resources, shutting down the one or more second cloud computing resources.

10. The method of claim 1, comprising:

setting a default maximum duration for cloud computing environments to run;

determining that a particular cloud computing environment has been running for the default maximum duration; and terminating the particular cloud computing environment in response to determining that determining that the particular cloud computing environment has been running for the default maximum duration.

11. The method of claim 1, comprising:

identifying an execution duration limit applicable to a particular cloud computing environment that is running;

identifying a user or electronic account associated with the particular cloud computing environment;

determining that the execution duration limit for the particular cloud computing environment has reached or is within a predetermined threshold of the execution duration limit; and in response to determining that the execution duration has reached or is within a predetermined threshold of the identified execution duration limit, providing a notification for presentation at a client device associated with a user associated with the particular cloud computing environment.

12. The method of claim 1, comprising:

storing usage data that indicates, for one or more computing environments, usage of cloud computing services at different times by the one or more computing environments;

determining baseline usage characteristics for the one or more computing environments based on the usage data;

determining that usage characteristics for the one or more computing environments for the period of time differs from the baseline usage characteristics by at least a predetermined threshold amount; and providing a notification in response to determining that the usage characteristics for the one or more computing environments for the period of time differs from the baseline usage characteristics by at least the predetermined threshold amount.

13. A system comprising:

one or more computers; and one or more computer-readable media storing instructions that, when executed, cause the one or more computers to perform operations comprising:

accessing, by the one or more computers, information indicating a planned usage level for a period of time, wherein the planned usage level represents a total amount of usage of cloud computing services that is planned for a group of multiple computing environments to use over the period of time;

monitoring, by the one or more computers and during an initial portion of the period of time, usage of cloud computing services during the initial portion of the period of time to determine a cumulative amount of cloud computing services used by the group of multiple computing environments during the initial portion of the period of time;

accessing, by the one or more computers, historical usage data indicating usage patterns that indicate usage of cloud computing services by the group of multiple computing environments over one or more prior periods of time;

before the end of the period of time, generating, by the one or more computers, a predicted usage measure for the period of time based on (i) the cumulative amount of cloud computing services used by the group of multiple computing environments during the initial portion of the period of time and (ii) the usage patterns, the predicted usage measure indicating a total amount of usage of cloud computing services that the group of multiple computing environments is predicted to use over the period of time;

generating, by the one or more computers, a cloud computing usage notification based on the total amount of planned usage for the period of time that is indicated by the planned usage level and the total amount of predicted usage that is indicated by the predicted usage measure;

providing, by the one or more computers, the cloud computing usage notification for presentation by an electronic device; and changing, by the one or more computers and based on determining that the total amount of predicted usage that is indicated by the predicted usage measure exceeds the total amount of planned usage for the period of time that is indicated by the planned usage level, a configuration setting to limit at least one of an amount of computing environments that are permitted to run, an amount of resources allocated to computing environments, or a duration of execution of computing environments.

14. One or more non-transitory computer-readable media storing instructions that, when executed by one or more computers, cause the one or more computers to perform operations comprising:

accessing, by the one or more computers, information indicating a planned usage level for a period of time, wherein the planned usage level represents a total amount of usage of cloud computing services that is planned for a group of multiple computing environments to use over the period of time;

monitoring, by the one or more computers and during an initial portion of the period of time, usage of cloud computing services during the initial portion of the period of time to determine a cumulative amount of cloud computing services used by the group of multiple computing environments during the initial portion of the period of time;

accessing, by the one or more computers, historical usage data indicating usage patterns that indicate usage of cloud computing services by the group of multiple computing environments over one or more prior periods of time;

before the end of the period of time, generating, by the one or more computers, a predicted usage measure for the period of time based on (i) the cumulative amount of cloud computing services used by the group of multiple computing environments during the initial portion of the period of time and (ii) the usage patterns, the predicted usage measure indicating a total amount of usage of cloud computing services that the group of multiple computing environments is predicted to use over the period of time;

generating, by the one or more computers, a cloud computing usage notification based on the total amount of planned usage for the period of time that is indicated by the planned usage level and the total amount of predicted usage that is indicated by the predicted usage measure;

providing, by the one or more computers, the cloud computing usage notification for presentation by an electronic device; and changing, by the one or more computers and based on determining that the total amount of predicted usage that is indicated by the predicted usage measure exceeds the total amount of planned usage for the period of time that is indicated by the planned usage level, a configuration setting to limit at least one of an amount of computing environments that are permitted to run, an amount of resources allocated to computing environments, or a duration of execution of computing environments.

15. The method of claim 1, wherein generating the predicted usage measure for the period of time comprises using a machine learning model to generate the predicted usage measure, wherein the machine learning model is trained predict usage of different cloud computing services for particular periods of time based on monitored usage of the different cloud computing services in the particular periods of time and historical usage of the different cloud computing services.

16. The method of claim 15, wherein using the machine learning model to generate the predicted usage measure comprises:
providing (i) the monitored usage of the cloud computing services during the initial portion of the period of time and (ii) the historical usage data as input to the machine learning model; and
in response to providing the input to the machine learning model, receiving the predicted usage measure as an output of the machine learning model.

17. The method of claim 1, comprising:
based on determining that the total amount of predicted usage exceeds the total amount of planned usage, reducing a time limit that controls a duration that one or more of the multiple computing environments are permitted to run.

18. The method of claim 1, comprising:
based on determining that the total amount of predicted usage exceeds the total amount of planned usage, increasing an activity threshold to increase an amount of activity at which automatic shutdown of one or more of the multiple computing environments is initiated.

19. The method of claim 1, wherein the usage patterns indicated by the historical usage data indicate usage trends in the one or more prior periods of time including variation in usage within each of the one or more prior periods of time; and
wherein the predicted usage measure is generated based on the usage trends in the one or more prior periods of time.

* * * * *